United States Patent
Ikeda et al.

(10) Patent No.: US 12,516,153 B2
(45) Date of Patent: Jan. 6, 2026

(54) THERMOPLASTIC RESIN, METHOD FOR MANUFACTURING SAME, AND OPTICAL LENS

(71) Applicant: MITSUBISHI GAS CHEMICAL COMPANY, INC., Tokyo (JP)

(72) Inventors: Shinya Ikeda, Niigata (JP); Noriyuki Kato, Tokyo (JP); Manabu Hirakawa, Hiratsuka (JP); Karl Reuter, Freiburg (DE); Vasyl Andrushko, Freiburg (DE); Mark Kantor, Freiburg (DE); Florian Stolz, Freiburg (DE)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 612 days.

(21) Appl. No.: 17/434,258

(22) PCT Filed: Feb. 27, 2020

(86) PCT No.: PCT/JP2020/008193
§ 371 (c)(1),
(2) Date: Aug. 26, 2021

(87) PCT Pub. No.: WO2020/175663
PCT Pub. Date: Sep. 3, 2020

(65) Prior Publication Data
US 2022/0145004 A1 May 12, 2022

(30) Foreign Application Priority Data
Feb. 27, 2019 (JP) .................. 2019-034783

(51) Int. Cl.
*C08G 63/672* (2006.01)
*C07C 43/20* (2006.01)
*C08G 63/66* (2006.01)
*C08G 63/78* (2006.01)
*G02B 1/04* (2006.01)

(52) U.S. Cl.
CPC .......... *C08G 63/672* (2013.01); *C07C 43/202* (2013.01); *C08G 63/66* (2013.01); *C08G 63/78* (2013.01); *G02B 1/041* (2013.01); *C07B 2200/13* (2013.01)

(58) Field of Classification Search
CPC ...... C08G 63/66; C08G 63/672; C08G 63/78; C08G 64/06; C08G 64/081; C08G 64/12; C08G 64/307; C08L 45/00; C08L 69/005; G02B 1/041
See application file for complete search history.

(56) References Cited

U.S. PATENT DOCUMENTS

| | | | | |
|---|---|---|---|---|
| 6,063,464 A | * | 5/2000 | Charbonneau | C08G 63/668 428/364 |
| 8,436,214 B2 | | 5/2013 | Hata | |
| 10,654,972 B2 | * | 5/2020 | Kato | C08G 63/78 |
| 10,767,007 B2 | * | 9/2020 | Kato | C08G 64/30 |
| 11,286,342 B2 | * | 3/2022 | Kato | C08G 64/04 |
| 11,434,327 B2 | * | 9/2022 | Shiratake | C08G 64/307 |
| 2016/0319069 A1 | * | 11/2016 | Shigematsu | C08G 64/06 |
| 2018/0305496 A1 | | 10/2018 | Kato et al. | |
| 2019/0241703 A1 | | 8/2019 | Kato et al. | |
| 2020/0181325 A1 | | 6/2020 | Shiratake et al. | |
| 2020/0354299 A1 | | 11/2020 | Reuter et al. | |

(Continued)

FOREIGN PATENT DOCUMENTS

| CN | 107176905 A | 9/2017 |
|---|---|---|
| EP | 3 677 615 A1 | 7/2020 |
| JP | 2002-332345 | * 11/2002 |

(Continued)

OTHER PUBLICATIONS

Kazuo Sakurai et al "Optical Properties of a Low Birefringence Polyester Containing Fluorene Side Chain", Polymer Journal, 32, pp. 676-682. (Year: 2000).*
Extended European Search Report issued Feb. 7, 2023 in family member European Patent Application No. 22172215.0.
International Search Report issued in International Patent Application No. PCT/JP2020/008193, dated Apr. 28, 2020, along with English translation thereof.
Written Opinion of the International Searching Authority issued in International Patent Application No. PCT/JP2020/008193, dated Apr. 28, 2020, along with English translation thereof.

(Continued)

*Primary Examiner* — Robert S Jones, Jr.
(74) *Attorney, Agent, or Firm* — GREENBLUM & BERNSTEIN, P.L.C.

(57) ABSTRACT

Provided is a thermoplastic resin including constituent units represented by general formula (1). (In formula (1), R1 and R2 each independently represent: a hydrogen atom; a fluorine atom; a chlorine atom; a bromine atom; an iodine atom; a C1-6 alkyl group; a monocyclic or polycyclic C6-36 aryl group; a monocyclic or polycyclic heteroaryl group having 5-36 ring atoms, 1, 2, 3, or 4 of the ring atoms being selected from nitrogen, sulfur, and oxygen, and the other ring atoms being carbon in the heteroaryl group; a C2-6 alkenyl group; a C1-6 alkoxy group; or a C7-17 aralkyl group. In formula (1), X, a, and bare each as described in the present specification.)

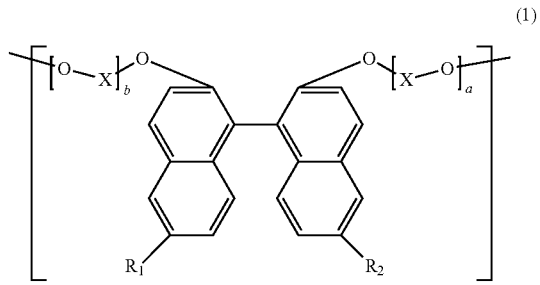

(1)

15 Claims, 16 Drawing Sheets

(56) References Cited

U.S. PATENT DOCUMENTS

2022/0145004 A1* 5/2022 Ikeda .................. C08G 64/081

FOREIGN PATENT DOCUMENTS

| | | | |
|---|---|---|---|
| JP | 2002332345 A | * | 11/2002 |
| JP | 2014-221865 | * | 11/2014 |
| JP | 2014-221865 A | | 11/2014 |
| JP | 2017-179323 A | | 10/2017 |
| JP | 2018-2893 A | | 1/2018 |
| JP | 2018-2894 A | | 1/2018 |
| JP | 2018-2895 A | | 1/2018 |
| JP | 2018-59074 A | | 4/2018 |
| JP | 2018059074 | * | 4/2018 |
| JP | 2018059074 A | * | 4/2018 |
| TW | 201815883 A | | 5/2018 |
| WO | 2017/078075 A1 | | 5/2017 |
| WO | 2019/043060 A1 | | 3/2019 |

OTHER PUBLICATIONS

Extended European Search Report issued in the the corresponding EP patent application No. 20762624.3. dated Jun. 29, 2022.
Neal G. Anderson, Practical Process Research and Development, Process Solutions LLP, pp. 1-247 (2000).
Harry G. Brittain (Ed.), Polymorphism in Pharmaceutical Solids., Drugs and the Pharmaceutical Sciences., 1999, vol. 95, pp. 1-427.
Alexander G. Shtukenberg, et al., Powder diffraction and crystal structure prediction identify four new coumarin polymorphs., Chemical Science, Aug. 2017, pp. 4926-4940.

* cited by examiner

THERMOPLASTIC RESIN, METHOD FOR MANUFACTURING SAME, AND OPTICAL LENS

TECHNICAL FIELD

The present invention relates to a thermoplastic resin, in particular, a thermoplastic resin such as a polyester resin, a polyester carbonate resin and a polycarbonate resin, and a method for producing the same. The present invention also relates to an optical lens containing the thermoplastic resin.

BACKGROUND ART

As a material of optical lenses to be used in optical systems of various cameras such as cameras, film integrated type cameras and video cameras, an optical glass or an optical resin is used. Optical glasses are excellent in heat resistance, transparency, size stability, chemical resistance, etc., but have problems of high material costs, bad molding processability and low productivity.

Meanwhile, advantageously, optical lenses made of optical resins can be mass-produced by injection molding. For example, thermoplastic resins, etc. are used in camera lenses. However, recently, it has been desired to develop a resin having a high refractive index because of miniaturization of products (Patent Documents 1-4). In general, when the refractive index of an optical material is high, a lens element having the same refractive index can be realized with a surface having a smaller curvature, and for this reason, the amount of aberration generated on this surface can be reduced. As a result, it is possible to realize reduction in the number of lenses, reduction in the eccentricity sensitivity of the lens and reduction in weight by reduction in the lens thickness.

Further, in general, regarding lenses to be used in optical systems of cameras, it is required not only that a high refractive index is provided, but also that a b value is not too high and is within a certain range of the level and chromatic aberration can be suppressed.

However, a thermoplastic resin and optical lens having a sufficiently high refractive index and a low b value had not been provided.

Moreover, recently, electronic devices have been required to have water resistance and heat resistance. As an environmental test for evaluating water resistance and heat resistance of such electronic devices, a "PCT test" (pressure cooker test) is conducted. This test is a moist heat resistance test, and evaluation is made by temporally accelerating penetration of moisture into the inside of a sample. Accordingly, optical lenses made of optical resins to be used in electronic devices are desired to have not only a high refractive index and a low b value, but also high heat resistance and hydrolysis resistance.

PRIOR ART DOCUMENTS

Patent Documents

Patent Document 1: Japanese Laid-Open Patent Publication No. 2018-2893
Patent Document 2: Japanese Laid-Open Patent Publication No. 2018-2894
Patent Document 3: Japanese Laid-Open Patent Publication No. 2018-2895
Patent Document 4: Japanese Laid-Open Patent Publication No. 2018-59074

SUMMARY OF THE INVENTION

Problems to be Solved by the Invention

The problems to be solved by the present invention are to provide a thermoplastic resin having a high refractive index, a low b value and high moist heat resistance, in particular, a high refractive index, and to provide an excellent optical lens obtained by using the resin.

Means for Solving the Problems

The present inventors diligently made researches in order to solve the above-described problem and found that it can be solved by the below-described thermoplastic resin and optical lens, and thus the present invention was achieved.

The present invention is, for example, as described below.

[1] A thermoplastic resin comprising a structural unit represented by general formula (1):

[Chemical Formula 1]

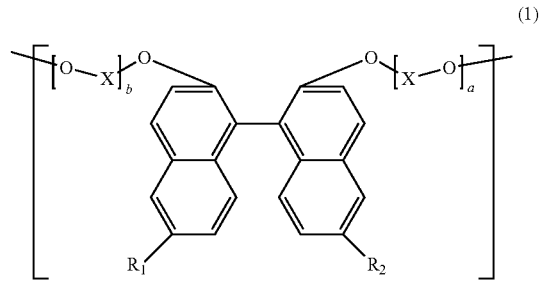

wherein:
$R_1$ and $R_2$ each independently represent a hydrogen atom, a fluorine atom, a chlorine atom, a bromine atom, an iodine atom, an alkyl group having 1 to 6 carbon atoms, a monocyclic or polycyclic aryl group having 6 to 36 carbon atoms, a monocyclic or polycyclic heteroaryl group having 5 to 36 ring atoms where 1, 2, 3 or 4 of the ring atoms are selected from nitrogen, sulfur and oxygen while the other ring atoms are carbon atoms, an alkenyl group having 2 to 6 carbon atoms, an alkoxy group having 1 to 6 carbon atoms or an aralkyl group having 7 to 17 carbon atoms;
the monocyclic or polycyclic aryl group and the monocyclic or polycyclic heteroaryl group may be unsubstituted or have 1 or 2 $R^a$ groups selected from the group consisting of CN, $CH_3$, $OCH_3$, O-phenyl, O-naphthyl, S-phenyl, S-naphthyl and halogen;
with the proviso that both of $R_1$ and $R_2$ are not hydrogen;
X represents an alkylene group having 1 to 8 carbon atoms, a cycloalkylene group having 5 to 12 carbon atoms or an arylene group having 6 to 20 carbon atoms;
with the proviso that each of the alkylene group and the cycloalkylene group may be substituted to have a benzene ring; and
a and b each independently represent an integer of 1 to 10.
[2] The thermoplastic resin according to item [1], which is a polyester resin or a polyester carbonate resin.
[3] The thermoplastic resin according to item [1] or [2], which further comprises a structural unit represented by general formula (2):

[Chemical Formula 2]

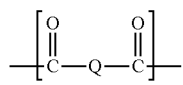

wherein Q is represented by formula (2a):

[Chemical Formula 3]

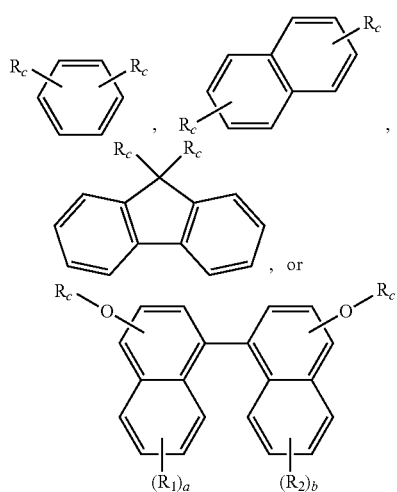

wherein in formula (2a), $R_C$s each independently represent a single bond that bonds to a CO group in formula (2) or an alkylene group, which may have a substituent, wherein the total carbon number is 1 to 10, and which includes a point of bonding to the CO group in formula (2) at the end.

[4] The thermoplastic resin according to item [3], wherein said Q is represented by formula (2b):

[Chemical Formula 4]

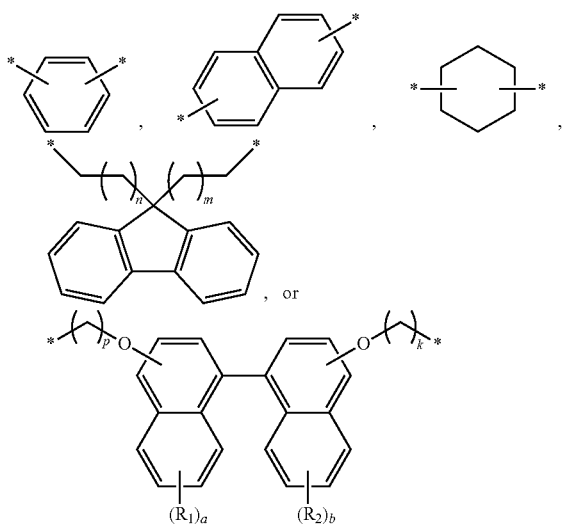

wherein:

n and m each independently represent an integer of 0 to 5;

p and k each independently represent an integer of 1 to 5;

$R_1$ and $R_2$ are the same as $R_1$ and $R_2$ in formula (1);

a and b each independently represent an integer of 0 to 6; and

* represents the point of bonding to the CO group in formula (2).

[5] The thermoplastic resin according to item [4], which has at least a structural unit comprising said Q represented by formula (2c):

[Chemical Formula 5]

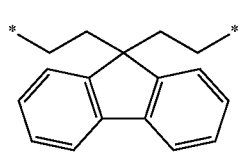

wherein * represents the point of bonding to the CO group in formula (2).

[6] The thermoplastic resin according to any one of items [1] to [5], which comprises the structural unit represented by general formula (1) in an amount of more than 50 mol %.

[7] The thermoplastic resin according to any one of items [1] to [6], wherein at least one of $R_1$ and $R_2$ in general formula (1) is an aryl group having 6 to 20 carbon atoms.

[8] The thermoplastic resin according to item [7], wherein at least two of $R_1$ and $R_2$ in general formula (1) are an aryl group having 6 to 14 carbon atoms.

[9] The thermoplastic resin according to any one of items [1] to [8], wherein the structural unit represented by general formula (1) comprises at least one of structural units represented by general formulae (A-1) to (A-7):

[Chemical Formula 6]

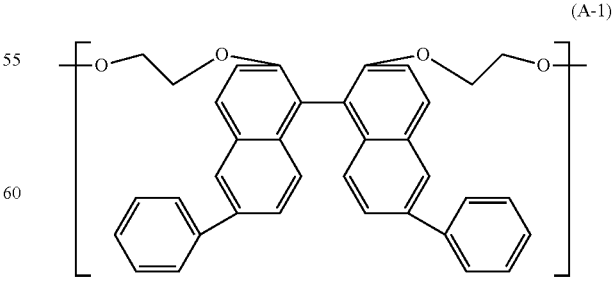

[Chemical Formula 7]

(A-2)
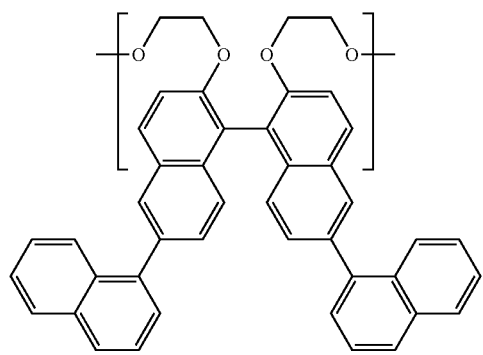
[Chemical Formula 8]
(A-3)
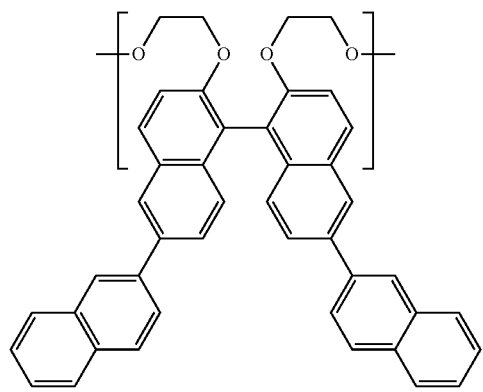
[Chemical Formula 9]
(A-4)
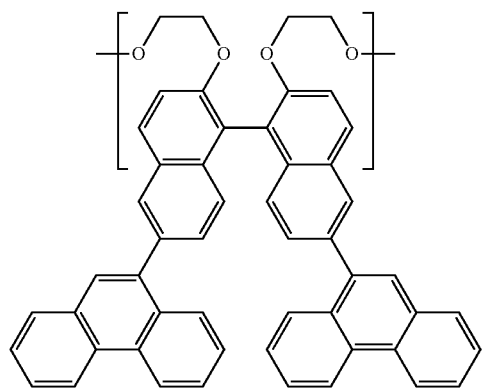
[Chemical Formula 10]
(A-5)
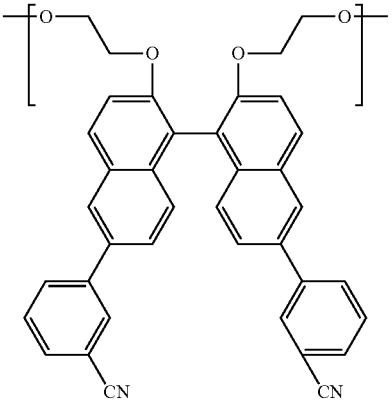
[Chemical Formula 11]
(A-6)
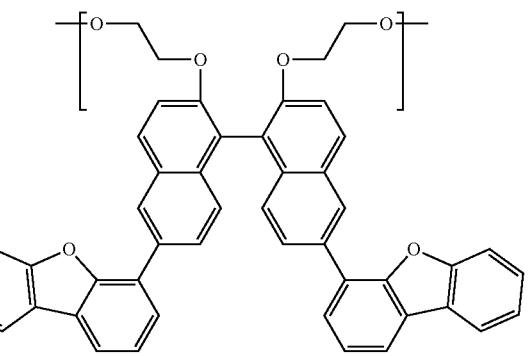
[Chemical Formula 12]
(A-7)
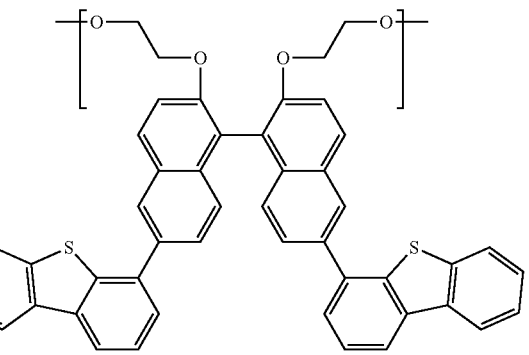

[10] The thermoplastic resin according to any one of items [1] to [9], which further comprises at least one of structural units represented by general formulae (3) and (4):

[Chemical Formula 13]

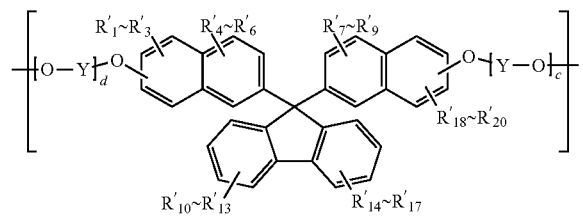

(3)

wherein:
  $R'_1$ to $R'_{20}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;
  Y represents an alkylene group having 1 to 8 carbon atoms, a cycloalkylene group having 5 to 12 carbon atoms or an arylene group having 6 to 20 carbon atoms; and
  c and d each independently represent an integer of 1 to 10,

[Chemical Formula 14]

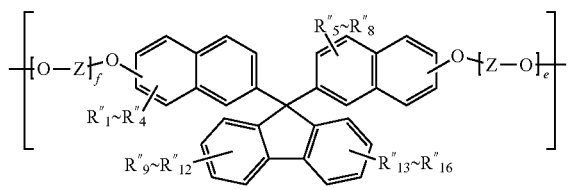

(4)

wherein:
  $R''_1$ to $R''_{16}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;

Z represents an alkylene group having 1 to 8 carbon atoms, a cycloalkylene group having 5 to 12 carbon atoms or an arylene group having 6 to 20 carbon atoms; and
  e and f each independently represent an integer of 1 to 10.

[11] The thermoplastic resin according to item [10], which comprises a copolymer comprising at least the structural unit represented by general formula (1) and the structural unit represented by general formula (3).

[12] The thermoplastic resin according to item [11], wherein the copolymer further comprises a structural unit represented by general formula (3-1):

[Chemical Formula 15]

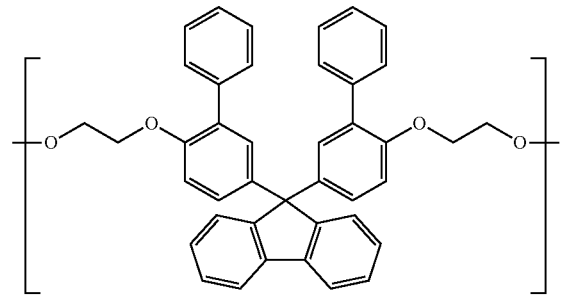

(3-1)

[13] The thermoplastic resin according to item [10], which comprises a copolymer comprising at least the structural unit represented by general formula (1) and the structural unit represented by general formula (4).

[14] The thermoplastic resin according to item [13], wherein the copolymer further comprises a structural unit represented by general formula (4-1):

[Chemical Formula 16]

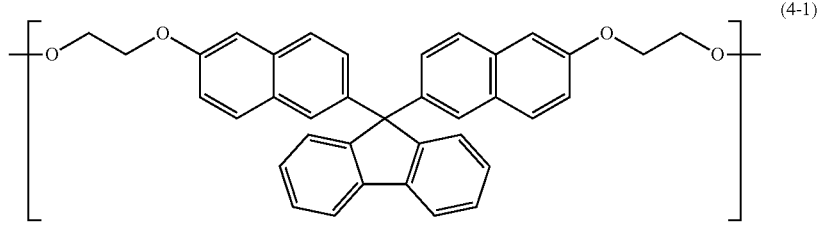

(4-1)

[15] The thermoplastic resin according to any one of items [1] to [14], which comprises the structural units represented by general formulae (3) and (4) in an amount of 20 to 80 mol % in total.

[16] The thermoplastic resin according to any one of items [1] to [15], which further comprises at least one of structural units represented by general formula (5):

[Chemical Formula 17]

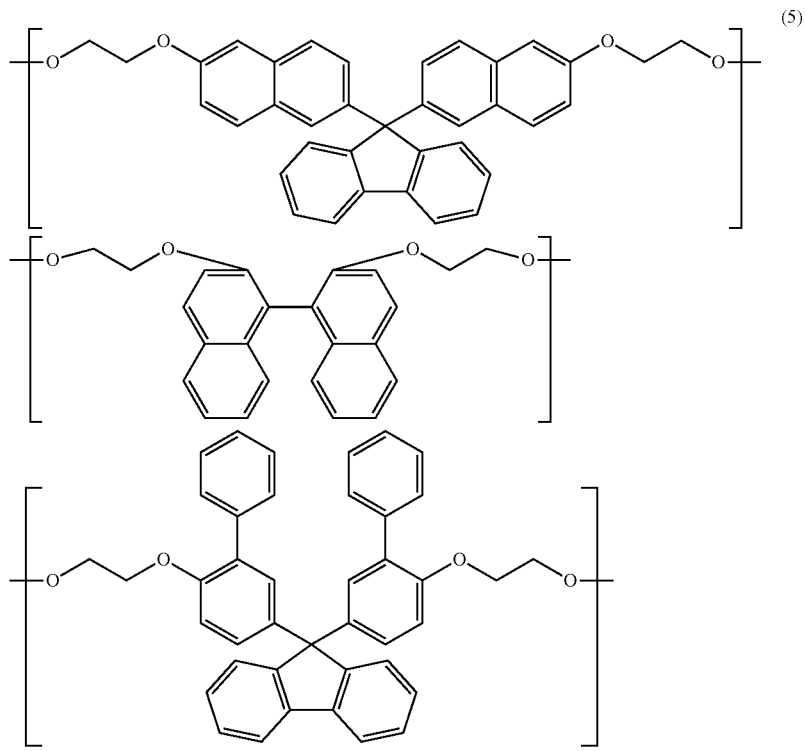

(5)

[17] The thermoplastic resin according to item [16], which comprises at least a structural unit of BNEF (9,9-bis (6-(2-hydroxyethoxy)naphthalene-2-yl)fluorene).

[18] The thermoplastic resin according to item [16], which comprises at least a structural unit of 2,2'-bis(2-hydroxyethoxy)-1,1'-binaphthalene.

[19] The thermoplastic resin according to item [16], which further comprises at least a structural unit of BPPEF (9,9-bis(4-(2-hydroxyethoxy)-3-phenylphenyl)fluorene).

[20] The thermoplastic resin according to any one of items [1] to [19], wherein the aryl group is selected from among a pyrenyl group, a furanyl group, a benzodioxanyl group, a dihydrobenzofuranyl group, a piperonyl group, a benzofuranyl group, a dibenzofuranyl group, a pyrrolidinyl group, an isoquinolyl group, a pyrimidinyl group and a carbazole group, which may be substituted with an alkyl group having 1 to 6 carbon atoms, an alkoxy group having 1 to 6 carbon atoms or an aryl group having 6 to 16 carbon atoms.

[21] The thermoplastic resin according to any one of items [1] to [20], which has a refractive index of 1.655 or higher.

[22] The thermoplastic resin according to any one of items [1] to [20], wherein said $R_1$ and said $R_2$ are the same.

[23] The thermoplastic resin according to any one of items [1] to [20], wherein said $R_1$ and said $R_2$ may be the same or different from each other and are selected from among a monocyclic or polycyclic aryl group having 6 to 36 carbon atoms and a monocyclic or polycyclic heteroaryl group having 5 to 36 ring atoms where 1, 2, 3 or 4 of the ring atoms are selected from nitrogen, sulfur and oxygen while the other ring atoms are carbon atoms, wherein the monocyclic or polycyclic aryl group and the monocyclic or polycyclic heteroaryl group are unsubstituted.

[24] The thermoplastic resin according to any one of items [1] to [23], wherein said $R_1$ and said $R_2$ are selected from the group consisting of:

azulenyl;

indenyl, which may be unsubstituted or substituted with 2, 3, 4 or 5 substituents selected from the group consisting of phenyl and polycyclic aryl having 2, 3 or 4 phenyl rings, which may be mutually bonded by a single bond, and which may be mutually condensed directly and/or condensed by a saturated or unsaturated 4- to 10-membered monocyclic or bicyclic hydrocarbon ring;

unsubstituted phenyl;

phenyl substituted with 1 or 2 CN groups;

phenyl, which is substituted with 2, 3, 4 or 5 substituents selected from among phenyl and polycyclic aryl having 2, 3 or 4 phenyl rings, which may be mutually bonded by a single bond, and which may be mutually condensed directly and/or condensed by a saturated or unsaturated 4- to 10-membered monocyclic or bicyclic hydrocarbon ring; and polycyclic aryl having 2, 3 or 4 phenyl rings, which may be mutually condensed directly and/or condensed by a saturated or unsaturated 4- to 10-membered monocyclic or bicyclic hydrocarbon ring, wherein the polycyclic aryl may be unsubstituted or substituted with 1 or 2 substituents selected from among phenyl and polycyclic aryl having 2 or 3 phenyl rings, and wherein said 2 or 3 phenyl rings may be mutually bonded by a single bond, and may be mutually condensed directly and/or condensed by a saturated 4- to 10-membered monocyclic or bicyclic hydrocarbon ring, and wherein the phenyl rings of the polycyclic aryl are unsubstituted or have 1 or 2 substituents $R^a$.

[25] The thermoplastic resin according to any one of items [1] to [24], wherein said $R_1$ and said $R_2$ are selected from the group consisting of:

phenyl, which may be unsubstituted or substituted with 1, 2, 3, 4 or 5 phenyl groups;
phenyl substituted with 1 or 2 CN groups;
phenyl, which is substituted with 1 or 2 polycyclic aryl groups selected from among biphenyl, naphthyl, fluorenyl, anthracenyl, phenanthryl and pyrenyl, and which may be further substituted with a phenyl group;
naphthyl, which is unsubstituted or substituted with 1 or 2 substituents selected from among CN, phenyl, and polycyclic aryl selected from among biphenyl, naphthyl, fluorenyl, anthracenyl, phenanthryl and pyrenyl;
biphenylenyl;
triphenylenyl;
tetraphenylenyl;
phenanthryl;
pyrenyl;
9H-fluorenyl;
dibenzo[a,e][8]annulenyl;
perylenyl; and
9,9'-spirobi[9H-fluorene]yl.

[26] The thermoplastic resin according to item [25], wherein said $R_1$ and said $R_2$ are selected from the group consisting of phenyl, 2-cyanophenyl, 3-cyanophenyl, 4-cyanophenyl, 2-naphthyl, 1-naphthyl and 9-naphthyl.

[27] The thermoplastic resin according to any one of items [1] to [23], wherein said $R_1$ and said $R_2$ are selected from the group consisting of:
a heteroaromatic monocyclic group having 5 or 6 ring atoms, which has 1, 2, 3 or 4 nitrogen atoms, or one oxygen atom and 0, 1, 2 or 3 nitrogen atoms, or one sulfur atom and 0, 1, 2 or 3 nitrogen atoms, wherein the other ring atoms are carbon atoms;
a heteroaromatic polycyclic group, which has the heteroaromatic monocycle and 1, 2, 3, 4 or 5 additional aromatic rings selected from among phenyl and a heteroaromatic monocycle, wherein (hetero)aromatic rings of polycyclic heteroaryl may be mutually bonded by a covalent bond, and may be mutually condensed directly and/or condensed by a saturated or unsaturated 4- to 10-membered monocyclic or bicyclic hydrocarbon ring; and
a heteroaromatic polycyclic group, which has: at least one saturated or partially-unsaturated 5- or 6-membered heterocycle that has 1 or 2 heteroatoms selected from among oxygen, sulfur and nitrogen as ring atoms; and 1, 2, 3, 4 or 5 additional aromatic rings selected from among phenyl and the heteroaromatic monocycle, wherein at least one of the additional aromatic rings is directly condensed by a saturated or partially-unsaturated 5- or 6-membered heterocyclic group, and wherein additional aromatic rings other than aromatic rings of polycyclic heteroaryl may be mutually bonded by a covalent bond, and may be mutually condensed directly and/or condensed by a saturated or unsaturated 4- to 10-membered monocyclic or bicyclic hydrocarbon ring.

[28] The thermoplastic resin according to item [27], wherein said $R_1$ and said $R_2$ are selected from the group consisting of furyl, thienyl, pyrrolyl, imidazolyl, pyrazolyl, 1,2,3-triazolyl, 1,2,4-triazolyl, tetrazolyl, oxazolyl, isoxazolyl, 1,3,4-oxadiazolyl, 1,2,4-oxadiazolyl, pyridinyl, pyrazinyl, pyridazinyl, pyrimidinyl, triazinyl, benzofuryl, dibenzofuranyl, benzothienyl, dibenzothienyl, thianthrenyl, naphthofuryl, furo[3,2-b]furanyl, furo[2,3-b]furanyl, furo[3,4-b]furanyl, oxanthrenyl, indolyl, isoindolyl, carbazolyl, indolizinyl, benzopyrazolyl, benzimidazolyl, benzoxazolyl, benzo[cd]indolyl, 1H-benzo[g]indolyl, quinolinyl, isoquinolinyl, acridinyl, phenazinyl, quinazolinyl, quinoxalinyl, phenoxazinyl, benzo[b][1,5]naphthyldinyl, cinnolinyl, 1,5-naphthyridinyl, 1,8-naphthyridinyl, phenylpyrrolyl, naphthylpyrrolyl, dipyridinyl, phenylpyridinyl, naphthylpyridinyl, pyrido[4,3-b]indolyl, pyrido[3,2-b]indolyl, pyrido[3,2-g]quinolinyl, pyrido[2,3-b][1,8]naphthyridinyl, pyrrolo[3,2-b]pyridinyl, pteridinyl, purinyl, 911-xanthenyl, 2H-chromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g]chromenyl, pyrrolo[3,2,1-hi]indolyl, benzo[g]quinoxalinyl, benzo[f]quinoxalinyl and benzo[h]isoquinolinyl.

[29] The thermoplastic resin according to any one of items [1] to [28], wherein said X is an ethylene group.

[30] The thermoplastic resin according to any one of items [1] to [29], wherein the b value in accordance with JIS K 7105 is 10 or less.

[31] The thermoplastic resin according to any one of items [1] to [30], wherein the refractive index (nD) and Abbe number (v) meet the following relationship: $-0.0002v+1.6718<nD<-0.024v+2.124$.

[32] The thermoplastic resin according to item [31], wherein the refractive index (nD) and Abbe number (v) meet the following relationship: $-0.004v+1.744<nD<-0.024v+2.124$.

[33] The thermoplastic resin according to a Item [32], wherein the refractive index (nD) and Abbe number (v) meet the following relationship: $-0.02v+2.04<nD<-0.024v+2.124$.

[34] An optical lens containing the thermoplastic resin according to any one of items [1] to [33].

[35] A method for producing the thermoplastic resin according to any one of items [1] to [33], which includes at least melt-polycondensing a dihydroxy compound represented by general formula (6) and at least one of carboxylic acid, carboxylic acid monoester and carboxylic acid diester:

[Chemical Formula 18]

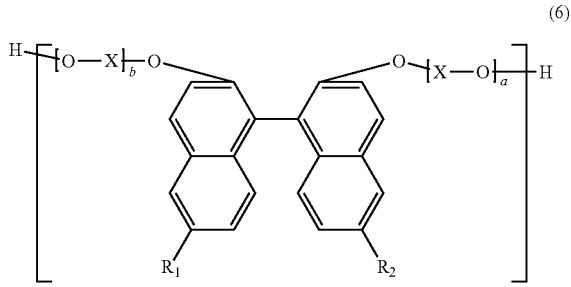

(6)

wherein:
$R_1$ and $R_2$ each independently represent a hydrogen atom, a fluorine atom, a chlorine atom, a bromine atom, an iodine atom, an alkyl group having 1 to 6 carbon atoms, a monocyclic or polycyclic aryl group having 6 to 36 carbon atoms, a monocyclic or polycyclic heteroaryl group having 5 to 36 ring atoms where 1, 2, 3 or 4 of the ring atoms are selected from nitrogen, sulfur and oxygen while the other ring atoms are carbon atoms, an alkenyl group having 2 to 6 carbon atoms, an alkoxy group having 1 to 6 carbon atoms or an aralkyl group having 7 to 17 carbon atoms;
the monocyclic or polycyclic aryl group and the monocyclic or polycyclic heteroaryl group may be unsubstituted or have 1 or 2 $R^a$ groups selected from the group consisting of CN, CH$_3$, OCH$_3$, O-phenyl, O-naphthyl, S-phenyl, S-naphthyl and halogen;

with the proviso that both of R$_1$ and R$_2$ are not hydrogen;

X represents an alkylene group having 1 to 8 carbon atoms, a cycloalkylene group having 5 to 12 carbon atoms or an arylene group having 6 to 20 carbon atoms;

with the proviso that each of the alkylene group and the cycloalkylene group may be substituted to have a benzene ring; and a and b each independently represent an integer of 1 to 10.

[36] A crystalline solvate form of 6,6'-diphenyl-2,2'-bis(2-hydroxyethoxy)-1,1'-binaphthyl, which contains in its crystals, from 0.3 to 1.2 mol of an organic solvent per 1 mol of 6,6'-diphenyl-2,2'-bis(2-hydroxyethoxy)-1,1'-binaphthyl, where the organic solvent is selected from the group consisting of methanol, toluene, and methyl ethyl ketone.

[37] The crystalline solvate form of item [36], where the solvent is methanol.

[38] The crystalline solvate form of item [37], which in an X-ray powder diffraction diagram at 22° C. and Cu-Kα radiation displays the following three reflections, quoted as 2θvalues: 13.0±0.2°, 14.9±0.2° and 21.5±0.2°; and at least 3 of the following reflections, quoted as 2θvalues: 6.2±0.2°, 9.0±0.2°, 10.6 0.2°, 16.9 0.2°, 18.2±0.2°, 18.5±0.2°, 19.2±0.2°, 19.6±0.2°, 20.9±0.2°, 22.7±0.2°, 24.3±0.2°, 24.9±0.2°, 26.2±0.2°, 28.7±0.2° and 30.5±0.2°.

The crystalline solvate form of item [37] or item [38], which in a DSC recorded according to ISO 11357-3:2018 at a heating rate of 20 K/min shows an endothermic peak having an onset in the range of 97-101° C. and a peak maximum in the range from 108-115° C.

[40] The crystalline solvate form of any one of items [37] to [39], wherein the amount of methanol is from 0.3 to 1.0 mol per 1 mol of 6,6'-diphenyl-2,2'-bis(2-hydroxyethoxy)-1,1'-binaphthyl.

[41] The crystalline solvate form of item [36], where the solvent is toluene.

[42] The crystalline solvate form of item [41], which in an X-ray powder diffraction diagram at 22° C. and Cu-Kα radiation displays the following three reflections, quoted as 2θvalues: 5.2±0.2°, 7.7±0.2° and 21.6±0.2°; and at least one 3 of the following reflections, quoted as 2θvalues: 8.2±0.2°, 9.1±0.2°, 10.6±0.2°, 10.8 0.2°, 11.6±0.2°, 12.6±0.2°, 13.6±0.2°, 14.2±0.2°, 14.7±0.2°, 15.0±0.2°, 15.7±0.2°, 16.7±0.2°, 17.1±0.2°, 18.0±0.2°, 18.5±0.2°, 19.4±0.2°, 19.9±0.2°, 20.8±0.2°, 21.0±0.2°, 22.2±0.2°, 22.7±0.2°, 24.1±0.2°, 25.0±0.2°, 25.5±0.2°, 25.7±0.2°, 26.5±0.2°, 27.1±0.2° and 27.6±0.2°.

[43] The crystalline solvate form of item [41] or item [42], which in a DSC recorded according to ISO 11357-3:2018 at a heating rate of 20 K/min shows an endothermic peak having an onset in the range of 105-108° C. and a peak maximum in the range from 112-115° C.

[44] The crystalline solvate form of any one of items [41] to [43], wherein the amount of toluene is from 0.3 to 0.5 mol per 1 mol of 6,6'-diphenyl-2,2'-bis(2-hydroxyethoxy)-1,1'-binaphthyl.

[45] A crystalline form A of 6,6'-diphenyl-2,2'-bis(2-hydroxyethoxy)-1,1'-binaphthyl, which contains less than 0.1 mol of organic solvents per 1 mol of 6,6'-diphenyl-2,2'-bis(2-hydroxyethoxy)-1,1'-binaphthyl and which in an X-ray powder diffraction diagram at 22° C. and Cu-Kα radiation displays the following three reflections, quoted as 2θvalues: 20.9±0.2°, 21.4±0.2° and 23.7±0.2°; and at least one 3 of the following reflections, quoted as 2θvalues: 6.5±0.2°, 8.6±0.2°, 11.0±0.2°, 13.2±0.2°, 14.9±0.2°, 16.2±0.2°, 17.3±0.2°, 17.8±0.2°, 18.4±0.2° and 19.0±0.2°.

[46] The crystalline form of item [45], which in a DSC recorded according to ISO 11357-3:2018 at a heating rate of 20 K/min shows an endothermic peak having an onset in the range of 112-114° C. and a peak maximum in the range from 124-126° C.

[47] A crystalline form C of 6,6'-diphenyl-2,2'-bis(2-hydroxyethoxy)-1,1'-binaphthyl, which contains less than 0.1 mol of organic solvents per 1 mol of 6,6'-diphenyl-2,2'-bis(2-hydroxyethoxy)-1,1'-binaphthyl and which in an X-ray powder diffraction diagram at 22° C. and Cu-Kα radiation displays the following three reflections, quoted as 2θvalues: 5.1±0.2°, 7.6 0.2° and 21.0±0.2°; and at least 3 of the following reflections, quoted as 2θvalues: 8.2±0.2°, 9.2±0.2°, 10.4±0.2°, 10.8±0.2°, 11.6±0.2°, 12.8±0.2°, 13.4±0.2°, 14.5±0.2°, 15.2±0.2°, 15.6±0.2°, 16.6±0.2°, 17.4±0.2°, 17.9±0.2°, 18.5±0.2°, 19.2±0.2°, 19.9±0.2°, 20.4±0.2°, 21.8±0.2°, 22.2±0.2°, 22.6±0.2°, 13.4±0.2°, 24.0±0.2°, 25.7±0.2°, 27.3±0.2° and 27.9±0.2°.

[48] The crystalline form of item [47], which in a DSC recorded according to ISO 11357-3:2018 at a heating rate of 20 K/min shows an endothermic peak having an onset in the range of 112-114° C. and a peak maximum in the range from 124-126° C.

[49] The crystalline form of any one of items [33] to [48], wherein the crystals have an aspect ratio of at most 5:1.

[50] An amorphous form B of 6,6'-diphenyl-2,2'-bis(2-hydroxyethoxy)-1,1'-binaphthyl, having a purity of at least 99.0% by weight, based on organic matter, which contains less than 0.1 mol of organic solvents per 1 mol of 6,6'-diphenyl-2,2'-bis(2-hydroxyethoxy)-1,1'-binaphthyl and which in an X-ray powder diffraction diagram at 22° C. and Cu-Kα radiation displays no reflections at diffraction angles quoted as 2θvalues, in the range from 5° to 40° and which in a DSC recorded according to ISO 11357-3:2018 at a heating rate of 20 K/min does not show an endothermic peak in the range of 80-200° C.

[51] 6,6'-Diphenyl-2,2'-bis(2-hydroxyethoxy)-1,1'-binaphthyl wherein the total amount of impurities selected from the group consisting of 6,6'-diphenyl-2-(2-hydroxyethoxy)-2'-hydroxy-1,1'-binaphthyl, 6,6'-diphenyl-2,2'-bis-hydroxy-1,1'-binaphthyl and 6,6'-diphenyl-2-(2-hydroxyethoxy)-2'-(2-(2-hydroxyethoxy)-ethoxy)-1,1'-binaphthyl is less than 0.5% by weight, based on 100% by weight of 6,6'-diphenyl-2,2'-bis(2-hydroxyethoxy)-1,1'-binaphthyl.

[52] 6,6'-Diphenyl-2,2'-bis(2-hydroxyethoxy)-1,1'-binaphthyl which has at last one of the following features:
  i. a yellowness index Y.I. of less than 3.0, as determined in accordance with ASTM E313 from a 5% w/w solution of 6,6'-diphenyl-2,2'-bis(2-hydroxyethoxy)-1,1'-binaphthyl in dichloromethane;
  ii. a haze of less than 1.0 ntu, as determined from a 5% w/w solution of 6,6'-diphenyl-2,2'-bis(2-hydroxyethoxy)-1,1'-binaphthyl in dichloromethane.

[53] 6,6'-Diphenyl-2,2'-bis(2-hydroxyethoxy)-1,1'-binaphthyl of item [51] or item [52], which is present as one of the crystalline forms of any one of items [33] to [49] or as the amorphous form of item [50].

[54] The thermoplastic resin according to any one of items [1] to [33], comprising a structural unit derived from any one of the crystalline forms of items [33] to [49] and the amorphous form of item [50].

[55] The thermoplastic resin according to any one of items [1] to [33], comprising a structural unit derived from the 6,6'-diphenyl-2,2'-bis(2-hydroxyethoxy)-1,1'-binaphthyl of any one of items [51] to [53].

[56] An optical lens containing the thermoplastic resin according to item [54] or [55].

Advantageous Effect of the Invention

The thermoplastic resin of the present invention exhibits a high refractive index, a low b value and high moist heat resistance, in particular, a high refractive index. Further, by using the thermoplastic resin having the above-described excellent characteristics, an excellent optical lens can be obtained.

BEST MODE FOR CARRYING OUT THE INVENTION

Figure 1:
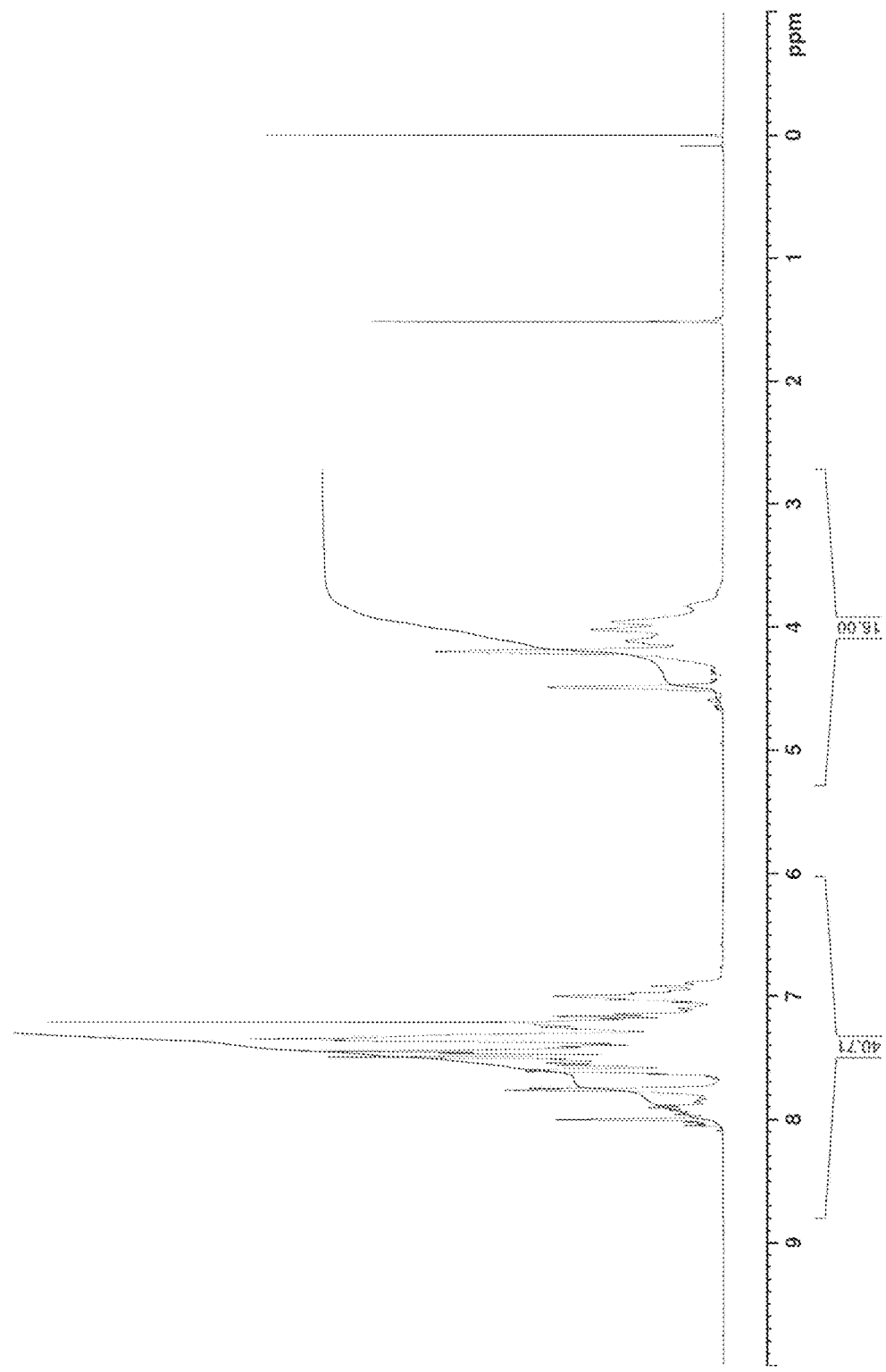
FIG. 1 is an H1-NMR chart of the resin produced in Example 2-B (BINOL-2EO/BNEF=50 mol/50 mol).

Hereinafter, the present invention will be described in detail.

(1) Components of Thermoplastic Resin (Structural Units)

The thermoplastic resin of the present invention comprises a structural unit represented by general formula (1) below. The type of the thermoplastic resin is not particularly limited as long as it has the below-described structural unit, but it is preferably a polyester resin, a polyester carbonate resin, a polycarbonate resin or a mixture of at least two of them.

Further, among the thermoplastic resins: the polyester resin has a polyester structural unit (repeat unit) comprising a (—RCO—O—) moiety and does not comprise any polycarbonate structural unit (repeat unit) comprising a (—RO—CO—O—) moiety; the polycarbonate resin has a polycarbonate structural unit (repeat unit) comprising a (—RO—CO—O—) moiety and does not comprise any polyester structural unit (repeat unit) comprising a (—RCO—O—) moiety; and the polyester carbonate resin has both a polyester structural unit (repeat unit) comprising a (—RO—CO—) moiety and a polycarbonate structural unit (repeat unit) comprising a (—RO—CO—O—) moiety (each R represents a hydrocarbon group or the like).

[Chemical Formula 19]

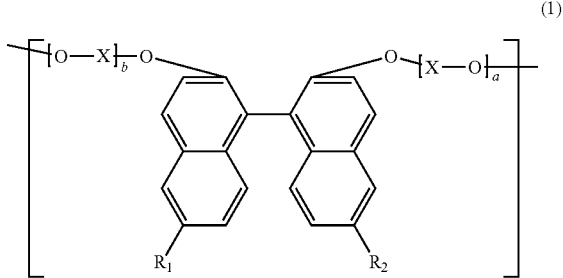

(1)

(In formula (1):

$R_1$ and $R_2$ each independently represent a hydrogen atom, a fluorine atom, a chlorine atom, a bromine atom, an iodine atom, an alkyl group having 1 to 6 carbon atoms, a monocyclic or polycyclic aryl group having 6 to 36 carbon atoms, a monocyclic or polycyclic heteroaryl group having 5 to 36 ring atoms where 1, 2, 3 or 4 of the ring atoms are selected from nitrogen, sulfur and oxygen while the other ring atoms are carbon atoms, an alkenyl group having 2 to 6 carbon atoms, an alkoxy group having 1 to 6 carbon atoms or an aralkyl group having 7 to 17 carbon atoms;

the monocyclic or polycyclic aryl group and the monocyclic or polycyclic heteroaryl group may be unsubstituted or have 1 or 2 $R^a$ groups selected from the group consisting of CN, $CH_3$, $OCH_3$, O-phenyl, O-naphthyl, S-phenyl, S-naphthyl and halogen;

with the proviso that both of $R_1$ and $R_2$ are not hydrogen;

X represents an alkylene group having 1 to 8 carbon atoms, a cycloalkylene group having 5 to 12 carbon atoms or an arylene group having 6 to 20 carbon atoms;

with the proviso that each of the alkylene group and the cycloalkylene group may be substituted to have a benzene ring; and a and b each independently represent an integer of 1 to 10.)

Each of $R_1$ and $R_2$ in general formula (1) above is preferably a hydrogen atom, an alkyl group having 1 to 4 carbon atoms, an aryl group having 6 to 30 carbon atoms, an alkenyl group having 2 to 4 carbon atoms, an alkoxy group having 1 to 4 carbon atoms or an aralkyl group having 7 to 12 carbon atoms, more preferably an aryl group having 6 to 20 carbon atoms, and even more preferably an aryl group having 6 to 14 carbon atoms. Further, at least one of $R_1$ to $R_{10}$ in general formula (1) is preferably an aryl group having 6 to 20 carbon atoms, and more preferably an aryl group having 6 to 14 carbon atoms, and it is particularly preferred that at least two of $R_1$ to $R_{10}$ are an aryl group having 6 to 14 carbon atoms or 6 to 12 carbon atoms.

$R_1$ and $R_2$ are, for example, the same.

Further, $R_1$ and $R_2$ may be the same or different from each other and may be selected from among a monocyclic or polycyclic aryl group having 6 to 36 carbon atoms and a monocyclic or polycyclic heteroaryl group having 5 to 36 ring atoms where 1, 2, 3 or 4 of the ring atoms are selected from nitrogen, sulfur and oxygen while the other ring atoms are carbon atoms. In this regard, the monocyclic or polycyclic aryl group and the monocyclic or polycyclic heteroaryl group may be unsubstituted.

$R_1$ and $R_2$ may be respectively selected from the group consisting of:
azulenyl;
indenyl, which may be unsubstituted or substituted with 2, 3, 4 or 5 substituents selected from the group consisting of phenyl and polycyclic aryl having 2, 3 or 4 phenyl rings, which may be mutually bonded by a single bond, and which may be mutually condensed directly and/or condensed by a saturated or unsaturated 4- to 10-membered monocyclic or bicyclic hydrocarbon ring;
unsubstituted phenyl;
phenyl substituted with 1 or 2 CN groups;
phenyl, which is substituted with 2, 3, 4 or 5 substituents selected from among phenyl and polycyclic aryl having 2, 3 or 4 phenyl rings, which may be mutually bonded by a single bond, and which may be mutually condensed directly and/or condensed by a saturated or unsaturated 4- to 10-membered monocyclic or bicyclic hydrocarbon ring; and
polycyclic aryl having 2, 3 or 4 phenyl rings, which may be mutually condensed directly and/or condensed by a saturated or unsaturated 4- to 10-membered monocyclic or bicyclic hydrocarbon ring, wherein the polycyclic aryl may be unsubstituted or substituted with 1 or 2 substituents selected from among phenyl and polycyclic aryl having 2 or 3 phenyl rings, and wherein said 2 or 3 phenyl rings may be mutually bonded by a single bond, and may be mutually condensed directly and/or condensed by a saturated 4- to 10-membered monocyclic or bicyclic hydrocarbon ring, and wherein the phenyl rings of the polycyclic aryl are unsubstituted or have 1 or 2 substituents $R^a$.

Further, $R_1$ and $R_2$ may be respectively selected from the group consisting of:
phenyl, which may be unsubstituted or substituted with 1, 2, 3, 4 or 5 phenyl groups;
phenyl substituted with 1 or 2 CN groups;
phenyl, which is substituted with 1 or 2 polycyclic aryl groups selected from among biphenyl, naphthyl, fluorenyl, anthracenyl, phenanthryl and pyrenyl, and which may be further substituted with a phenyl group;
naphthyl, which is unsubstituted or substituted with 1 or 2 substituents selected from among CN, phenyl, and polycyclic aryl selected from among biphenyl, naphthyl, fluorenyl, anthracenyl, phenanthryl and pyrenyl;
biphenylenyl;
triphenylenyl;
tetraphenylenyl;
phenanthryl;
pyrenyl;
9H-fluorenyl;
dibenzo[a,e][8]annulenyl;
perylenyl; and
9,9'-spirobi[9H-fluorene]yl.

In this regard, $R_1$ and $R_2$ are preferably selected from the group consisting of phenyl, 2-cyanophenyl, 3-cyanophenyl, 4-cyanophenyl, 2-naphthyl, 1-naphthyl and 9-naphthyl.

Further, $R_1$ and $R_2$ may be respectively selected from the group consisting of:
a heteroaromatic monocyclic group having 5 or 6 ring atoms, which has 1, 2, 3 or 4 nitrogen atoms, or one oxygen atom and 0, 1, 2 or 3 nitrogen atoms, or one sulfur atom and 0, 1, 2 or 3 nitrogen atoms, wherein the other ring atoms are carbon atoms;
a heteroaromatic polycyclic group, which has the heteroaromatic monocycle and 1, 2, 3, 4 or 5 additional aromatic rings selected from among phenyl and a heteroaromatic monocycle, wherein (hetero)aromatic rings of polycyclic heteroaryl may be mutually bonded by a covalent bond, and may be mutually condensed directly and/or condensed by a saturated or unsaturated 4- to 10-membered monocyclic or bicyclic hydrocarbon ring; and
a heteroaromatic polycyclic group, which has: at least one saturated or partially-unsaturated 5- or 6-membered heterocycle that has 1 or 2 heteroatoms selected from among oxygen, sulfur and nitrogen as ring atoms; and 1, 2, 3, 4 or 5 additional aromatic rings selected from among phenyl and the heteroaromatic monocycle, wherein at least one of the additional aromatic rings is directly condensed by a saturated or partially-unsaturated 5- or 6-membered heterocyclic group, and wherein additional aromatic rings other than aromatic rings of polycyclic heteroaryl may be mutually bonded by a covalent bond, and may be mutually condensed directly and/or condensed by a saturated or unsaturated 4- to 10-membered monocyclic or bicyclic hydrocarbon ring.

Further, $R_1$ and $R_2$ may be respectively selected from the group consisting of furyl, thienyl, pyrrolyl, imidazolyl, pyrazolyl, 1,2,3-triazolyl, 1,2,4-triazolyl, tetrazolyl, oxazolyl, isoxazolyl, 1,3,4-oxadiazolyl, 1,2,4-oxadiazolyl, pyridinyl, pyrazinyl, pyridazinyl, pyrimidinyl, triazinyl, benzofuryl, dibenzofuranyl, benzothienyl, dibenzothienyl, thianthrenyl, naphthofuryl, furo[3,2-b]furanyl, furo[2,3-b]furanyl, furo[3,4-b]furanyl, oxanthrenyl, indolyl, isoindolyl, carbazolyl, indolizinyl, benzopyrazolyl, benzimidazolyl, benzoxazolyl, benzo[cd]indolyl, 1H-benzo[g]indolyl, quinolinyl, isoquinolinyl, acridinyl, phenazinyl, quinazolinyl, quinoxalinyl, phenoxazinyl, benzo[b][1,5]naphthyldinyl, cinnolinyl, 1,5-naphthyridinyl, 1,8-naphthyridinyl, phenylpyrrolyl, naphthylpyrrolyl, dipyridinyl, phenylpyridinyl, naphthylpyridinyl, pyrido[4,3-b]indolyl, pyrido[3,2-b]indolyl, pyrido[3,2-g]quinolinyl, pyrido[2,3-b][1,8]naphthyridinyl, pyrrolo[3,2-b]pyridinyl, pteridinyl, purinyl, 9H-xanthenyl, 2H-chromenyl, phenanthridinyl, phenanthrolinyl, furo[3,2-f][1]benzofuranyl, furo[2,3-f][1]benzofuranyl, furo[3,2-g]quinolinyl, furo[2,3-g]quinolinyl, furo[2,3-g]quinoxalinyl, benzo[g]chromenyl, pyrrolo[3,2,1-hi]indolyl, benzo[g]quinoxalinyl, benzo[f]quinoxalinyl and benzo[h]isoquinolinyl.

X in general formula (1) above is preferably an alkylene group having 2 to 4 carbon atoms, a cycloalkylene group having 5 to 8 carbon atoms or an arylene group having 6 to 14 carbon atoms, more preferably an alkylene group having 2 or 3 carbon atoms, a cycloalkylene group having 5 to 6 carbon atoms or an arylene group having 6 to 10 carbon atoms, and particularly preferably an alkylene group having 2 or 3 carbon atoms, for example, an ethylene group.

Further, each of a and b in general formula (1) above is preferably an integer of 1 to 6, more preferably 1 to 4, and particularly preferably 2 or 3.

The thermoplastic resin is, for example, a polyester resin or a polyester carbonate resin. Further, it is preferred that the polyester resin or polyester carbonate resin further comprises a structural unit represented by general formula (2) below.

[Chemical Formula 20]

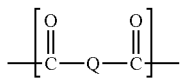

(2)

In general formula (2), Q is represented by formula (2a) below.

[Chemical Formula 21]

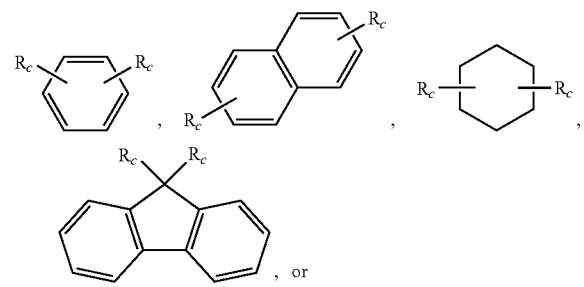

(2a)

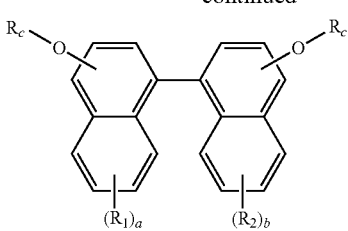

In formula (2a), $R_C$s are each independently a single bond that bonds to a CO group in formula (2) or an alkylene group, which may have a substituent, wherein the total carbon number is 1 to 10, and which includes a point of bonding to the CO group in formula (2) at the end. $R_C$s are preferably a single bond or an alkylene group, wherein the total carbon number is 1 to 3.

Q in formula (2) is preferably represented by formula (2b) below.

[Chemical Formula 22]

(2b)

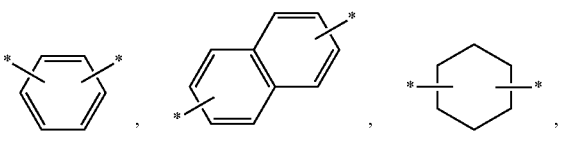

, or

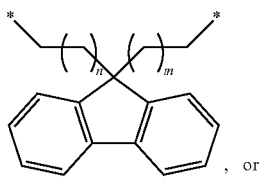

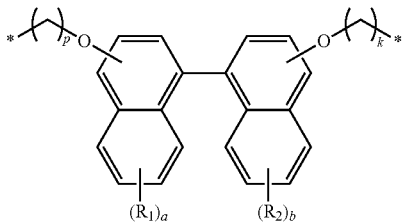

In formula (2b), n and m are each independently an integer of 0 to 5, and preferably an integer of 1 to 3.

p and k are each independently an integer of 1 to 5, and preferably an integer of 1 to 3.

$R_1$ and $R_2$ are the same as $R_1$ and $R_2$ in formula (1).

a and b are each independently an integer of 0 to 6, preferably an integer of 1 to 3, and more preferably an integer of 1 or 2.

Further, * represents the point of bonding to the CO group in formula (2).

Q in formula (2) is more preferably represented by formula (2c) below.

[Chemical Formula 23]

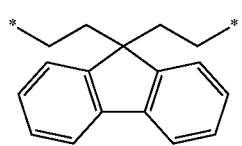
(2c)

In formula (2c), * represents the point of bonding to the CO group in formula (2).

The structural unit represented by general formula (1) above preferably comprises at least one of structural units represented by general formulae (A-1) to (A-7) below.

[Chemical Formula 24]

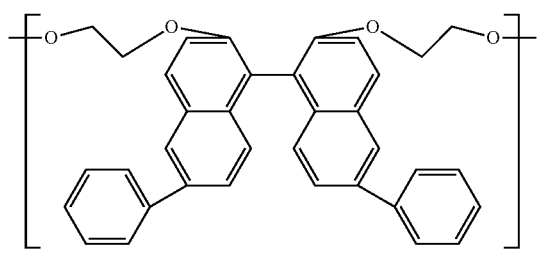
(A-1)

[Chemical Formula 25]

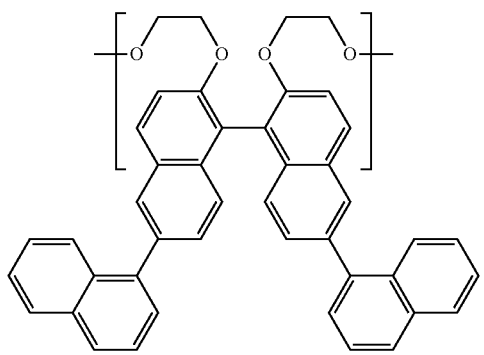
(A-2)

[Chemical Formula 26]

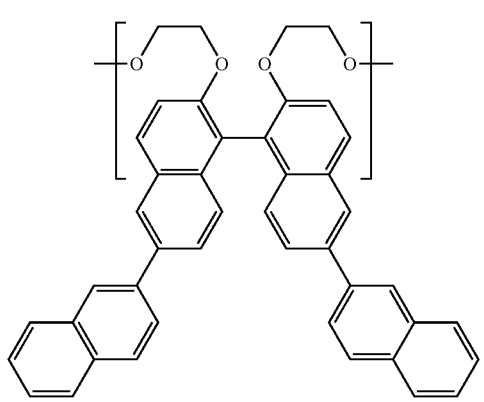
(A-3)

-continued

[Chemical Formula 27]

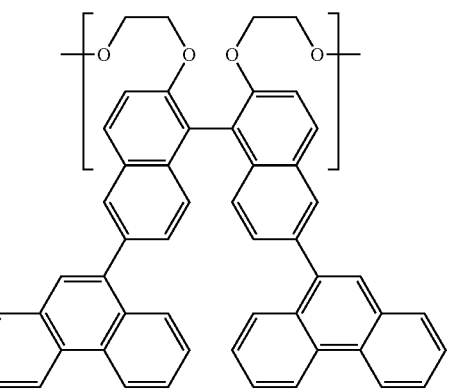
(A-4)

[Chemical Formula 28]

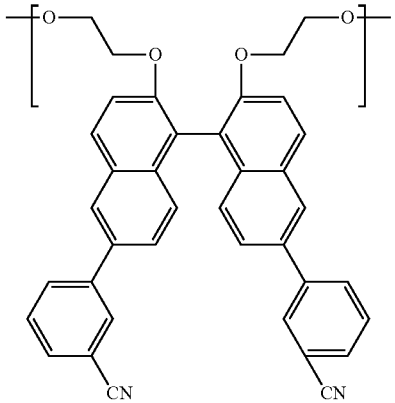
(A-5)

[Chemical Formula 29]

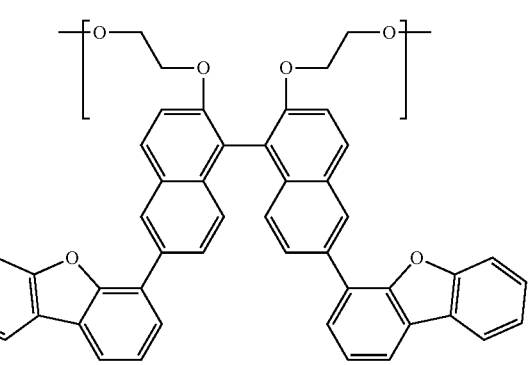
(A-6)

[Chemical Formula 30]

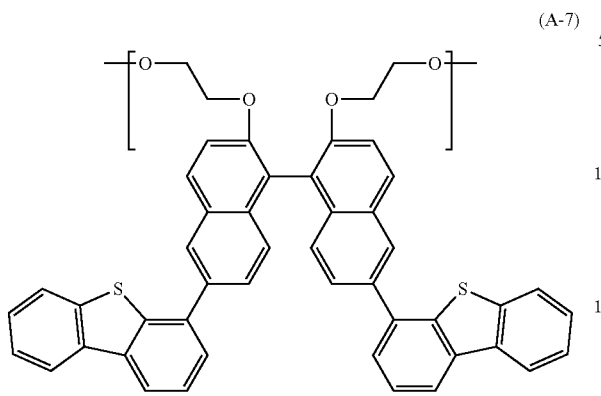

(A-7)

Specifically, the structural unit represented by general formula (1) preferably comprises at least one of: a structural unit derived from (BINL-2EO (2,2'-bis(2-hydroxyethoxy)-6,6'-diphenyl-1,1'-binaphthalene) represented by general formula (A-1); a structural unit derived from DNBINOL-2EO (2,2'-bis(2-hydroxyethoxy)-6,6'-di(naphthalene-1-yl)-1,1'-binaphthalene) represented by general formula (A-2); a structural unit derived from 2DNBINOL-2EO (2,2'-bis(2-hydroxyethoxy)-6,6'-di(naphthalene-2-yl)-1,1'-binaphthalene) represented by general formula (A-3); a structural unit derived from 9DPNBINOL-2EO (2,2'-bis(2-hydroxyethoxy)-6,6'-di(phenanthrene-9-yl)-1,1'-binaphthalene) represented by general formula (A-4); a structural unit derived from (CN-BNA (6,6'-di-(3-cyanophenyl)-2,2'-bis-(2-hydroxyethoxy)-1,1'-binaphthalene) represented by general formula (A-5); a structural unit derived from (FUR-BNA (6,6'-di-(dibenzo[b,d]furan-4-yl)-2,2'-bis-(2-hydroxyethoxy)-1,1'-binaphthalene) represented by general formula (A-6); and a structural unit derived from (THI-BNA (6,6'-di-(dibenzo[b,d]thiene-4-yl)-2,2'-bis-(2-hydroxyethoxy)-1,1'-binaphthalene) represented by general formula (A-7).

The thermoplastic resin of the present invention comprises the structural unit represented by general formula (1) in an amount of preferably more than 50 mol %, more preferably more than 60 mol %, even more preferably more than 70 mol %, and particularly preferably more than 80 mol % or more than 90 mol %. Further, the thermoplastic resin of the present invention may be formed only by the structural unit represented by general formula (1).

The thermoplastic resin of the present invention may comprise at least one of other structural units in addition to the structural unit represented by general formula (1) (structural unit (1)). As the other structural units, a fluorene derivative unit, etc. are preferred.

Specifically, it is preferred that the thermoplastic resin of the present invention further comprises at least one of structural units represented by general formulae (3) and (4).

[Chemical Formula 31]

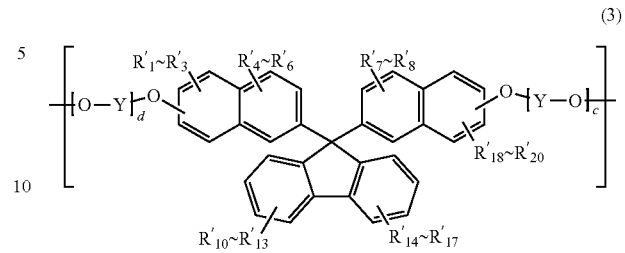

(3)

(In formula (3):
$R'_1$ to $R'_{20}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;
Y represents an alkylene group having 1 to 8 carbon atoms, a cycloalkylene group having 5 to 12 carbon atoms or an arylene group having 6 to 20 carbon atoms; and c and d each independently represent an integer of 1 to 10.)

Each of $R'_1$ to $R'_{20}$ in general formula (3) is preferably a hydrogen atom, an alkyl group having 1 to 4 carbon atoms, an aryl group having 6 to 12 carbon atoms, an alkenyl group having 2 to 4 carbon atoms, an alkoxy group having 1 to 4 carbon atoms or an aralkyl group having 7 to 12 carbon atoms, and more preferably hydrogen.

Y in general formula (3) is preferably an alkylene group having 2 to 4 carbon atoms, a cycloalkylene group having 5 to 8 carbon atoms or an arylene group having 6 to 14 carbon atoms, more preferably an alkylene group having 2 or 3 carbon atoms, a cycloalkylene group having 5 to 6 carbon atoms or an arylene group having 6 to 10 carbon atoms, and particularly preferably an alkylene group having 2 or 3 carbon atoms.

Further, each of c and d in general formula (3) is preferably an integer of 1 to 6, more preferably 1 to 4, and particularly preferably 2 or 3.

[Chemical Formula 32]

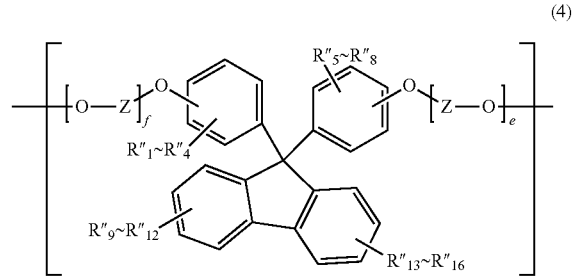

(4)

(In formula (4):
$R''_1$ to $R''_{16}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;

Z represents an alkylene group having 1 to 8 carbon atoms, a cycloalkylene group having 5 to 12 carbon atoms or an arylene group having 6 to 20 carbon atoms; and e and f each independently represent an integer of 1 to 10.)

Each of $R''_1$ to $R''_{16}$ in general formula (4) is preferably a hydrogen atom, an alkyl group having 1 to 4 carbon atoms, an aryl group having 6 to 12 carbon atoms, an alkenyl group having 2 to 4 carbon atoms, an alkoxy group having 1 to 4 carbon atoms or an aralkyl group having 7 to 12 carbon atoms, and more preferably hydrogen or an aryl group having 6 to 10 carbon atoms.

Z in general formula (4) is preferably an alkylene group having 2 to 4 carbon atoms, a cycloalkylene group having 5 to 8 carbon atoms or an arylene group having 6 to 14 carbon atoms, more preferably an alkylene group having 2 or 3 carbon atoms, a cycloalkylene group having 5 to 6 carbon atoms or an arylene group having 6 to 10 carbon atoms, and particularly preferably an alkylene group having 2 or 3 carbon atoms.

Further, each of e and f in general formula (4) is preferably an integer of 1 to 6, more preferably 1 to 4, and particularly preferably 2 or 3.

It is preferred that the thermoplastic resin of the present invention comprises the structural unit (1) and in addition, as the structural unit represented by general formula (3) or (4), at least one of structural units represented by general formula (5) below.

[Chemical Formula 33]

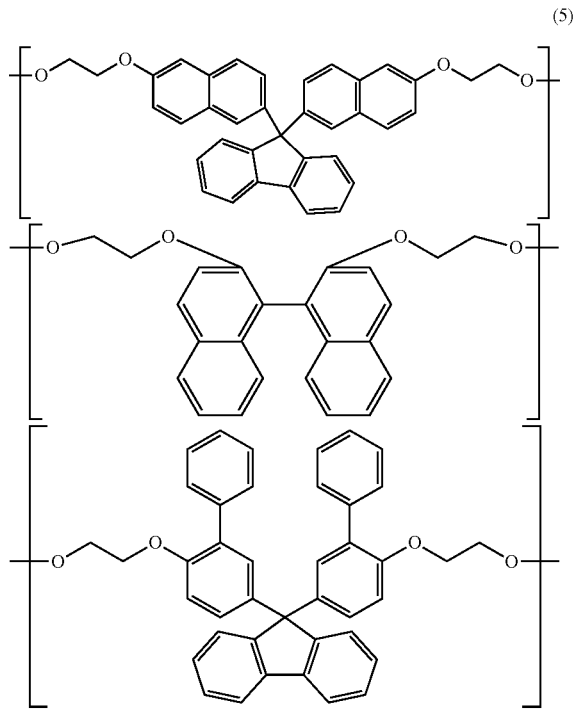

(5)

Specifically, it is preferred that the thermoplastic resin of the present invention comprises, in addition to the structural unit (1), at least one of a structural unit derived from BNEF (9,9-bis(6-(2-hydroxyethoxy)naphthalene-2-yl)fluorene), a structural unit derived from BNE (2,2'-bis(2-hydroxyethoxy)-1,1'-binaphthalene) and a structural unit derived from BPPEF (9,9-bis(4-(2-hydroxyethoxy)-3-phenylphenyl)fluorene) represented by general formula (5) above.

The thermoplastic resin of the present invention may comprise structural units other than the structural unit (1), preferably the structural units represented by general formulae (3) and (4) in an amount of 20 to 80 mol % in total, and for example, 25 to 75 mol %. For example, the thermoplastic resin comprises the structural units represented by general formulae (3) and (4) in an amount of 30 to 70 mol %, 35 to 65 mol % or 40 to 60 mol %.

Specifically, the molar ratio between the structural unit (1) and the structural unit (3) represented by general formula (3) in the thermoplastic resin composition of the present invention is, for example, 4:1 to 1:4 or 7:3 to 3:7. Further, the above-described molar ratio may be 65:35 to 35:65, and may be 3:2 to 2:3 or 1:1. However, since it is preferred that the thermoplastic resin composition comprises the structural unit (1) in an amount of more than 50 mol % as described above, preferred specific examples of the molar ratio between the structural unit (1) and the structural unit (3) are 4:1 to 1:1, 7:3 to 1:1, 65:35 to 1:1, 3:2 to 1:1, etc.

Note that the molar ratio between the structural unit (1) and the structural unit (4) represented by general formula (4) is the same as the molar ratio between the structural unit (1) and the structural unit (3).

The thermoplastic resin of the present invention may comprise a structure of either a random copolymer, block copolymer or alternating copolymer. Further, it is not necessary that all of the structural unit (1), the structural unit (3) and the structural unit (4) are contained in the same polymer molecule in the thermoplastic resin of the present invention. Specifically, as long as the above-described structural units are contained in the whole of a plurality of polymer molecules, the thermoplastic resin of the present invention may be a blend resin. For example, the thermoplastic resin containing all of the structural unit (1), the structural unit (3) and the structural unit (4) may be either a copolymer containing all of the structural units (1), (3) and (4), a mixture of a homopolymer or copolymer containing the structural unit (1), a homopolymer or copolymer containing the structural unit (2) and a homopolymer or copolymer containing the structural unit (4), or a blend resin of a copolymer containing the structural units (1) and (3) and a copolymer containing the structural units (1) and (4).

Another resin may be blended in the thermoplastic resin of the present invention to be provided to the production of a molded body. For example, when the thermoplastic resin is polyester, polyester carbonate or polycarbonate, examples of said another resin include polyamide, polyacetal, polycarbonate whose type is different from that of the thermoplastic resin, modified polyphenylene ether, polyethylene terephthalate and polybutylene terephthalate.

Further, to the thermoplastic resin composition of the present invention, an antioxidant, a mold release agent, a processing stabilizer, an ultraviolet absorber, a flowability improving agent, a crystal nucleating agent, a toughening agent, a dye, an antistatic agent, an antimicrobial agent or the like is preferably added.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl) isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. Among them, pentaerythritol tetrakis[3-(3,5-di-tert-butyl-4-hydroxyphenyl)propionate] is preferred. The content of the antioxidant in the thermoplastic resin composition is preferably 0.001 to 0.3 parts by weight relative to 100 parts by weight of the thermoplastic resin.

Regarding the mold release agent, it is preferred that 90% by weight or more of it is made of an ester of an alcohol and a fatty acid. Specific examples of the ester of an alcohol and a fatty acid include an ester of a monohydric alcohol and a fatty acid and a partial ester or whole ester of a polyhydric alcohol and a fatty acid. As the above-described ester of a monohydric alcohol and a fatty acid, an ester of a monohydric alcohol having 1 to 20 carbon atoms and a saturated fatty acid having 10 to 30 carbon atoms is preferred. Further, as the partial ester or whole ester of a polyhydric alcohol and a fatty acid, a partial ester or whole ester of a polyhydric alcohol having 1 to 25 carbon atoms and a saturated fatty acid having 10 to 30 carbon atoms is preferred.

Specific examples of the ester of a monohydric alcohol and a saturated fatty acid include stearyl stearate, palmityl palmitate, butyl stearate, methyl laurate and isopropyl palmitate. Specific examples of the partial ester or whole ester of a polyhydric alcohol and a saturated fatty acid include whole esters or partial esters of monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritols such as dipentaerythritol hexastearate. Among them, monoglyceride stearate and monoglyceride laurate are particularly preferred. The content of these mold release agents is preferably 0.005 to 2.0 parts by weight, more preferably 0.01 to 0.6 parts by weight, and even more preferably 0.02 to 0.5 parts by weight relative to 100 parts by weight of the thermoplastic resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonate, tetrakis(2,4-di-t-butylphenyl)-4,3'-biphenylene diphosphonate, tetrakis(2,4-di-t-butylphenyl)-3,3'-biphenylene diphosphonate, bis(2,4-di-tert-butylphenyl)-4-phenyl-phenylphosphonate and bis(2,4-di-tert-butylphenyl)-3-phenyl-phenylphosphonate. Among them, bis(2,6-di-tert-butyl-4-methylphenyl) pentaerythritol diphosphite is preferred. The content of the phosphorus-based processing heat stabilizer in the thermoplastic resin composition is preferably 0.001 to 0.2 parts by weight relative to 100 parts by weight of the thermoplastic resin.

Examples of the sulfur-based processing heat stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based processing heat stabilizer in the thermoplastic resin composition is preferably 0.001 to 0.2 parts by weight relative to 100 parts by weight of the thermoplastic resin.

The ultraviolet absorber is preferably at least one ultraviolet absorber selected from the group consisting of a benzotriazole-based ultraviolet absorber, a benzophenone-based ultraviolet absorber, a triazine-based ultraviolet absorber, a cyclic iminoester-based ultraviolet absorber and a cyanoacrylate-based ultraviolet absorber. That is, ultraviolet absorbers mentioned below may be used solely, or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxybenzophenone-5-sulfonic acid hydrate, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2- nitro-p-phenylene)bis(3,1-benzoxazin-4-one) and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and even more preferably 0.05 to 0.8 parts by weight relative to 100 parts by weight of the thermoplastic resin. When the content is within these ranges, sufficient weatherability can be imparted to the thermoplastic resin composition according to intended use.

In a thermoplastic resin composition, for example, in a polycarbonate resin composition, phenol produced at the time of the production and carbonic acid diester which is unreacted and remains are present as impurities. The phenol content in the thermoplastic resin composition is preferably 0.1 to 3000 ppm, more preferably 0.1 to 2000 ppm, and even more preferably 1 to 1000 ppm, 1 to 800 ppm, 1 to 500 ppm or 1 to 300 ppm. Further, the carbonic acid diester content in the thermoplastic resin composition is preferably 0.1 to 1000 ppm, more preferably 0.1 to 500 ppm, and particularly preferably 1 to 100 ppm. By adjusting the amounts of phenol and carbonic acid diester contained in the thermoplastic resin composition, a resin having physical properties appropriate for purposes can be obtained. The adjustment of the phenol content and the carbonic acid diester content can be suitably carried out by changing conditions for polycondensation and apparatuses. The adjustment can also be carried out by changing conditions for the extrusion process after polycondensation.

When the content of phenol or carbonic acid diester is more than the above-described ranges, it may cause problems such as reduction in the strength of a resin molded body obtained and generation of odor. Meanwhile, when the content of phenol or carbonic acid diester is less than the above-described ranges, it may cause reduction in the plasticity of a resin at the time of melting.

(2) Characteristics of Thermoplastic Resin

The viscosity average molecular weight (Mv) of the thermoplastic resin of the present invention is preferably 8,000 to 20,000, more preferably 9,000 to 15,000, and even more preferably 10,000 to 14,000.

When Mv is less than 8,000, a molded body may become fragile. Further, when Mv is more than 20,000, the melt viscosity increases, resulting in difficulty in taking out a resin after the production, and in addition, the flowability is reduced and it may cause difficulty in injection molding in a molten state.

The refractive index (nD) of the thermoplastic resin of the present invention at 23° C. at a wavelength of 589 nm is preferably 1.635 or more, more preferably 1.645 or more, even more preferably 1.655 or more, and particularly preferably 1.665 or more or more than these values. For example, the refractive index of the thermoplastic resin of the present invention is preferably 1.640 to 1.710, more preferably 1.645 to 1.700, even more preferably 1.650 to 1.697, and particularly preferably 1.655 to 1.695. The thermoplastic resin of the present invention has a high refractive index (nD) and is suitable as an optical lens material. The refractive index can be measured by the method of JIS-K-7142 using a film having a thickness of 0.1 mm and an Abbe's refractometer.

The Abbe number (v) of the thermoplastic resin of the present invention is preferably 24 or less, more preferably 22 or less, and even more preferably 20 or less. The Abbe number can be calculated from refractive indexes at wavelengths of 486 nm, 589 nm and 656 nm at 23° C., using the below-described formula:

$$v=(nD-1)/(nF-nC)$$

nD: refractive index at a wavelength of 589 nm nC: refractive index at a wavelength of 656 nm nF: refractive index at a wavelength of 486 nm In consideration of use for injection molding, the glass transition temperature (Tg) of the thermoplastic resin of the present invention is preferably 90 to 185° C., more preferably 95 to 180° C., and even more preferably 100 to 175° C. When Tg is lower than 90° C., the operating temperature range may be narrowed. When Tg is higher than 185° C., the melting temperature of the resin increases, and decomposition and coloring of the resin may be easily caused. When the glass transition temperature of the resin is too high, in the case of using a widely-used mold temperature controller, the difference between the mold temperature and the glass transition temperature of the resin increases. For this reason, it may be difficult to use a resin having a too high glass transition temperature for applications which require exact surface accuracy of products. Further, from the viewpoint of molding flowability and molding heat resistance, the lower limit of Tg is preferably 130° C., and more preferably 135° C., and the upper limit of Tg is preferably 185° C., and more preferably 175° C.

The total light transmittance of an optical molded body obtained by using the thermoplastic resin of the present invention is preferably 85% or more, more preferably 87% or more, and particularly preferably 88% or more. When the total light transmittance is 85% or more, it is comparable to those of a bisphenol A-type polycarbonate resin, etc.

The thermoplastic resin of the present invention has high moist heat resistance. The moist heat resistance can be evaluated by conducting a "PCT test" (pressure cooker test) with respect to an optical molded body obtained by using the thermoplastic resin and measuring the total light transmittance of the optical molded body after the test. The PCT test can be conducted by keeping an injection-molded product having a diameter of 50 mm and a thickness of 3 mm under conditions of 120° C., 0.2 Mpa, 100% RH and 20 hours. The thermoplastic resin of the present invention has a total light transmittance after the PCT test of 60% or more, preferably 70% or more, more preferably 75% or more, even more preferably 80% or more, and particularly preferably 85% or more. When the total light transmittance is 60% or more, it can be said that the thermoplastic resin has moist heat resistance higher than that of conventional thermoplastic resins.

The b value indicating color phase of the thermoplastic resin of the present invention is preferably 5 or less. The smaller the b value is, the lower the yellowness is, and good color phase is obtained.

(3) Method for Producing Thermoplastic Resin

In the case where the thermoplastic resin having the structural unit represented by general formula (1) above is a polycarbonate resin, the production method thereof includes, for example, melt-polycondensing a dihydroxy compound represented by general formula (6) below and carbonic acid diester:

[Chemical Formula 34]

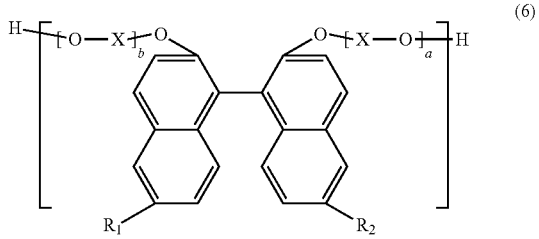

(In general formula (6):

$R_1$ and $R_2$ each independently represent a hydrogen atom, a fluorine atom, a chlorine atom, a bromine atom, an iodine atom, an alkyl group having 1 to 6 carbon atoms, a monocyclic or polycyclic aryl group having 6 to 36 carbon atoms, a monocyclic or polycyclic heteroaryl group having 5 to 36 ring atoms where 1, 2, 3 or 4 of the ring atoms are selected from nitrogen, sulfur and oxygen while the other ring atoms are carbon atoms, an alkenyl group having 2 to 6 carbon atoms, an alkoxy group having 1 to 6 carbon atoms or an aralkyl group having 7 to 17 carbon atoms;

with the proviso that both of $R_1$ and $R_2$ are not hydrogen;

X represents an alkylene group having 1 to 8 carbon atoms, a cycloalkylene group having 5 to 12 carbon atoms or an arylene group having 6 to 20 carbon atoms;

with the proviso that each of the alkylene group and the cycloalkylene group may be substituted to have a benzene ring; and a and b each independently represent an integer of 1 to 10.)

That is, the compound represented by general formula (6) above is used as a dihydroxy component and reacted with a carbonate precursor such as a carbonic acid diester, thereby producing a polycarbonate resin. Specifically, the compound represented by general formula (6) and a carbonate precursor such as a carbonic acid diester are subjected to a reaction by means of the melt polycondensation method in the presence or absence of a basic compound catalyst or a transesterification catalyst or a mixed catalyst made of both of them, thereby producing the polycarbonate resin.

Further, a polyester carbonate resin and a polyester resin can also be obtained by using the dihydroxy compound represented by general formula (6) above as a raw material (monomer).

The polyester carbonate resin or polyester resin can be produced, for example, by melt-polycondensing the dihydroxy compound represented by general formula (6) above and at least one of carboxylic acid, carboxylic acid monoester and carboxylic acid diester.

Specific examples of the carboxylic acid, carboxylic acid monoester and carboxylic acid diester include a dicarboxylic acid or monocarboxylic acid monoester or diester of 2,2'-bis(2-hydroxyethoxy)-6,6'-diphenyl-1,1'-binaphthalene (BINL-2EO), 9,9-fluorene-dipropionic acid, and 9,9-fluorene-methyl dipropionate (FDPM) that is a monoester or diester of 9,9-fluorene-dipropionic acid.

Specific examples of the carboxylic acid, carboxylic acid monoester and carboxylic acid diester further include a dicarboxylic acid or monocarboxylic acid monoester or diester of 2,2'-bis(2-hydroxyethoxy)-6,6'-di(naphthalene-1-yl)-1,1'-binaphthalene (DNBINOL-2EO), 2,2'-bis(2-hydroxyethoxy)-6,6'-di(naphthalene-2-yl)-1,1'-binaphthalene (2DNBINOL-2EO), 2,2'-bis(2-hydroxyethoxy)-6,6'-di(phenanthrene-9-yl)-1,1'-binaphthalene (9DPNBINOL-2EO), 6,6'-di-(3-cyanophenyl)-2,2'-bis-(2-hydroxyethoxy)-1,1'-binaphthyl (CN-BNA), 6,6'-di-(dibenzo[b,d]furan-4-yl)-2,2'-bis-(2-hydroxyethoxy)-1,1'-binaphthyl (FUR-BNA) or 6,6'-di-(3-cyanophenyl)-2,2'-bis-(2-hydroxyethoxy)-1,1'-binaphthyl (CN-BNA).

Examples of the compound of general formula (6) include 2,2'-bis(hydroxy(poly)alkoxy)-diaryl-1,1'-binaphthalenes and 2,2'-bis(hydroxy(poly)alkoxy)-dinaphthyl-1,1'-binaphthalenes. For example, 2,2'-bis(2-hydroxyethoxy)-6,6'-diphenyl-1,1'-binaphthalene, 2,2'-bis(2-hydroxyethoxy)-6,6'-di(naphthalene-1-yl)-1,1'-binaphthalene, 2,2'-bis(2-hydroxymethoxy)-6,6'-diphenyl-1,1'-binaphthalene, 2,2'-bis(2-hydroxymethoxy)-6,6'-di(naphthalene-1-yl)-1,1'-binaphthalene, 2,2'-bis(2-hydroxypropoxy)-6,6'-diphenyl-1,1'-binaphthalene and 2,2'-bis(2-hydroxypropoxy)-6,6'-di(naphthalene-1-yl)-1,1'-binaphthalene are preferred. These materials may be used solely, or two or more of them may be used in combination.

In the monomer for the production of the thermoplastic resin, together with the dihydroxy compound represented by general formula (6) above, a dihydroxy compound, wherein each of a and b in general formula (6) is 0, or a dihydroxy compound, wherein either a or b in general formula (6) is 0, may be contained as an impurity.

In the monomer mainly composed of the dihydroxy compound represented by general formula (6) above, the dihydroxy compounds, wherein at least one of the values of a and b is different from general formula (6) above, are contained in an amount of preferably 1000 ppm or less, more preferably 500 ppm or less, even more preferably 200 ppm or less, and particularly preferably 100 ppm or less in total. Moreover, the total content of the dihydroxy compounds, wherein at least one of the values of a and b is different from general formula (6) above, in the monomer is desirably 50 ppm or less, and more desirably 20 ppm or less.

The compound of general formula (6) can be produced by various synthesis methods. For example, it can be produced by (a) a method in which 1,1'-binaphthol is reacted with ethylene glycol monotosylate, (b) a method in which binaphthols are reacted with alkylene oxide, halogenoalkanol or alkylene carbonate, (c) a method in which 1,1'-binaphthol is reacted with ethylene carbonate, (d) a method in which 1,1'-binaphthol is reacted with ethylene carbonate, or the like as described in Japanese Laid-Open Patent Publication Nos. 2014-227387, 2014-227388, 2015-168658 and 2015-187098.

The monomers of the formula (6) may contain impurities, which may adversely affect the properties of the thermoplastic resin, in particular its optical properties. In particular, monomers of the formula (6) may contain one or more of the following side products of the general formulae (6a) and (6b) as impurities from their production process:

[Chemical Formula 35]

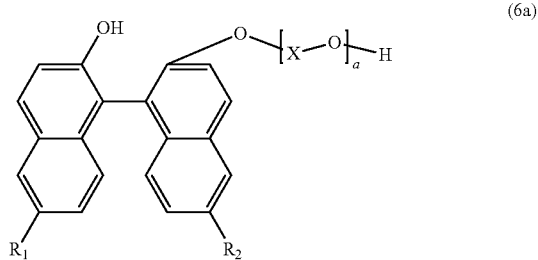

(6b)

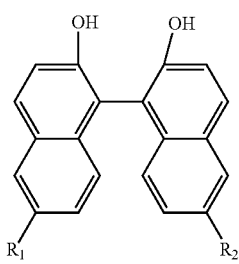

In some cases, the monomers of the formula (6) may contain the following side product of the general formula (6c) as an impurity from their production process additionally to or instead of the impurities of the formulae (6a) and (6b).

In formulae (6a), (6b) and (6c) the variables $R_1$, $R_2$ and X are as defined for the monomers of the formula (6). In the monomers of the formula (6) and likewise in formulae (6a) and (6c) the variable a is an integer in the range from 1-10, in particular in the range from 1 to 4, and especially 1, 2 or 3. In formula (6c) the variables b, c and d are an integer in the range from 1-10, in particular in the range from 1 to 4, and especially 1, 2 or 3. In the monomers of the formula (6) and likewise in the formulae (6a) and (6c) the variable X is in particular alkylene having 1 to 4 carbon atoms and especially ethylene, i.e. 1,2-ethandiyl or $CH_2CH_2$, respectively. In the monomers of the formula (6) and likewise in the formulae (6a), (6b) and (6c) the variables $R_1$ and $R_2$ are in particular a monocyclic or polycyclic aryl group having 6 to 36 carbon atoms or a monocyclic or polycyclic heteroaryl group having 6 to 36 carbon atoms, more particular an aryl group having 6 to 20 carbon atoms, in particular 6 to 14 carbon atoms and especially a group selected from the group consisting of phenyl, 1-naphthyl, 2-naphthyl, 9-phenanthryl, 4-dibenzo[b,d]furanyl and 4-dibenzo[b,d]-thienyl.

Preferably, the total weight of impurities of the formulae (6a) and (6b) in the monomers of the formula (6) applied in the method of the invention does not exceed 5000 ppm, based on 1 part by weight of the monomers of the formula (6). In particular, the total weight of impurities of the formulae (6a) and (6b) is at most 4000 ppm or less, more particularly at most 3000 ppm or less and especially at most 2000 ppm or less, based on 1 part by weight of the monomer of the formula (6). In particular, the weight of each impurity of the formulae (6a) and (6b) is preferably at most 2000 ppm or less, in particular at most 1500 ppm or less and especially at most 1000 ppm or less, based on 1 part by weight of the monomer of the formula (6). If present, the amount of the impurity of the formula (6c) will typically not exceed 2000 ppm and is frequently at most 1500 ppm or less, based on 1 part by weight of the monomer of the formula (6).

A particular group of embodiments of the invention relates to thermoplastic resins obtained by the method of the invention where in the monomers of the formula (6) both variables (a) and (b) are 1, hereinafter the monomers (6-1). In particular, monomers (6-1) may contain one or more of the following side products of the formulae (6a-1), (6-2) and (6b) and, in some cases, (6c-1) as impurities:

[Chemical Formula 36]

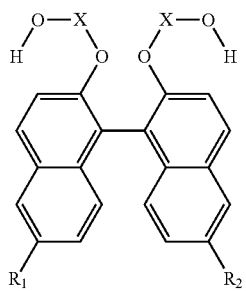

(6-1)

(6a-1)

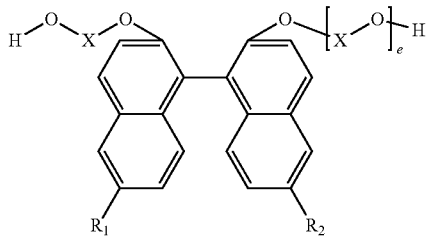

(6-2)

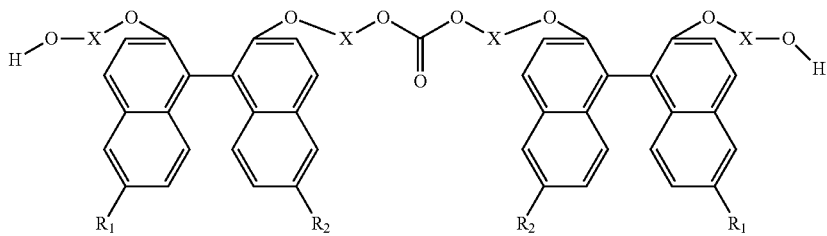

(6c-1)

In the formulae (6-1), (6a-1), (6-2) and (6c-1) the variable X is in particular alkylene having 1 to 4 carbon atoms and especially ethylene, i.e. 1,2-ethandiyl or $CH_2CH_2$, respectively. In the formula (6-2), the variable e is as defined for variable a and in particular 2 or 3. In the formulae (6-1), (6a-1), (6-2), (6b) and (6c-1) the variables $R_1$ and $R_2$ are in particular a monocyclic or polycyclic aryl group having 6 to 36 carbon atoms or a monocyclic or polycyclic heteroaryl group having 6 to 36 carbon atoms, more particular an aryl group having 6 to 20 carbon atoms, in particular 6 to 14 carbon atoms and especially a group selected from the group consisting of phenyl, 1-naphthyl, 2-naphthyl, 9-phenanthryl, 4-dibenzo[b,d]furanyl and 4-dibenzo[b,d]-thienyl.

Preferably, the total amount of impurities of the formulae (6a-1), (6-2) and (6b) in the monomers of the formula (6-1) applied in the method of the invention does not exceed 5000 ppm or less, based on 1 part by weight of the monomers of the formula (6). In particular, the total weight of impurities of the formulae (6a-1), (6-2) and (6b) is at most 4000 ppm or less, more particularly at most 3000 ppm or less and especially at most 2000 ppm or less, based on 1 part by weight of the monomer of the formula (6-1). In particular, the weight of each impurity of the formulae (6a-1), (6-2) and (6b) is preferably at most 2000 ppm or less, in particular at most 1500 ppm or less and especially at most 1000 ppm or less, based on 1 part by weight of the monomer of the formula (6). If present, the amount of the impurity of the formula (6c-1) will typically not exceed 2000 ppm and is frequently at most 1500 ppm or less, based on 1 part by weight of the monomer of the formula (6-1).

A particular group of embodiments of the invention relates to thermoplastic resins obtained by the method of the invention where in the monomer of the formula (6) is 6,6'-diphenyl-2,2'-bis(2-hydroxyethoxy)-1,1'-binaphthyl, i.e. the monomer of formula (6), wherein both variables (a) and (b) are 1, X is 1,2-ethandiyl and both variables $R_1$ and $R_2$ are phenyl. Here and in the following 6,6'-diphenyl-2,2'-bis(2-hydroxyethoxy)-1,1'-binaphthyl is abbreviated as 6,6'-DPBHBNA.

6,6'-DPBHBNA may contain one or more of the aforementioned impurities of the formulae (6a-1), (6-2), (6b) and (6c-1), where X is 1,2-ethandiyl and all variables $R_1$ and $R_2$ are phenyl and where the variable e in formula (6-2) is 2 or 3, in particular 2. The chemical name of the compound of the formula (6a-1), where X is 1,2-ethandiyl and both variables $R_1$ and $R_2$ are phenyl is 6,6'-diphenyl-2-(2-hydroxyethoxy)-2'-hydroxy-1,1'-binaphthyl. The chemical name of the compound of the formula (6-2), where X is 1,2-ethandiyl, e is 2 and both variables $R_1$ and $R_2$ are phenyl is 6,6'-diphenyl-2-(2-hydroxyethoxy)-2'-(2-(2-hydroxyethoxy)-ethoxy)-1,1'-binaphthyl. The chemical name of the compound of the formula (6b), where both variables $R_1$ and $R_2$ are phenyl is 6,6'-diphenyl-2,2'-bishydroxy-1,1'-binaphthyl. The chemical name of the compound of the formula (6c-1), where X is 1,2-ethandiyl and all variables $R_1$ and $R_2$ are phenyl is bis[2-[[1-[2-(2-hydroxyethoxy)-6-phenyl-1-naphthyl]-6-phenyl-2-naphthyl]oxy]ethyl]carbonate.

Preferably, in 6,6'-DPBHBNA applied in the method of the invention the total amount of said impurities of the formulae (6a-1), (6-2) and (6b), where X is 1,2-ethandiyl and all variables $R_1$ and $R_2$ are phenyl, does not exceed 5000 ppm or less, based on 1 part by weight of 6,6'-DPBHBNA. 6,6'-DPBHBNA, which has such a low amount of the aforementioned impurities is new and thus it is also part of the present invention. In particular, the total amount of impurities of the formulae (6a-1), (6-2) and (6b), where X is 1,2-ethandiyl and all variables $R_1$ and $R_2$ are phenyl, is at most 4000 ppm or less, more particularly at most 3000 ppm or less and especially at most 2000 ppm or less, based on 1 part by weight of 6,6'-DPBHBNA. In particular, the weight of each impurity of the formulae (6a-1), (6-2) and (6b), where X is 1,2-ethandiyl and all variables $R_1$ and $R_2$ are phenyl, is preferably at most 2000 ppm or less, in particular at most 1500 ppm or less and especially at most 1000 ppm or less, based on 1 part by weight of 6,6'-DPBHBNA. If present, the amount of the impurity of the formula (6c-1), where X is 1,2-ethandiyl and all variables $R_1$ and $R_2$ are phenyl, will typically not exceed 2000 ppm and is frequently at most 1500 ppm or less, based on 1 part by weight of 6,6'-DPBHBNA.

6,6'-DPBHBNA is prone to form crystalline solvates with certain organic solvents, in particular with methanol, toluene, anisole, xylene, chlorobenzene, tetrahydrofurane and aliphatic ketones such as 2-butanone, also termed methyl ethyl ketone (=MEK), and 4-methyl-2-pentanone, also termed methyl isobutyl ketone (=MIBK). In these solvates the amount of the respective organic solvent is typically in the range from 0.3 to 1.5 mol per 1 mol of 6,6'-DPBHBNA. Here and in the following, the term solvate is understood as a crystalline form, which contains a solvent within the crystal lattice of the crystalline form. These solvates are often termed "pseudo-polymorphs" to distinguish them from "polymorphs" which essentially do not contain a solvent. In the crystalline solvates of 6,6'-DPBHBNA the amount of solvent is not necessarily a stoichiometric amount with respect to of 6,6'-DPBHBNA but it may vary. Without being bound to theory, it is believed that the solvent molecules present in the crystalline solvates of 6,6'-DPBHBNA typically fill gaps or wholes within the crystal lattice formed by the 6,6'-DPBHBNA molecules.

Amongst the aforementioned solvents, methanol, toluene and methyl ethyl ketone are particularly suitable, as the crystalline solvates they form with 6,6'-DPBHBNA are usually obtained as compact crystals with a low aspect ratio, which do not tend to adhere mother liquor and which contain 6,6'-DPBHBNA in high purity. These crystalline solvates are therefore also part of the present invention.

The crystalline solvates of 6,6'-DPBHBNA with an organic solvent, which is selected from the group consisting of methanol, toluene and methyl ethyl ketone, allow for a purification of 6,6'-DPBHBNA to a purity of above 99%, in particular at least 99.5% or higher, especially 99.7% or higher.

If not stated otherwise, here and in the context of the solid forms of 6,6'-DPBHBNA, a purity of above 99% means that the total amount of organic impurities, i.e. organic compounds other than 6,6'-DPBHBNA and the optionally present solvent, which are contained in the respective solid form of 6,6'-DPBHBNA, is below 1% by weight. Likewise, a purity of at least 99.5% or at least 99.7% means that the total amount of organic impurities, i.e. organic compounds other than 6,6'-DPBHBNA and the optionally present solvent, which are contained in the respective solid form of 6,6'-DPBHBNA, is at most 0.5% by weight or at most 0.3% by weight, In the crystalline solvates of 6,6'-DPBHBNA according to the present invention, the total amount of impurities having a 1,1'-binaphthyl moiety, selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl, 6,6'-diphenyl-2-(2-hydroxyethoxy)-2'-(2-(2-hydroxyethoxy)-ethoxy)-1,1'-binaphthyl is frequently at most 5000 ppm (0.50% by weight) or less, preferably at most 4000 ppm (0.40% by weight) or less, in particular at most 3000 ppm (0.30% by weight) or less and especially at most 2000 ppm (0.2% by weight) or less, based on 1 part by weight of 6,6'-DPBHBNA contained in the crystals of the crystalline solvate. In particular, the individual weight of each of the aforementioned impurities is preferably most 2000 ppm or less, in particular at most 1500 ppm or less and especially at most 1000 ppm, based on 1 part by weight of 6,6'-DPBHBNA. If the respective solvate contains bis[2-[[1-[2-(2-hydroxyethoxy)-6-phenyl-1-naphthyl]-6-phenyl-2-naphthyl]oxy]ethyl] carbonate, its amount will typically not exceed 2000 ppm and is frequently at most 1500 ppm or less, based on 1 part by weight of 6,6'-DPBHBNA.

In the crystalline solvates of the present invention, the amount of solvent may vary and is typically in the range of 0.3 to 1.5 mol, in particular in the range from 0.3 to 1.2 mol per 1 mol of 6,6'-DPBHBNA.

A particular embodiment of the invention relates to the crystalline solvate of 6,6'-DPBHBNA with methanol, hereinafter the methanol-solvate.

In the methanol-solvate the amount of methanol is typically in the range of 0.3 to 1.5 mol, in particular in the range from 0.4 to 1.2 mol and especially in the range from 0.6 to 1.1 mol per 1 mol of 6,6'-DPBHBNA.

In an X-ray powder diffraction diagram recorded at 22° C. and using Cu-Kα radiation the methanol-solvate typically displays the following three reflections, quoted as 2θvalues: 13.0±0.20, 14.9±0.20 and 21.5±0.2°; at least 3, in particular at least 5 or at least 7 or all of the following reflections, quoted as 2θvalues: 6.2±0.2°, 9.0 0.2°, 10.6±0.2°, 16.9±0.2°, 18.2±0.2°, 18.5±0.2°, 19.2±0.2°, 19.6±0.2°, 20.9±0.2°, 22.7±0.2°, 24.3±0.2°, 24.9±0.2°, 26.2±0.2°, 28.7±0.2° and 30.5±0.2°; and optionally 1, 2, 3, 4, 5, 6, 7, 8, 9 or 10 of the following reflections, quoted as 2θvalues: 8.4±0.2°, 11.8±0.2°, 12.5±0.2°, 16.0±0.2°, 17.7±0.2°, 22.1±0.2°, 26.6±0.2°, 27.7±0.2°, 31.6±0.2° and 32.5±0.2°.

The methanol-solvate is also characterized by an endothermic peak, which indicates its decomposition. When a the methanol solvate is analyzed by differential scanning calorimetry, hereinafter abbreviated as DSC, recorded according to ISO 11357-3:2018 at a heating rate of 20 K/min, the methanol-solvate typically shows an endothermic peak having an onset in the range of 97-101° C. and a peak maximum in the range from 108-115° C. The reaction point is typically in the range from 103-110° C. The reaction point is understood as the lower inflection point of the endothermic peak in the DSC curve. The aforementioned temperatures may vary with the aforementioned ranges depending from the methanol content with higher methanol contents resulting in higher temperatures.

The methanol-solvate can be obtained by crystallization of 6,6'-DPBHBNA from a solution of 6,6'-DPBHBNA in hot methanol or in hot mixtures of methanol with toluene. In order to obtain the desired methanol-solvate the 6,6'-DPBHBNA subjected to crystallization has a purity of at least 97% by weight, with respect to the organic matter, except for solvents. It is preferred that 6,6'-DPBHBNA having a purity of at least 97% is dissolved in hot methanol or in a hot mixture of methanol with toluene. In this mixture, the amount of methanol is preferably at least 50 vol.-% and up to 90 vol.-%, based on the total amount of solvent, i.e. the volume ratio of methanol to toluene is in the range from 1:1 to 9:1 and especially in the range from 6:4 to 8:2, such as 7:3. Typically, the temperature of the hot solution of 6,6'-DPBHBNA is at least 45° C. and may be as high as the refluxing temperature, in particular, if the amount of methanol is high. The concentration of 6,6'-DPBHBNA in the hot solution may vary depending on the amount of methanol in the solvent used for crystallization. High amounts of methanol will typically require lower concentrations of 6,6'-DPBHBNA. The concentration of 6,6'-DPBHBNA will typically not exceed 30% by weight and is typically in the range from 2 to 25% by weight. Crystallization of the methanol-solvate from its hot solution is usually effected by cooling the hot solution to a temperature below 40° C., e.g. to a temperature in the range from −10 to <40° C. or from −5 to 30° C. Seed crystals may be added at a temperature of below 40° C., e.g. at a temperature in the range of −5 to 30° C. The amount of seed crystals will then be typically in the range from 0.05 to 2% by weight, in particular from 0.1 to 1% by weight, based on the amount of 6,6'-DPBHBNA to be crystallized as its methanol-solvate. The time for complete crystallization of the methanol-solvate may depend on the concentration of 6,6'-DPBHBNA and temperature applied and is normally in the range from 4 to 24 h. Crystallization of the methanol-solvate may also be effected by concentrating the hot solution or by combination of concentrating and cooling. Concentrating the solution can be achieved by distilling off a part of the solvent.

The methanol-solvate is obtained from the crystallization in the form of compact crystals with a low aspect ratio. The aspect ratio of the methanol-solvate crystals is typically less than 5, in particular in the range from 1 to 4. The crystal size is typically in the range from 5 to 200 μm. The crystal size of the solvate forms as well as of the non-solvate crystalline forms given herein are obtained by visual inspection of a probe via a light microscope at 100 fold magnification. The size ranges given refer to the largest dimension of the crystals.

The crystals of the methanol-solvate do not tend to entrap significant amounts of mother liquor. Therefore, the crystalline solvate of 6,6'-DPBHBNA with methanol allows for a purification of 6,6'-DPBHBNA to a purity above 99%, in particular at least 99.5% or higher, especially at least 99.7% or higher. As explained above, this means that the total amount of impurities other than methanol in the methanol solvate does not exceed 1% by weight, in particular 0.5% by weight and especially 0.3% by weight.

Apart from that, the methanol-solvate can be decomposed very easily by prolonged drying, preferably at elevated temperatures but below the melting point of the methanol solvate. Thereby a new crystalline polymorph form of 6,6'-DPBHBNA is obtained, which essentially does not contain an organic solvent and which cannot be obtained by crystallization of 6,6'-DPBHBNA from solvents. This crystalline form is hereinafter termed crystalline form A of 6,6'-DPBHBNA, or simply form A. As form A does not contain significant amounts of solvent, it is particularly useful for producing the thermoplastic resins of the present invention.

Form A typically does not contain more than 0.1 mol, in particular not more than 0.05 mol of organic solvents per 1 mol of 6,6'-DPBHBNA. In form A, the total amount of organic solvent is typically below 1% by weight. The amount of methanol in form A is typically below 0.1% by weight.

In an X-ray powder diffraction diagram recorded at 22° C. and using Cu-Kα radiation the form A typically displays the following six reflections, quoted as 2θvalues: 13.0±0.2°, 14.9 0.2°, 20.9 0.2°, 21.4 0.2°, 21.5±0.2° and 23.7±0.2°; and at least one 5, in particular at least 7 or at least 9 or all of the following reflections, quoted as 2θvalues: 6.5±0.2°, 8.6±0.2°, 11.0±0.2°, 13.2±0.2°, 14.9±0.2°, 16.2±0.2°, 17.3±0.2°, 17.8±0.2°, 18.4±0.2° and 19.0±0.2°; and optionally 1, 2, 3, 4, 5, 6, 7, 8 or 9 of the following reflections, quoted as 2θ values: 9.4±0.2°, 10.4±0.2°, 15.5±0.2°, 22.5±0.2°, 22.9±0.2°, 24.5±0.2°, 25.9±0.2°, 27.8±0.2° and 30.8±0.2.

Form A is also characterized having an endothermic peak, which indicates its melting. When form A is analyzed by DSC recorded according to ISO 11357-3:2018 at a heating rate of 20 K/min, form A typically shows an endothermic peak having an onset in the range of 112-114° C. and a peak maximum in the range from 124-126° C. The reaction point is typically in the range from 117-120° C.

The form A is obtained from the decomposition of the methanol-solvate in the form of compact crystals with a low aspect ratio. The aspect ratio of the form A crystals is typically less than 5, in particular in the range from 1 to 4. The crystal size of form A crystals is typically in the range from 1 to 200 µm, as determined by visual inspection of a probe via a light microscope at 100 fold magnification. The decomposition of the methanol solvate is typically carried out by prolonged drying, preferably at elevated temperatures but below the melting point of the methanol solvate. Typically the drying is carried out until the amount of methanol in the obtained 6,6'-DPBHBNA is less than 0.1% by weight. Drying may be carried out in a temperature range from 30 to 95° C., in particular in the range from 30 to 70° C.

The crystalline from A of 6,6'-DPBHBNA typically has a purity of above 99%, in particular of at least 99.5% or higher, especially of at least 99.7% or higher. As explained above, this means that the total amount of impurities other than solvent in form A does not exceed 1% by weight, in particular 0.5% by weight and especially 0.3% by weight. In particular, in form A the total amount of impurities, selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl and 6,6'-diphenyl-2-(2-hydroxyethoxy)-2'-(2-(2-hydroxyethoxy)-ethoxy)-1,1'-binaphthyl is frequently at most 5000 ppm or less, preferably at most 4000 ppm or less, more particularly at most 3000 ppm or less and especially at most 2000 ppm or less, based on 1 part by weight of 6,6'-DPBHBNA contained in the crystals of form A. In particular, the individual weight of each of the aforementioned impurities is preferably most 2000 ppm or less, in particular at most 1500 ppm or less and especially at most 1000 ppm, based on 1 part by weight of 6,6'-DPBHBNA contained in the crystals of form A. If the form A contains bis[2-[[1-[2-(2-hydroxyethoxy)-6-phenyl-1-naphthyl]-6-phenyl-2-naphthyl]oxy]ethyl] carbonate, its amount will typically not exceed 2000 ppm and is frequently at most 1500 ppm or less, based on 1 part by weight of 6,6'-DPBHBNA contained in the crystals of form A.

A further particular embodiment of the invention relates to crystalline 6,6'-DPBHBNA, which is a mixtures of the crystalline methanol-solvate and form A of 6,6'-DPBHBNA. This mixture is frequently obtained by incomplete decomposition of the methanol-solvate. This mixture is characterized by showing an X-ray powder diffraction diagram reflections of both the methanol solvate and the form A. In particular, the mixture in an X-ray powder diffraction diagram recorded at 22° C. and using Cu-Kα radiation shows the following three reflections, quoted as 2θ values: 20.9±0.2°, 21.4±0.2° and 23.7±0.2°; at least one 3, in particular at least 5 or at least 7 or at least 9 of the following reflections, quoted as 2θ values: 6.2±0.2°, 6.5±0.2°, 8.6±0.2°, 9.0±0.2°, 10.6±0.2°, 11.0±0.2°, 13.2±0.2°, 14.9±0.2°, 16.2±0.2°, 16.9±0.2°, 17.3±0.2°, 17.8±0.2°, 18.2±0.2°, 18.4±0.2°, 18.5±0.2°, 19.0±0.2°, 19.2±0.2°, 19.6±0.2°, 20.9±0.2°, 22.7±0.2°, 24.3±0.2°, 24.9±0.2°, 26.2±0.2°, 28.7±0.2° and 30.5±0.2°. Optionally further reflections may be observed given above for the methanol solvate and the form A.

When the mixture of the methanol solvate and form A is analyzed by DSC recorded according to ISO 11357-3:2018 at a heating rate of 20 K/min, typically two endothermic peaks will be observed, one peak having an onset in the range of 97-101° C. and a peak maximum in the range from 108-115° C. and a second peak having an onset in the range of 112-114° C. and a peak maximum in the range from 124-126° C.

The mixture of the methanol solvate and form A typically has a purity of above 99%, in particular of at least 99.5% or higher, especially of at least 99.7% or higher. In the mixture, the total amount of impurities, selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl and 6,6'-diphenyl-2-(2-hydroxyethoxy)-2'-(2-(2-hydroxyethoxy)-ethoxy)-1,1'-binaphthyl is frequently at most 5000 ppm or less, preferably at most 4000 ppm or less, more particularly at most 3000 ppm or less and especially at most 2000 ppm or less, based on 1 part by weight of 6,6'-DPBHBNA contained in the mixture of the methanol solvate and form A A further particular embodiment of the invention relates to the crystalline solvate of 6,6'-DPBHBNA with toluene, hereinafter the toluene-solvate.

In the toluene-solvate the amount of toluene is typically in the range of 0.3 to 1.5 mol, in particular in the range from 0.3 to 1.2 mol and especially in the range from 0.3 to 0.5 mol per 1 mol of 6,6'-DPBHBNA.

In an X-ray powder diffraction diagram recorded at 22° C. and using Cu-Kα radiation the toluene-solvate typically displays the following three reflections, quoted as 2θ values: 5.2±0.2°, 7.7±0.2° and 21.6±0.2°; and at least one 3, in particular at least 5 or at least 7 or all of the following reflections, quoted as 2θ values: 8.2±0.2°, 9.1±0.2°, 10.6±0.2°, 10.8±0.2°, 11.6±0.2°, 12.6±0.2°, 13.6±0.2°, 14.2±0.2°, 14.7±0.2°, 15.0±0.2°, 15.7±0.2°, 16.7±0.2°, 17.1±0.2°, 18.0±0.2°, 18.5±0.2°, 19.4±0.2°, 19.9±0.2°, 20.8±0.2°, 21.0±0.2°, 22.2±0.2°, 22.7±0.2°, 24.1±0.2°, 25.0±0.2°, 25.5±0.2°, 25.7±0.2°, 26.5±0.2°, 27.1±0.2° and 27.6±0.2°.

The toluene-solvate is also characterized by an endothermic peak, which indicates its decomposition. When a the toluene-solvate is analyzed by DSC recorded according to ISO 11357-3:2018 at a heating rate of 20 K/min, the toluene-solvate typically shows an endothermic peak having an onset in the range of 105-108° C. and a peak maximum in the range from 112-115° C. The reaction point of the toluene-solvate is typically in the range from 109-112° C.

The toluene-solvate can be obtained by crystallization of 6,6'-DPBHBNA from hot toluene, which does not contain more than 5% by weight of other organic solvents and which does in particular not contain more than 1% of methanol. In order to obtain the desired toluene-solvate the 6,6'-DPBHBNA subjected to crystallization has a purity of at least 97% by weight, with respect to the organic matter, except for solvents. It is preferred that 6,6'-DPBHBNA having a purity of at least 97% is dissolved in hot toluene. Typically, the temperature of the hot solution of 6,6'-DPBHBNA in toluene is at least 60° C. and may be as high as the refluxing temperature. The concentration of 6,6'-DPBHBNA in the hot solution will typically not exceed 50% by weight and is typically in the range from 10 to 40% by weight. Crystallization of the toluene-solvate from its hot solution is usually effected by cooling the hot solution to a temperature below 50° C., e.g. to a temperature in the range from −10 to <50° C. or from −5 to 40° C. Seed crystals may be added at a temperature of below 50° C., e.g. at a temperature in the range of −5 to 40° C. The amount of seed crystals will then be typically in the range from 0.05 to 2% by weight, in particular from 0.1 to 1% by weight, based on the amount of 6,6'-DPBHBNA to be crystallized as its toluene-solvate. The time for complete crystallization of the toluene-solvate may depend on the concentration of 6,6'-DPBHBNA and temperature applied and is normally in the range from 4 to 24 h. Crystallization of the toluene-solvate may also be effected by concentrating the hot solution or by combination of concentrating and cooling. Concentrating the solution can be achieved by distilling of a part of the toluene.

From the crystallization, the toluene-solvate is obtained as compact crystals with a low aspect ratio. The aspect ratio of the toluene-solvate crystals is typically less than 5, in particular in the range from 1 to 4. The crystal size is typically in the range from 5 to 300 µm. The crystals of the toluene-solvate do not tend to entrap significant amounts of mother liquor. Therefore, the crystalline solvate of 6,6'-DPBHBNA with toluene allows for a purification of 6,6'-DPBHBNA to a purity above 99%, in particular at least 99.5% or higher, especially at least 99.7% or higher.

A further particular embodiment of the invention relates to the crystalline solvate of 6,6'-DPBHBNA with methyl ethyl ketone (=MEK), hereinafter the MEK-solvate.

In the MEK-solvate the amount of MEK is typically in the range of 0.3 to 1.5 mol, in particular in the range from 0.4 to 1.0 mol and especially in the range from 0.5 to 0.8 mol per 1 mol of 6,6'-DPBHBNA.

In an X-ray powder diffraction diagram recorded at 22° C. and using Cu-Kα radiation MEK-solvate typically displays the following three reflections, quoted as 2θvalues: $7.0±0.2°$, $16.8±0.2°$ and $23.4 \text{ t } 0.2°$; and at least 3, in particular at least 5 or at least 7 or all of the following reflections, quoted as 2θvalues: $5.0±0.2°$, $7.5\ 0.2°$, $12.6±0.2°$, $13.4±0.2°$, $14.5±0.2°$, $15.4±0.2°$, $15.7±0.2°$, $18.3±0.2°$, $19.4±0.2°$, $20.6±0.2°$, $21.5±0.2°$, $22.7±0.2°$, $24.1±0.2°$, $25.6±0.2°$, $26.2±0.2°$, $26.6±0.2°$ and $30.8±0.20$.

The MEK-solvate is also characterized an endothermic peak, which indicates its decomposition. When a the MEK-solvate is analyzed by DSC recorded according to ISO 11357-3:2018 at a heating rate of 20 K/min, the MEK-solvate typically shows an endothermic peak having an onset in the range of 87-91° C. and a peak maximum in the range from 95-100° C. The reaction point of the MEK-solvate is typically in the range from 94-98° C.

The MEK-solvate can be obtained by crystallization of 6,6'-DPBHBNA from hot MEK, which does not contain more than 5% by weight of other organic solvents and which does in particular not contain more than 0.5% of methanol. In order to obtain the desired MEK-solvate the 6,6'-DPBHBNA subjected to crystallization has a purity of at least 97% by weight, with respect to the organic matter, except for solvents. It is preferred that 6,6'-DPBHBNA having a purity of at least 97% is dissolved in hot MEK. Typically, the temperature of the hot solution of 6,6'-DPBHBNA in MEK is at least 60° C. and may be as high as the refluxing temperature. The concentration of 6,6'-DPBHBNA in the hot solution will typically not exceed 50% by weight and is typically in the range from 10 to 40% by weight. Crystallization of the MEK-solvate from its hot solution is usually effected by cooling the hot solution to a temperature below 50° C., e.g. to a temperature in the range from −10 to <50° C. or from −5 to 40° C. Seed crystals may be added at a temperature of below 50° C., e.g. at a temperature in the range of −5 to 40° C. The amount of seed crystals will then be typically in the range from 0.05 to 2% by weight, in particular from 0.1 to 1% by weight, based on the amount of 6,6'-DPBHBNA to be crystallized as its anisole-solvate. The time for complete crystallization of the MEK-solvate may depend on the concentration of 6,6'-DPBHBNA and temperature applied and is normally in the range from 4 to 24 h. Crystallization of the MEK-solvate may also be effected by concentrating the hot solution or by combination of concentrating and cooling. Concentrating the solution can be achieved by distilling of a part of the MEK.

From the crystallization, the MEK-solvate is obtained as compact crystals with a low aspect ratio. The aspect ratio of the MEK-solvate crystals is typically less than 5, in particular in the range from 1 to 4. The crystal size is typically in the range from 1 to 300 µm. The crystals of the MEK-solvate do not tend to entrap significant amounts of mother liquor. Therefore, the crystalline solvate of 6,6'-DPBHBNA with MEK allows for a purification of 6,6'-DPBHBNA to a purity above 99%, in particular at least 99.5% or higher, especially at least 99.7% or higher.

Despite the high purity of these crystalline forms of 6,6'-DPBHBNA, they can be transformed in an amorphous from B. The amorphous form B is stable and does not tend to crystallize even after prolonged storage or if comminuted by grinding. The amorphous form B is prepared by melting one of the crystalline forms followed by rapid cooling. Preferably, the respective crystalline form is heated to a temperature of at least 5 K above its melting point, until the crystals are completely molten and a clear melt us obtained. If a solvate is used as a starting material for preparing the melt, any solvent is preferable removed by applying a vacuum. Then the melt is rapidly cooled, preferably with a heating rate of at least 5 K/min, e.g. at a heating rate in the range from 5 to 50 K/min. Thereby form B is obtained as a solid glass. This glass can be comminuted, e.g. by grinding, to obtain a powder. In order to avoid crystallization, the comminution is carried out at a temperature, which is significantly lower than 100° C., e.g. in the range from 5 to 40° C. In this powder, the particles are still present as the amorphous form B.

In an X-ray powder diffraction diagram of form B recorded at 22° C. and using Cu-Kα radiation the amorphous form B typically displays no reflections at diffraction angles quoted as 2θvalues, in the range from 5° to 40°. Rather a broad halo is observed indicating that essentially no crystalline phase is present.

Form B is also characterized showing no endothermic peak the temperature range of 80-200° C., when it is analyzed by DSC according to ISO 11357-3:2018 at a heating rate of 20 K/min. Rather, under these conditions, the amorphous form B may show a glass transition temperature in the range from 105 to 125° C.

The amorphous form B of 6,6'-DPBHBNA typically has a purity above 99%, in particular at least 99.5% or higher, especially at least 99.7% or higher. As explained above, this means that the total amount of impurities other than solvent in the form B does not exceed 1% by weight, in particular 0.5% by weight and especially 0.3% by weight. In particular, in form B the total amount of impurities, selected from the group consisting of 6,6'-diphenyl-2-(2-hydroxyethoxy)-2'-hydroxy-1,1'-binaphthyl, 6,6'-diphenyl-2,2'-bishydroxy-1, 1'-binaphthyl and 6,6'-diphenyl-2-(2-hydroxyethoxy)-2'-(2-(2-hydroxyethoxy)-ethoxy)-1,1'-binaphthyl is frequently at most 5000 ppm or less, preferably at most 4000 ppm or less, more particularly at most 3000 ppm or less and especially at most 2000 ppm or less, based on 1 part by weight of 6,6'-DPBHBNA contained in the amorphous form B. In particular, the individual weight of each of the aforementioned impurities is preferably most 2000 ppm or less, in particular at most 1500 ppm or less and especially at most 1000 ppm, based on 1 part by weight of 6,6'-DPBHBNA contained in the amorphous form B. If the amorphous form B contains bis[2-[[1-[2-(2-hydroxyethoxy)-6-phenyl-1-naphthyl]-6-phenyl-2-naphthyl]oxy]ethyl]carbonate, its amount will typically not exceed 2000 ppm and is frequently at most 1500 ppm or less, based on 1 part by weight of 6,6'-DPBHBNA contained in the amorphous form B.

Surprisingly, the crystallization of 6,6'-diphenyl-2,2'-bis (2-hydroxyethoxy)-1,1'-binaphthyl from a solution in ethanol does not result in the ethanol solvate of 6,6'-DPBHBNA but in a further new polymorph form of 6,6'-DPBHBNA, which hereinafter termed form C. As form C does not contain significant amounts of solvent, it is particularly useful for producing the thermoplastic resins of the present invention.

Form C typically does not contain more than 0.1 mol, in particular not more than 0.05 mol of organic solvents per 1 mol of 6,6'-DPBHBNA. In form C, the total amount of organic solvent is typically below 1% by weight, in particular at most 0.5% by weight and especially at most 0.1% by weight.

In an X-ray powder diffraction diagram recorded at 22° C. and using Cu-Kα radiation the form C typically displays the following three reflections, quoted as 2θ values: 5.1±0.2°, 7.6±0.2° and 21.0±0.2°; and at least 3, in particular at least 5 or at least 7 or all of the following reflections, quoted as 2θ values: 8.2±0.2°, 9.2±0.2°, 10.4±0.2°, 10.8±0.2°, 11.6±0.2°, 12.8±0.2°, 13.4±0.2°, 14.5±0.2°, 15.2±0.2°, 15.6±0.2°, 16.6±0.2°, 17.4±0.2°, 17.9±0.2°, 18.5±0.2°, 19.2±0.2°, 19.9±0.2°, 20.4±0.2°, 21.8±0.2°, 22.2±0.2°, 22.6±0.2°, 13.4±0.2°, 24.0±0.2°, 25.7±0.2°, 27.3±0.2° and 27.9±0.2°.

The powder X-ray powder diffraction pattern of form C is almost identical with the X-ray powder diffraction pattern of the toluene solvate, indicating that in form C the molecules of 6,6'-DPBHBNA are arranged in the crystal lattice in the same way as in the toluene-solvate.

Form C is also characterized having an endothermic peak, which indicates its melting. When form C is analyzed by DSC recorded according to ISO 11357-3:2018 at a heating rate of 20 K/min, form C typically shows an endothermic peak having an onset in the range of 115 to 118° C. and a peak maximum in the range from 124 to 126° C. The reaction point is typically in the range from 120 to 122° C.

Form C can be obtained by crystallization of 6,6'-DPBHBNA from a solution of 6,6'-DPBHBNA in hot ethanol. In order to obtain the desired form C the 6,6'-DPBHBNA subjected to crystallization has generally a purity of preferably at least 97% by weight, with respect to the organic matter, except for solvents. It is preferred that 6,6'-DPBHBNA having a purity of at least 97% is dissolved in hot ethanol. Typically, the temperature of the hot solution of 6,6'-DPBHBNA is at least 45° C. and may be as high as the refluxing temperature. The concentration of 6,6'-DPBHBNA in the hot solution will typically not exceed 30% by weight and is typically in the range from 2 to 25% by weight. Crystallization of the form C from its hot solution is usually effected by cooling the hot solution to a temperature below 40° C., e.g. to a temperature in the range from –10 to <40° C. or from –5 to 30° C. Seed crystals may be added at a temperature of below 40° C., e.g. at a temperature in the range of –5 to 30° C. The amount of seed crystals will then be typically in the range from 0.05 to 2% by weight, in particular from 0.1 to 1% by weight, based on the amount of 6,6'-DPBHBNA to be crystallized as its form C. The time for complete crystallization of the form C may depend on the concentration of 6,6'-DPBHBNA and temperature applied and is normally in the range from 4 to 24 h. Crystallization of the form C may also be effected by concentrating the hot solution or by combination of concentrating and cooling. Concentrating the solution can be achieved by distilling off a part of the solvent.

The form C is obtained from the crystallization in the form of compact crystals with a low aspect ratio. The aspect ratio of the form C crystals is typically less than 5, in particular in the range from 1 to 4. The crystal size is typically in the range from 2 to 250 m.

The crystals of the form C do not tend to entrap significant amounts of mother liquor. Therefore, the crystalline form C of 6,6'-DPBHBNA allows for a purification of 6,6'-DPBHBNA to a purity above 99%, in particular at least 99.5% or higher, especially at least 99.7% or higher. As explained above, this means that the total amount of impurities other than solvent in the form C does not exceed 1% by weight, in particular 0.5% by weight and especially 0.3% by weight. In particular, in form C the total amount of impurities, selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl and 6,6'-diphenyl-2-(2-hydroxyethoxy)-2'-(2-(2-hydroxyethoxy)-ethoxy)-1,1'-binaphthyl is frequently at most 5000 ppm or less, preferably at most 4000 ppm or less, more particularly at most 2000 ppm or less and especially at most 100 ppm or less, based on 1 part by weight of 6,6'-DPBHBNA contained in the crystals of form C. In particular, the individual weight of each of the aforementioned impurities is preferably most 2000 ppm or less, in particular at most 1500 ppm or less and especially at most 1000 ppm, based on 1 part by weight of 6,6'-DPBHBNA contained in the crystals of form C. If the form C contains bis[2-[[1-[2-(2-hydroxyethoxy)-6-phenyl-1-naphthyl]-6-phenyl-2-naphthyl]oxy]ethyl] carbonate, its amount will typically not exceed 2000 ppm and is frequently at most 1500 ppm or less, based on 1 part by weight of 6,6'-DPBHBNA contained in the crystals of form C.

The solid forms of 6,6'-DPBHBNA according to the present invention, i.e. the methanol solvate, the toluene-solvate, the methyl ethyl ketone solvate and also the anhydrate form A as well the amorphous form B, will typically have a low yellowness index Y.I. of less than 3.0, frequently of less than 2.5 or less than 2.0, particularly of less than 1.5 and especially less than 1.0 or less than 0.75 and even as low as 0.5 or lower. All Y.I. values referred herein are determined in accordance with ASTM E313 from a 5% w/w solution of 6,6'-DPBHBNA in dichloromethane.

The solid forms of 6,6'-DPBHBNA according to the present invention will frequently have a low haze of less than 1.0 ntu, in particular less than 0.8 ntu or less than 0.6 ntu as determined from a 5% w/w solution of 6,6'-DPBHBNA in dichloromethane. The turbidity herein referred to is determined from a 5% w/w solution of 6,6'-DPBHBNA in dichloromethane and given as nephelomethric turbidity units (ntu). The haze of the crystalline solvates of 6,6'-DPBHBNA according to the present invention may be even lower, e.g. less than 0.4 ntu or less than 0.35 ntu or less than 0.3 ntu and even as low as 0.2 ntu or lower.

It is preferable that a thermoplastic resin of the present invention-specifically, the polyester resins, the polyester carbonate resins, the polycarbonate resin or a mixture of at least two of them—are produced from monomers with a predetermined amount of impurity, a predetermined level of purity, and so on.

For example, when a dihydroxy compound represented by general formula (6) is a crystalline solvate form, it is preferable that the thermoplastic resin of the present invention is produced from a dihydroxy compound including 0.3 to 1.2 mol of an organic solvent per 1 mol of the dihydroxy compound. The examples of the solvent are methanol, toluene, methyl ethyl ketone, and so on.

When using a monomer including a suitable amount of the organic solvent as mentioned above as those of formula (6), a thermoplastic resin can effectively be produced. For example, when a thermoplastic resin is produced with a dihydroxy compound including 0.3 to 1.2 mol, 0.3 to 1.0 mol, or around 0.3 to 0.5 mol of an organic solvent per 1 mol of the dihydroxy compound, scattering of the monomer can be prevented and highly pure thermoplastic resin can be produced.

When a dihydroxy compound represented by general formula (6) is a crystalline form, it is preferable that a thermoplastic resin of the present invention can be produced from a dihydroxy compound including less than 0.1 mol of an organic solvent per 1 mol of a crystal of the dihydroxy compound. With respect to the crystalline forms of a dihydroxy compound, those crystals with the above-mentioned aspect ratio of—for example—at most 5:1, at most 3:1 or at most 1:1 can be used.

Use of a dihydroxy compound represented by general formula (6) with a purity of at least 99.0 weight % (or 99.0 weight % or higher), preferably 99.5 weight % or higher, more preferably 99.7 weight % or higher is preferable. In addition, a thermoplastic resin can be produced from a dihydroxy compound represented by general formula (6) with less than 0.1 mol—for example, below 0.05 mol or preferably below 0.03 mol of an organic solvent.

A dihydroxy compound represented by general formula (6) with a yellowness index Y.I. of less than 3.0, as determined in accordance with ASTM E313 from a 5% w/w solution of dichloromethane is preferable. More preferably, the value of the yellowness index is less than 2.0, or more preferably, less than 1.0.

A dihydroxy compound represented by general formula (6) with a haze of less than 1.0 ntu, as determined from a 5% w/w solution of dichloromethane is preferable. More preferably, the value of the haze is less than 0.7 ntu, or more preferably, less than 0.5 ntu.

When a thermoplastic resin is produced from any one of the dihydroxy compounds represented by general formula (6), the total amount of impurities, such as dihydroxy compounds other than those of general formula (6), especially to those with molecular structures similar to those of general formula (6), is preferably below 0.5 weight %, more preferably below 0.3 weight %, further preferably below 0.1 weight %, based on the dihydroxy compounds of the formula (6).

For example, when a 6,6'-DPBHBNA is used as a monomer, the total amount of impurities selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl, and 6,6'-diphenyl-2-(2-hydroxyethoxy)-2'-(2-(2-hydroxyethoxy)-ethoxy)-1,1'-binaphthyl is preferably less than 0.5% by weight, more preferably less than 0.3% by weight, and further preferably less than 0.1% by weight, based on the weight of 6,6'-DPBHBNA.

When more than or equal to 0.5% by weight of impurities are included in the specific dihydroxy compounds, the reaction efficiency may be lowered or the achieved molecular weight of a polymer may be lowered. In particular, when many impurities with many repeating units of hydroxyethyl group are included in the specific dihydroxy compounds, the obtained thermoplastic resins tend to have lower refractive index value.

On the other hand, when less than 0.5% by weight of impurities are included in the specific dihydroxy compounds, the obtained resins have basic structures and therefore the resins have a low melt viscosity. This tends to achieve high moldability-namely, high flow of resin—and also to increase the impact resistance of the obtained molded body such as an optical lens.

For example, it is preferable that the monomers of the formula (6) include impurities in the range of 1 ppb to less than 5000 ppm based on 1 part by weight of the monomers of the formula (6).

It is preferable to produce resins, resin compositions, optical lenses, optical films, and so on from the monomers of formula (6) with less than 0.5 weight % of impurities—for example, those with less than 0.5 weight % of structural units derived from the impurities selected from the group consisting of 6,6'-diphenyl-2-(2-hydroxyethoxy)-2'-hydroxy-1,1'-binaphthyl, 6,6'-diphenyl-2,2'-bishydroxy-1,1'-binaphthyl, and 6,6'-diphenyl-2-(2-hydroxyethoxy)-2'-(2-(2-hydroxyethoxy)-ethoxy)-1,1'-binaphthyl.

It is preferable that thermoplastic resins have properties suitable for optical use. For example, thermoplastic resins having a well-balanced refractive index and Abbe number are preferable. Specifically, thermoplastic resins with a refractive index higher than 1.660 or higher than 1.668, and with Abbe number of less than 19, such as more than or equal to 13 and less than 19, or more than or equal to 15 and less than 19 are preferable. In addition to the satisfaction of the above mentioned requirements of the refractive index and Abbe number, it is preferable that the refractive index (nD) and Abbe number (v) meet the relationship of $-0.0002v+1.6718<nD<-0.024v+2.124$, more preferably the relationship of $-0.004v+1.744<nD<-0.024v+2.124$, and further more preferably the relationship of $-0.02v+2.04<nD<-0.024v+2.124$.

For the thermoplastic resin having the structural unit represented by general formula (1) according to the present invention, an aromatic dihydroxy compound and an aliphatic dihydroxy compound (e.g., dihydroxy compounds having a fluorene skeleton and binaphthols) can be used as dihydroxy components in combination with the compound of general formula (6).

The thermoplastic resin of the present invention can be produced by preferably using the compound represented by general formula (7) below and/or the compound represented by general formula (8) below as dihydroxy components in addition to the compound represented by general formula (6) above.

[Chemical Formula 37]

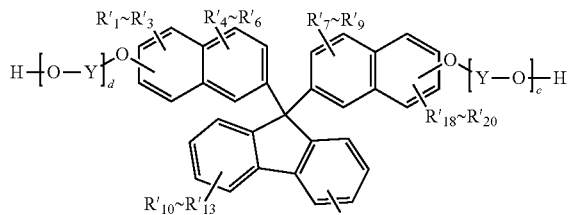

(7)

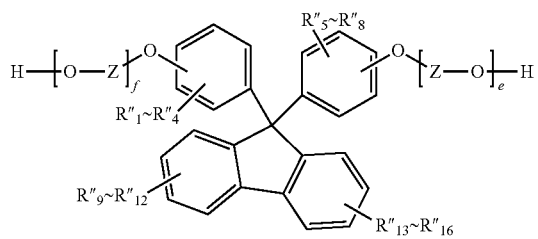

(8)

In formula (7):
R'$_1$ to R'$_{20}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;
Y represents an alkylene group having 1 to 8 carbon atoms, a cycloalkylene group having 5 to 12 carbon atoms or an arylene group having 6 to 20 carbon atoms; and c and d each independently represent an integer of 1 to 10.

In formula (8):
R''$_1$ to R''$_{16}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;
Z represents an alkylene group having 2 to 8 carbon atoms, a cycloalkylene group having 5 to 12 carbon atoms or an arylene group having 6 to 20 carbon atoms; and
e and f each independently represent an integer of 1 to 10.

Examples of the dihydroxy compound represented by formula (7) include 2,2'-bis(1-hydroxymethoxy)-1,1'-binaphthyl, 2,2'-bis(2-hydroxyethoxy)-1,1'-binaphthyl, 2,2'-bis(3-hydroxypropyloxy)-1,1'-binaphthyl and 2,2'-bis(4-hydroxybutoxy)-1,1'-binaphthyl. Among them, 2,2'-bis(2-hydroxyethoxy)-1,1'-binaphthyl is preferred. These materials may be used solely, or two or more of them may be used in combination.

Examples of the dihydroxy compound represented by formula (8) include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-tert-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene and 9,9-bis[4-(2-hydroxyethoxy)-3-phenylphenyl]fluorene. Among them, 9,9-bis[4-(2-hydroxyethoxy)phenyl]fluorene and 9,9-bis[4-(2-hydroxyethoxy)-3-phenylphenyl]fluorene are preferred. These materials may be used solely, or two or more of them may be used in combination.

Examples of the dihydroxy compound represented by formula (7) or (8) include those represented by general formula (9) below.

[Chemical Formula 38]

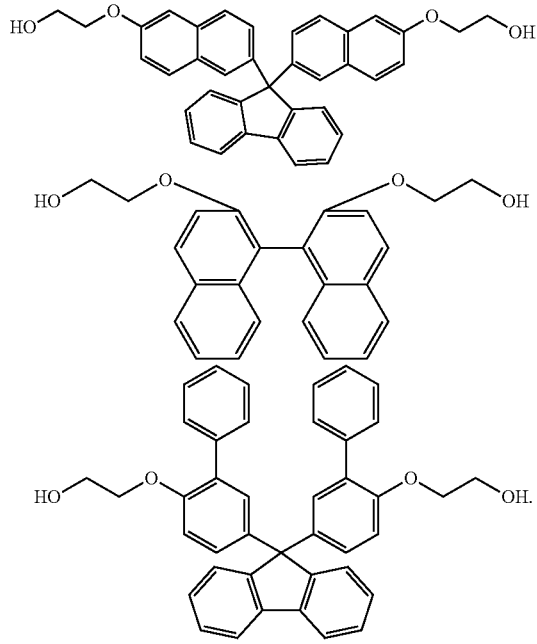

(9)

In the monomer for the production of the thermoplastic resin, together with the dihydroxy compound represented by general formula (6) above, a dihydroxy compound, wherein each of c and d in general formula (6) is 0, or a dihydroxy compound, wherein either c or d in general formula (6) is 0, may be contained as an impurity.

In the monomer mainly composed of the dihydroxy compound represented by general formula (6) above, the dihydroxy compounds, wherein at least one of the values of c and d is different from general formula (6) above, are contained in an amount of preferably 1000 ppm or less, more preferably 500 ppm or less, even more preferably 200 ppm or less, and particularly preferably 100 ppm or less in total. Moreover, the total content of the dihydroxy compounds, wherein at least one of the values of c and d is different from general formula (6) above, in the monomer is desirably 50 ppm or less, and more desirably 20 ppm or less.

Regarding the content of impurities related to general formula (6) above, the same applies to the dihydroxy compound represented by general formula (7) or (8). Specifically, together with the dihydroxy compound represented by general formula (7) or (8) above, a dihydroxy compound, wherein each of e and f in general formula (7) or (8) is 0, or a dihydroxy compound, wherein either e or f in general formula (7) or (8) is 0, may be contained as an impurity.

Further, in the monomer mainly composed of the dihydroxy compound represented by general formula (7) or (8) above, these impurities are contained in an amount of preferably 1000 ppm or less, more preferably 500 ppm or less, even more preferably 200 ppm or less, and particularly preferably 100 ppm or less in total. Moreover, the total content of the impurities in the monomer is desirably 50 ppm or less, and more desirably 20 ppm or less.

The compounds of general formulae (7) and (8) can be produced by various synthesis methods. For example, the compounds can be produced by obtaining 9,9-bis(hydroxynaphthyl)fluorenes by utilizing: (a) a method in which fluorenones are reacted with hydroxynaphthalenes in the presence of hydrogen chloride gas and mercaptocarboxylic acid; (b) a method in which 9-fluorenone is reacted with hydroxynaphthalenes in the presence of an acid catalyst (and alkyl mercaptan); (c) a method in which fluorenones are reacted with hydroxynaphthalenes in the presence of hydrochloric acid and thiols (e.g., mercaptocarboxylic acid); (d) a method in which fluorenones are reacted with hydroxynaphthalenes in the presence of sulfuric acid and thiols (e.g., mercaptocarboxylic acid) and crystallized using a crystallization solvent composed of hydrocarbons and a polar solvent to produce bisnaphthol fluorene; or the like and by reacting it with compounds corresponding to an [XO]a group and an [XO]b group (e.g., alkylene oxide and haloalkanol), as described in Japanese Patent No. 5442800 and Japanese Laid-Open Patent Publication No. 2014-028806. For example, 9,9-bis[6-(2-hydroxyethoxy)naphthyl]fluorene may be obtained by reacting 9,9-bis[6-hydroxynaphthyl] fluorene with 2-chloroethanol under alkaline conditions.

Examples of aromatic dihydroxy compounds which can be used in combination other than the above-described compounds include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

(Amount of Vinyl Terminal Group)

The polyester resin, polyester carbonate resin and polycarbonate resin that are the thermoplastic resin of the present invention are obtained by using the above-described compounds represented by general formulae (6) to (9), etc. as dihydroxy components and reacting them with a carbonate precursor such as carbonic acid diester. However, in the polymerization process for producing the thermoplastic resin such as polycarbonate, impurities, wherein one or both of —OROH groups at the ends in the compounds of general formulae (6) to (9) have been converted to a vinyl terminal group represented, for example, by —OC=CH group, may be generated.

For example, impurities with a vinyl group as represented by the formula (v-1) below can be included in the monomers, resins, resin compositions, optical lenses, and optical films described in the present description.

[Chemical Formula 39]

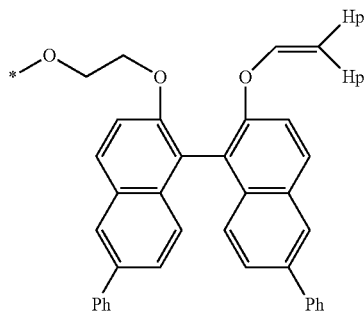

(v-1)

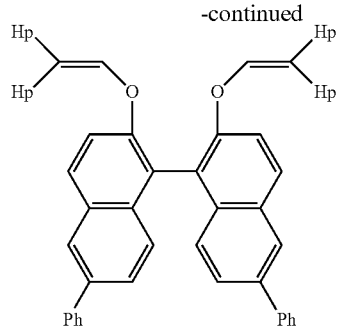

-continued

In the formula, the symbol "*" represents a polymer chain and "Hp" represents a hydrogen atom.

The above-described vinyl group may generate in the steps of monomer synthesis and purification and may be included in monomers. In addition, the above-mentioned vinyl group may generate or increase also in the steps of polymerization for forming resins and additive mixing. The vinyl group can be considered to be one of the causes of coloring of polymers; however, if the amount is limited, the vinyl group can increase the bend strength or impact resistance of the obtained resins.

However, the amount of such impurities having a vinyl terminal structure is usually very small, and a polymer produced can be used as a thermoplastic resin without purification.

For example, the amount of vinyl groups in polycarbonate resins can be determined by carrying out the 1H-NMR measurement as stated item 9. Amount of vinyl terminal group of polycarbonate resin, below, and based on the integral ratio represented by the following formula (A). The preferable range of the amount of vinyl groups is 0.0001 to 5.0, more preferably, 0.01 to 3.0, or further more preferably 0.1 to 1.0.

[Numerical formula 1]

(Amount of terminal vinyl groups)=(Integration value of peak of proton corresponding to $Hp$)/ (Integration value of peak of proton corresponding to $Hk$)×100     (A)

In the formula (A), the symbol "Hk" represents Hk in the formula (v-2) below, which corresponds to the formula (v-1) above.

[Chemical Formula 40]

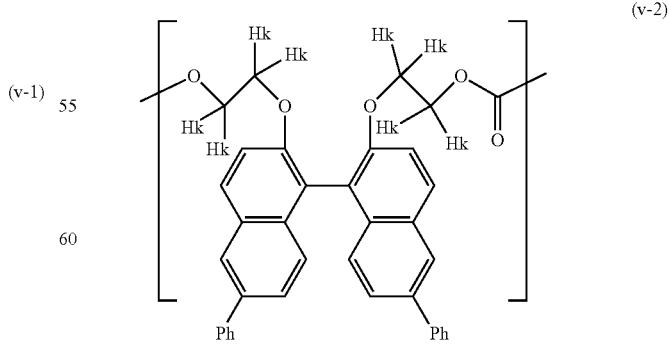

(v-2)

In the formula, the symbol "Hk" represents a hydrogen atom.

In addition, the resins of the present application may form oligomers with a molecular weight (Mw) of 1,000 or below or cyclic compounds caused by polycarbonate bonding of more than two monomers. Such oligomers and cyclic compounds can be analyzed by LC-MS and other methods. The total amount of the oligomers and cyclic compounds is, for example, 2.5 weight % or below, preferably 2.0 weight % or below, or more preferably 1.0 weight % or below.

It is preferable that the total amount of metals of Li, Na, Mg, Al, K, Ca, Ti, Cr, Fe, Ni, Zn, and Sn included in the monomer is 1000 weight ppm or lower (for example, 100 weight ppm, or 10 weight ppm).

It is preferable that the total amount of metals of Li, Na, Mg, Al, K, Ca, Ti, Cr, Fe, Ni, Zn, and Sn included in the obtained resin or resin composition is 1000 weight ppm or lower.

A metal content of 1000 weight ppm or lower tends to prevent coloring of the obtained resin and lowers the catalyst activity during the polymerization process. On the other hand, a metal content of preferably 1 weight ppb or more (or more preferably 1 weight ppm or more) may make it possible to omit the addition of catalyst or reduce the required amount of catalyst due to the catalytic effects of the metals, which may enable a reduction in production costs. The above-mentioned metal contents are for example, measured by the following method.

<Analysis of Metals>

Samples were carbonized with sulfuric acid and then their metal contents were measured by ICP-MS.

Specifically, a 2 g sample was weighed and placed in a synthetic fused silica beaker, to which 2.5 ml of sulfuric acid was added before carbonization. During the carbonization process, 0.1 ml of sulfuric acid was further added to the sample and a quartz dish was placed on the beaker as a lid. The carbonization process comprised heating the sample to 500° C. for ten hours on an electric hotplate. Further, heating acid decomposition of the sample was carried out by adding sulfuric acid to and drying and solidifying the sample, then repeating the addition of sulfuric acid and dry solidification. Nitric acid aqueous solution was added to the sample in a quantity of 50 ml, the sample was heated to 50° C., and then quantitative analysis using ICP-MS was carried out.

ICP-MS device: ICPE-9000 of Shimadzu Corporation

Examples of the carbonic acid diester to be used in the production of a polycarbonate resin or polyester carbonate resin include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred. The diphenyl carbonate is used at a ratio of preferably 0.97 to 1.20 mol, and more preferably 0.98 to 1.10 mol relative to 1 mol of the total of the dihydroxy compounds.

Further, the dicarboxylic acid, monocarboxylic acid monoester and diester compound which can be used in the production of a polyester resin or polyester carbonate resin are used at a ratio of preferably 0.97 to 1.20 mol, and more preferably 0.98 to 1.10 mol relative to 1 mol of the total of the dihydroxy compounds.

Among the above-described transesterification catalysts to be used in the production of the thermoplastic resin, examples of basic compound catalysts particularly include an alkali metal compound, an alkaline earth metal compound and a nitrogen-containing compound.

Examples of the alkali metal compound to be used in the present invention include an organic salt, inorganic salt, oxide, hydroxide, hydride or alkoxide of an alkali metal, etc. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate (sodium tetraphenylborate), sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol.

Examples of the alkaline earth metal compound include an organic salt, inorganic salt, oxide, hydroxide, hydride or alkoxide of an alkaline earth metal compound, etc. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Examples of the nitrogen-containing compound include quaternary ammonium hydroxides and salts thereof, and amines. Specific examples thereof include: quaternary ammonium hydroxides having an alkyl group, aryl group or the like such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.

As the transesterification catalyst, salts of titanium, zinc, tin, zirconium, lead, etc. are preferably used. These substances may be used solely, or two or more of them may be used in combination.

As the transesterification catalyst, alkoxytitanium such as tetrabutoxytitanium, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate, lead(IV) acetate or the like is specifically used.

These catalysts are used at a ratio of $10^{-9}$ to $10^{-3}$ mol, and preferably $10^{-7}$ to $10^{-4}$ mol relative to 1 mol of the total of the dihydroxy compounds.

In the melt polycondensation method, using the aforementioned raw materials and catalyst, melt polycondensation is carried out while removing a by-product by means of the transesterification reaction under heating conditions and under ordinary pressure or reduced pressure.

In the case of melt polycondensation in this composition system, after the compound represented by general formula (6) and the carbonic acid diester are melted in a reactor, the reaction is desirably performed with a monohydroxy compound by-produced being retained. For retention, a reaction apparatus can be closed, or the pressure can be controlled, for example, by reducing or elevating the pressure. The reaction time of this process is 20 minutes to 240 minutes, preferably 40 minutes to 180 minutes, and particularly preferably 60 minutes to 150 minutes. In this regard, when the monohydroxy compound by-produced is distilled away immediately after it is produced, the content of a high-molecular-weight body in the thermoplastic resin finally obtained is low. However, when the monohydroxy compound by-produced is retained in the reactor for a certain period of time, the content of the high-molecular-weight body in the thermoplastic resin finally obtained is high.

The melt polycondensation reaction may be either a continuous type or a batch type. The reaction apparatus to be used for performing the reaction may be a vertical apparatus equipped with an anchor type stirring blade, maxblend stirring blade, helicalribbon type stirring blade or the like, or a horizontal apparatus equipped with a paddle blade, lattice blade, spectacle-shaped blade or the like, or an extruder-type apparatus equipped with a screw. Further, use of a reaction apparatus in which these reaction apparatuses are suitably combined is preferably carried out in consideration of the viscosity of a polymerized product.

In the method for producing the thermoplastic resin to be used in the present invention, after the polymerization reaction is completed, in order to maintain thermal stability and hydrolytic stability, the catalyst may be removed or deactivated. A method for deactivating a catalyst by means of addition of a publicly-known acidic substance can be suitably carried out. As the acidic substance, specifically, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenyl phosphine and bis(diphenylphosphino)ethane; boric acids such as boric acid and phenylboric acid; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used. These deactivating agents are used in an amount of 0.01 to 50 times, and preferably 0.3 to 20 times the molar quantity of the catalyst. When the amount is less than 0.01 times the molar quantity of the catalyst, the deactivating effect is insufficient and therefore it is undesirable. When the amount is more than 50 times the molar quantity of the catalyst, heat resistance of the resin is reduced and a molded body tends to be easily colored, and therefore it is undesirable.

After the catalyst is deactivated, a process of devolatilizing and removing a low boiling point compound in the polymer under a pressure of 0.1 to 1 mmHg and at a temperature of 200 to 350° C. may be carried out. In this process, a horizontal apparatus equipped with a stirring blade having excellent surface renewal ability such as a paddle blade, a lattice blade and a spectacle-shaped blade, or a thin film evaporator is suitably used.

It is desired that the content of foreign materials in the thermoplastic resin of the present invention is as small as possible, and filtration of a melting raw material, filtration of a catalyst solution, etc. are suitably carried out. The mesh of the filter is preferably 5 µm or less, and more preferably 1 µm or less. Moreover, filtration of the produced resin using a polymer filter is suitably carried out. The mesh of the polymer filter is preferably 100 µm or less, and more preferably 30 µm or less. Further, the process of obtaining a resin pellet should definitely be carried out in a low-dust environment, which is preferably Class 6 or lower, and more preferably Class 5 or lower.

Examples of methods for molding the polycarbonate resin include, but are not limited to, injection molding, compression molding, cast molding, roll processing, extrusion molding and stretching.

(4) Optical Molded Body

An optical molded body can be produced using the thermoplastic resin of the present invention. It is molded according to any method, for example, the injection molding method, compression molding method, extrusion molding method, solution casting method or the like. The thermoplastic resin of the present invention is excellent in moldability and heat resistance, and therefore can be advantageously used particularly for optical lenses which require injection molding. At the time of molding, the thermoplastic resin of the present invention can be mixed with another resin such as a polycarbonate resin and a polyester resin to be used. In addition, additives such as an antioxidant, a processing stabilizer, a light stabilizer, a heavy metal deactivator, a flame retardant, a lubricant, an antistatic agent, a surfactant, an antimicrobial agent, a mold release agent, an ultraviolet absorber, a plasticizer and a compatibilizer may be mixed therewith.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl) isocyanurate and 3,9-bis{1,1-dimethyl-2-[β-(3-tert-butyl-4-hydroxy-5-methylphenyl)propionyloxy] ethyl}-2,4,8,10-tetraoxaspiro(5,5)undecane. The content of the antioxidant in the thermoplastic resin is preferably 0.001 to 0.3 parts by weight relative to 100 parts by weight of the thermoplastic resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonate, tetrakis(2,4-di-t-butylphenyl)-4,3'-biphenylene diphosphonate, tetrakis(2,4-di-t-butylphenyl)-3,3'-biphenylene diphosphonate, bis(2,4-di-tert-butylphenyl)-4-phenyl-phenylphosphonate and bis(2,4-di-tert-butylphenyl)-3-phenyl-phenylphosphonate. The content of the phosphorus-based processing heat stabilizer in the thermoplastic resin is preferably 0.001 to 0.2 parts by weight relative to 100 parts by weight of the thermoplastic resin.

Examples of the sulfur-based processing heat stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based processing heat stabilizer in the thermoplastic resin is preferably 0.001 to 0.2 parts by weight relative to 100 parts by weight of the thermoplastic resin.

Regarding the mold release agent, it is preferred that 90 wt % or more of it is made of an ester of an alcohol and a fatty acid. Specific examples of the ester of an alcohol and a fatty acid include an ester of a monohydric alcohol and a fatty acid and a partial ester or whole ester of a polyhydric alcohol and a fatty acid. As the above-described ester of a monohydric alcohol and a fatty acid, an ester of a monohydric alcohol having 1 to 20 carbon atoms and a saturated fatty acid having 10 to 30 carbon atoms is preferred. Further, as the partial ester or whole ester of a polyhydric alcohol and a fatty acid, a partial ester or whole ester of a polyhydric alcohol having 1 to 25 carbon atoms and a saturated fatty acid having 10 to 30 carbon atoms is preferred.

Specific examples of the ester of a monohydric alcohol and a saturated fatty acid include stearyl stearate, palmityl palmitate, butyl stearate, methyl laurate and isopropyl palmitate. Specific examples of the partial ester or whole ester of a polyhydric alcohol and a saturated fatty acid include whole esters or partial esters of monoglyceride stearate, monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritols such as dipentaerythritol hexastearate. The content of these mold release agents is preferably 0.005 to 2.0 parts by weight, more preferably 0.01 to 0.6 parts by weight, and even more preferably 0.02 to 0.5 parts by weight relative to 100 parts by weight of the thermoplastic resin.

The ultraviolet absorber is preferably at least one ultraviolet absorber selected from the group consisting of a benzotriazole-based ultraviolet absorber, a benzophenone-based ultraviolet absorber, a triazine-based ultraviolet absorber, a cyclic iminoester-based ultraviolet absorber and a cyanoacrylate-based ultraviolet absorber. That is, ultraviolet absorbers mentioned below may be used solely, or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxybenzophenone-5-sulfonic acid hydrate, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and even more preferably 0.05 to 0.8 parts by weight relative to 100 parts by weight of the thermoplastic resin. When the content is within these ranges, sufficient weatherability can be imparted to the thermoplastic resin according to intended use.

The thermoplastic resin of the present invention has a high refractive index and a low Abbe number. Moreover, other than as optical lenses, the thermoplastic resin can be advantageously used as a structural material of optical components such as a liquid crystal display, an organic EL display, a transparent conductive substrate to be used for a solar cell, etc., an optical disk, a liquid crystal panel, an optical card, a sheet, a film, an optical fiber, a connector, a vapor-deposited plastic reflection mirror and a display, or as an optical molded body appropriate for use as a functional material.

To the surface of the optical molded body, a coat layer such as an antireflection layer, a hard coat layer or the like may be provided according to need. The antireflection layer may be either a single layer or a multilayer, and may be made of either an organic substance or an inorganic substance, but is preferably made of an inorganic substance.

Specific examples thereof include oxides and fluorides such as silicon oxide, aluminium oxide, zirconium oxide, titanium oxide, cerium oxide, magnesium oxide and magnesium fluoride.

(5) Optical Lens

An optical lens produced by using the thermoplastic resin of the present invention has a high refractive index, a low Abbe number and high moist heat resistance, and therefore can be used in the field in which expensive glass lenses having a high refractive index have been conventionally used including telescopes, binoculars and television projectors and is very useful. The optical lens is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses.

The optical lens is molded by any method such as the injection molding method, the compression molding method and the injection compression molding method. According to the present invention, an aspherical lens having a high refractive index and low birefringence, which is technically difficult to obtain by processing a glass lens, can be more conveniently obtained.

In order to avoid mixing of a foreign material in the optical lens as much as possible, the molding environment must be a low-dust environment, and it is preferably Class 6 or lower, and more preferably Class 5 or lower.

(6) Optical Film

An optical film produced by using the thermoplastic resin of the present invention has excellent transparency and heat resistance, and therefore is suitably used for a film for liquid crystal substrates, an optical memory card, etc.

In order to avoid mixing of a foreign material in the optical film as much as possible, the molding environment must be a low-dust environment, and it is preferably Class 6 or lower, and more preferably Class 5 or lower.

Abbreviations 6,6'-DPBHBNA: Bis-2,2'-(2-hydroxyethoxy)-6,6'-diphenyl-1,1'-bisnaphthyl
6,6'-DPMHBNA: 2-(2-hydroxyethoxy)-2'-hydroxy-6,6'-diphenyl-1,1'-bisnaphthyl
6,6'-DPTHBNA: 2-(2-hydroxyethoxy)-2'-[(2-hydroxyethoxy)ethoxy]-6,6'-diphenyl-1,1'-bisnaphthyl
% b.w.: % by weight
DSC: differential scanning calorimetry
LOD: Loss on drying
m.p.: melting point
MeOH: Methanol
NaOH: sodium hydroxide
NIR: near infrared
PXRD: powder X-ray diffraction
TLC: thin layer chromatography
UPLC: Ultra Performance Liquid Chromatography

EXAMPLES

<1. Method for Measuring Weight Average Molecular Weight (Mw)>

The polystyrene equivalent weight-average molecular weight was obtained from a standard curve of a standard polystyrene produced in advance based on JIS K 7252-3. Specifically, a standard curve was prepared using a standard polystyrene having an already-known molecular weight (molecular weight distribution=1) ("PStQuick MP-M" manufactured by Tosoh Corporation), the elution time and molecular weight value of each peak were plotted based on the measured standard polystyrene, and three-dimensional approximation was conducted to obtain a calibration curve. Mw was calculated based on the following formula:

$$Mw = \Sigma(Wi \times Mi) \div \Sigma(Wi)$$

In the formula, "i" represents the "i"th dividing point when dividing the molecular weight M, "Wi" represents the "i"th weight, and "Mi" represents the "i"th molecular weight. The molecular weight M represents the value of the molecular weight of polystyrene at the corresponding elution time in the calibration curve. As a GPC apparatus, HLC-8320GPC manufactured by Tosoh Corporation was used. As a guard column, TSKguardcolumn SuperMPHZ-M was used. As analysis columns, three columns (TSKgel SuperMultiporeHZ-M) were connected in series and used. The other conditions were as described below.

Solvent: HPLC grade tetrahydrofuran
Injection volume: 10 μL
Concentration of sample: 0.2 w/v % HPLC grade chloroform solution
Solvent flow rate: 0.35 ml/min
Measurement temperature: 40° C.
Detector: RI <2. Glass Transition Temperature (Tg)>

The glass transition temperature was measured by differential scanning calorimetry (DSC) according to JIS K7121-1987. The measuring device was X-DSC7000 manufactured by Hitachi High-Tech Science Corporation.

<3. Refractive Index (nD)>

The refractive index of a film having a thickness of 0.1 mm made of a resin produced in the Examples was measured using an Abbe refractometer according to the method of JIS-K-7142.

<4. Abbe Number (ν)>

The refractive index of a film having a thickness of 0.1 mm made of a resin produced in the Examples was measured using an Abbe refractometer at 23° C. and at wavelengths of 486 nm, 589 nm and 656 nm. Then, the Abbe number was calculated using the below-described formula.

$$\nu = (nD - 1)/(nF - nC)$$

nD: refractive index at a wavelength of 589 nm
nC: refractive index at a wavelength of 656 nm
nF: refractive index at a wavelength of 486 nm <5. b Value>

The produced resin was dried at 120° C. for 4 hours in vacuum, and then injection-molded by an injection molding machine (FANUC ROBOSHOT α-S30iA) at a cylinder temperature of 270° C. and a mold temperature of Tg−10° C. to obtain a disc-shaped test plate piece having a diameter of 50 mm and a thickness of 3 mm. This plate piece was used to measure the b value in accordance with JIS K 7105. When the b value is smaller, the plate is less yellowish and thus the hue is better. For the measurement, a SE2000 type spectrocolorimeter manufactured by Nippon Denshoku Industries Co., Ltd. was used.

<6. Pressure Cooker Test (PCT Test)>

The produced resin was dried at 120° C. for 4 hours in vacuum, and then injection-molded by an injection molding machine (FANUC ROBOSHOT α-S30iA) at a cylinder temperature of 270° C. and a mold temperature of Tg of resin −10° C. to obtain a disc-shaped test plate piece having a diameter of 50 mm and a thickness of 3 mm. This plate piece was exposed at 130° C. and at a relative humidity of 85% rh for 48 hours.

<7. Total Light Transmittance>

The total light transmittance of the plate piece before and after the PCT test was measured using a SE2000 type spectrocolorimeter manufactured by Nippon Denshoku Industries Co., Ltd. according to the method of JIS-K-7361-1.

<8. Total Light Transmittance Retention Rate (%)>

The total light transmittance retention rate was calculated according to the below-described formula using the values of the total light transmittance measured by the above-described method.

Total light transmittance retention rate (%)=total light transmittance after PCT test/total light transmittance before PCT test×100

<9. Amount of Vinyl Terminal Group of Polycarbonate Resin>

$^1$H-NMR measurement was carried out under the below-described conditions.

$^1$H-NMR Measurement Conditions
  Apparatus: Bruker AVANZE III HD 500 MHz
  Flip angle: 30 degrees
  Wait time: 1 second
  Cumulative number: 500 times
  Measurement temperature: room temperature (298K)
  Concentration: 5 wt %
  Solvent: deuterated chloroform
  Internal standard substance: tetramethylsilane (TMS) 0.05 wt %

<10. Measurement of Amounts of Phenol and Diphenyl Carbonate (DPC) in Polycarbonate Resin>

0.5 g of a sample of Example 1 which will be described in detail later was dissolved in 50 ml of tetrahydrofuran (THF) to obtain a sample solution. A standard curve was created from a pure form of each of compounds as a preparation. 2 µL of the sample solution was quantitatively analyzed by LC-MS under the below-described measurement conditions. The detection limit under the measurement conditions is 0.01 ppm.

LC-MS Measurement Conditions:
  Measurement apparatus (LC part): Agilent Infinity 1260 LC System
  Column: ZORBAX Eclipse XDB-18 and guard cartridge
  Mobile phase:
    A: 0.01 mol/L—aqueous solution of ammonium acetate
    B: 0.01 mol/L—methanol solution of ammonium acetate
    C: THF
  Gradient program of mobile phase:

As shown in Table 1, mixtures of the above-described A to C were used as mobile phases. The mobile phases were flowed in the column for 30 minutes while the compositions of the mobile phases were switched when the time (minutes) shown in Table 1 lapsed.

TABLE 1

| Time | Mobile phase composition (% by volume) | | |
|---|---|---|---|
| (min) | A | B | C |
| 0 | 10 | 75 | 15 |
| 10.0 | 9 | 67.5 | 23.5 |

TABLE 1-continued

| Time | Mobile phase composition (% by volume) | | |
|---|---|---|---|
| (min) | A | B | C |
| 10.1 | 0 | 25 | 75 |
| 30.0 | 0 | 25 | 75 |

Flow rate: 0.3 ml/min
Column temperature: 45° C.
Detector: UV (225 nm)
Measurement apparatus (MS part): Agilent 6120 single quad LCMS System
Ionization source: ESI
Polarity: Positive (DPC) and Negative (PhOH)
Fragmentor: 70 V
Dry gas: 10 L/min, 350° C.
Nebulizer: 50 psi
Capillary voltage: 3000 V (positive), 2500 V (negative)
Ion Measured:

TABLE 2

| Monomer | Ion type | m/z |
|---|---|---|
| PhOH | [M − H]− | 93.1 |
| DPC | [M + NH4]+ | 232.1 |

Amount of injected sample: 2 µL
Analytical Methods for Monomers:

<11: Powder X-Ray Diffraction (PXRD)>

Powder X-Ray Diffraction (PXRD) patterns were recorded with a D8 Discover X-ray diffractometer of Bruker AXS GmbH, Germany, in reflection geometry (Bragg Brentano) using Cu Kα radiation (40 kV, 40 mA) as an X-Ray source. The data were collected at room temperature in the range from 2θ=5.0° to 2θ=80.0° with a resolution of 0.025° and measurement time of 0.5 s/step.

<12: DSC Measurements>

DSC measurements were performed using a Linseis Chip-DSC 10. The heating-rate was 20° C./min.

<13: Measurement of Melting Points>

Melting points were determined by the capillary method using a Büchi Melting Point B-545 apparatus with a heating rate of 1 K/min.

<14: NIR Spectroscopy>

NIR spectroscopic analyses were recorded by means of a Bruker FT-NIR spectrometer Matrix F spectrometer and Bruker Opus 5.5 software and a reflection immersible probe head.

<15: Determination of Purity>

Purity was determined by UPLC, which was carried out using the following system and operating conditions:
  Waters Acquity UPLC H-Class Systems; column: Acquity UPLC BEH C18, 1.7 µm, 2×100 mm; column temperature: 40° C., gradient: acetonitrile/water (acrylnitrile; ACN: 0 min 48%, 21 min 50%, 26 min 100%, 28 min 100%, 28.1 min 48%, 32 min 48%); injection volume: 0.8 µl; flow rate 0.6 ml/min; detection at 210 nm.

<16: Measurement of the Content of Volatile Solvents>

The contents of volatile solvents were determined by gas chromatography using a Shimadzu GC 14 B with Class VP 4.3 software, an AOC-20i auto injector, an AOC-20s auto sampler and an FID detector.

As a column the PE 624 20 (Perkin Elmer) with the following dimensions: 30 m×0.53 mm was used. The GC was carried out under the following operation conditions:

carrier gas: hydrogen
pressure: 0.3 bar
injection temperature: 250° C.
detection temperature: 300° C.
column temp.: 40° C. (2 min), 20° C./min, 200° C. (2 min)
concentration: C=20 mg/ml
injected volume: 0.2-2 µl As an internal standard 100 mg of naphthaline in 10 ml of dimethylformamide was used. Samples were prepared by dissolving 20 mg of product in 0.1 ml of internal standard solution to which 0.9 ml of dimethylformamide were added. The solvent content was calculated by the following equation:

$$S_{solv}*M_{St}*100/(S_{St}*M_{sample}*RRF)$$

where:
- $M_{St}$: amount of internal standard in sample solution
- $M_{sample}$: weight of sample
- $S_{solv}$: area of solvent peak
- $S_{St}$: area of standard peak
- RRF: relative response factor for solvent <17: Measurement of the Yellowness Index>

The yellowness index YI of 6,6'-DPBHBNA can be determined by analogy to ASTN E313 using the following protocol: 1 g of 6,6'-DPBHBNA is dissolved in 19 g of dichloromethane. The solution is transferred into a 50 mm cuvette and transmission is determined in the range 300-800 nm by a Shimadzu UV-Visible spectrophotometer UV-1650PC. Dichloromethane is used as a reference. From the spectra the yellowness index can be calculated by using the Software "RCA-software UV2DAT" in accordance with ASTM E308 (Standard practice for computing the colors of objects by using the CIE System) und ASTM E 313 (Standard practice for calculating yellowness and whiteness indices from instrumentally measured color coordinates).

<17: Measurement of the Haze>

The haze can be determined by measuring the transmission at 860 nm of a 5% solution of 6,6'-DPBHBNA in dichloromethane by a standard nephelometer.

<18: Microscopy>

Microscopic images were taken by using a Nikon Eclipse TS 100 microscope at 100 fold magnification equipped with photo-unit Nikon Digital Sight DS-U1. From these microphotographs, the width (W), length (L) and the aspect ratio (L/W ratio) were determined.

[Production of Polycarbonate Resin]

Example 1

As raw materials, 31.6 kg (60.0 mol) of 2,2'-bis(2-hydroxyethoxy)-6,6'-diphenyl-1,1'-binaphthalene (hereinafter sometimes abbreviated as "BINL-2EO"), 13.5 kg (63.0 mol) of diphenyl carbonate (hereinafter sometimes abbreviated as "DPC") and 0.074 g ($8.8 \times 10^{-4}$ mol) of sodium hydrogen carbonate were put into a 50 L reactor equipped with a stirring machine and a distillation apparatus, and the mixture was heated to 180° C. under nitrogen atmosphere and under 760 mmHg. 20 minutes after the initiation of heating, complete dissolution of the raw materials was confirmed, and after that, it was stirred for 120 minutes under the same conditions. After that, the degree of pressure reduction was adjusted to 200 mmHg, and simultaneously, the temperature was elevated to 200° C. at a rate of 60° C./hr. During this, initiation of distillation of by-produced phenol was confirmed. After that, the mixture was kept at 200° C. for 40 minutes to perform a reaction. Further, the temperature was elevated to 240° C. at a rate of 75° C./hr, and 10 minutes after the completion of elevating the temperature, the degree of pressure reduction was adjusted to 1 mmHg or lower over 1 hour while the temperature was kept. After that, the temperature was elevated to 245° C. at a rate of 60° C./hr, and the mixture was stirred for 30 minutes. After the reaction was completed, nitrogen was introduced into the reactor to obtain ordinary pressure, and the produced polycarbonate resin was taken out while being pelletized. The amounts of phenol and diphenyl carbonate (DPC) that are impurities in the obtained polycarbonate resin were measured in the above-described manner. In the resin, the amount of phenol was 100 mass ppm, and the amount of DPC was 300 mass ppm The values of physical properties of the obtained resin are shown in Table 3 below.

Example 2-A

The operation was carried out in a manner similar to that in Example 1, except that as raw materials, 7.9 kg (15.0 mol) of BINL-2EO, 24.2 kg (45.0 mol) of BNEF and 13.5 kg (63.0 mol) of DPC were used.

Example 2-B

The operation was carried out in a manner similar to that in Example 1, except that as raw materials, 15.8 kg (30.0 mol) of BINL-2EO, 16.2 kg (30.0 mol) of BNEF and 13.5 kg (63.0 mol) of DPC were used.

Example 2-C

The operation was carried out in a manner similar to that in Example 1, except that as raw materials, 23.7 kg (45.0 mol) of BINL-2EO, 8.1 kg (15.0 mol) of BNEF and 13.5 kg (63.0 mol) of DPC were used.

The values of physical properties of the obtained resins are shown in Table 3. Further, the NMR chart of the resin obtained in Example 2-B (BINOL-2EO/BNEF=50 mol/50 mol) is shown in FIG. 1.

Example 3-A

The operation was carried out in a manner similar to that in Example 1, except that as raw materials, 7.9 kg (15.0 mol) of BINL-2EO, 19.0 kg (45.0 mol) of 9,9-bis[4-(2-hydroxyethoxy)phenyl]fluorene (hereinafter sometimes abbreviated as "BPEF") and 13.5 kg (63.0 mol) of DPC were used. The values of physical properties of the obtained resin are shown in Table 3.

Example 3-B

The operation was carried out in a manner similar to that in Example 1, except that as raw materials, 15.8 kg (30.0 mol) of BINL-2EO, 12.7 kg (30.0 mol) of 9,9-bis[4-(2-hydroxyethoxy)phenyl]fluorene (hereinafter sometimes abbreviated as "BPEF") and 13.5 kg (63.0 mol) of DPC were used. The values of physical properties of the obtained resin are shown in Table 3.

Example 3-C

The operation was carried out in a manner similar to that in Example 1, except that as raw materials, 23.7 kg (45.0 mol) of BINL-2EO, 6.3 kg (15.0 mol) of 9,9-bis[4-(2-hydroxyethoxy)phenyl]fluorene (hereinafter sometimes abbreviated as "BPEF") and 13.5 kg (63.0 mol) of DPC were used. The values of physical properties of the obtained resin are shown in Table 3.

Example 4-A

The operation was carried out in a manner similar to that in Example 1, except that as raw materials, 7.9 kg (15.0 mol) of BINL-2EO, 25.9 kg (45.0 mol) of BPPEF and 13.5 kg (63.0 mol) of DPC were used. The values of physical properties of the obtained resin are shown in Table 3.

Example 4-B

The operation was carried out in a manner similar to that in Example 1, except that as raw materials, 15.8 kg (30.0 mol) of BINL-2EO, 17.2 kg (30.0 mol) of BPPEF and 13.5 kg (63.0 mol) of DPC were used. The values of physical properties of the obtained resin are shown in Table 3.

Example 4-C

The operation was carried out in a manner similar to that in Example 1, except that as raw materials, 23.7 kg (45.0 mol) of BINL-2EO, 8.6 kg (15.0 mol) of BPPEF and 13.5 kg (63.0 mol) of DPC were used. The values of physical properties of the obtained resin are shown in Table 3.

Example 5

The operation was carried out in a manner similar to that in Example 1, except that as raw materials, 7.6 kg (18.0 mol) of BPEF, 26.3 kg (42.0 mol) of 2,2'-bis(2-hydroxyethoxy)-6,6'-di(naphthalene-1-yl)-1,1'-binaphthalene (hereinafter sometimes abbreviated as "DNBINOL-2EO") and 13.5 kg (63.0 mol) of DPC were used. The values of physical properties of the obtained resin are shown in Table 3.

Example 6-A

The operation was carried out in a manner similar to that in Example 1, except that as raw materials, 7.9 kg (15.0 mol) of BINL-2EO, 9.7 kg (18.0 mol) of BNEF, 10.1 kg (27.0 mol) of 2,2'-bis(2-hydroxyethoxy)-1,1'-binaphthalene (hereinafter sometimes abbreviated as "BNE") and 13.5 kg (63.0 mol) of DPC were used. The values of physical properties of the obtained resin are shown in Table 3.

Example 6-B

The operation was carried out in a manner similar to that in Example 1, except that as raw materials, 19.0 kg (36.0 mol) of BINL-2EO, 4.5 kg (12.0 mol) of BNE, 5.1 kg (12.0 mol) of BPEF and 13.5 kg (63.0 mol) of DPC were used. The values of physical properties of the obtained resin are shown in Table 3.

Example 6-C

The operation was carried out in a manner similar to that in Example 1, except that as raw materials, 19.0 kg (36.0 mol) of BINL-2EO, 4.5 kg (12.0 mol) of BNE, 6.9 kg (12.0 mol) of BPPEF and 13.5 kg (63.0 mol) of DPC were used. The values of physical properties of the obtained resin are shown in Table 3.

BINL-2EO used in Examples 1, 2-A to 2-C, 3-A to 3-C, 4-A to 4-C and 6-A to 6-C are the form A obtained in Example 21 of which details are stated below.

Example 6-D

The operation was carried out in a manner similar to that in Example 1, except that as raw materials, 11.3 kg (21.0 mol) of BNEF, 11.2 kg (30.0 mol) of BNE, 5.6 kg (9.0 mol) of DNBINOL-2EO and 13.5 kg (63.0 mol) of DPC were used. The values of physical properties of the obtained resin are shown in Table 3.

Example 6-E

The operation was carried out in a manner similar to that in Example 1, except that as raw materials, 6.7 kg (18.0 mol) of BNE, 17.2 kg (30.0 mol) of BPPEF, 7.5 kg (12.0 mol) of DNBINOL-2EO and 13.5 kg (63.0 mol) of DPC were used. The values of physical properties of the obtained resin are shown in Table 3.

Example 6-F

The operation was carried out in a manner similar to that in Example 1, except that as raw materials, 6.7 kg (18.0 mol) of BNE, 10.1 kg (24.0 mol) of BPEF, 11.3 kg (18.0 mol) of DNBINOL-2EO and 13.5 kg (63.0 mol) of DPC were used. The values of physical properties of the obtained resin are shown in Table 3.

Example 7

The operation was carried out in a manner similar to that in Example 1, except that as raw materials, 32.0 kg (51.0 mol) of 2,2'-bis(2-hydroxyethoxy)-6,6'-di(naphthalene-2-yl)-1,1'-binaphthalene (2DNBINOL-2EO), 3.8 kg (9.0 mol) of BPEF and 13.5 kg (63.0 mol) of DPC were used. The values of physical properties of the obtained resin are shown in Table 3.

Example 7-A

The operation was carried out in a manner similar to that in Example 1, except that as raw materials, 18.8 kg (30.0 mol) of 2,2'-bis(2-hydroxyethoxy)-6,6'-di(naphthalene-2-yl)-1,1'-binaphthalene (2DNBINOL-2EO), 12.7 kg (30.0 mol) of BPEF and 13.5 kg (63.0 mol) of DPC were used. The values of physical properties of the obtained resin are shown in Table 3.

Example 7-B

The operation was carried out in a manner similar to that in Example 1, except that as raw materials, 5.6 kg (9.0 mol) of 2,2'-bis(2-hydroxyethoxy)-6,6'-di(naphthalene-2-yl)-1,1'-binaphthalene (2DNBINOL-2EO), 21.5 kg (51.0 mol) of BPEF and 13.5 kg (63.0 mol) of DPC were used. The values of physical properties of the obtained resin are shown in Table 3.

Example 8

The operation was carried out in a manner similar to that in Example 1, except that as raw materials, 37.1 kg (51.0 mol) of 2,2'-bis(2-hydroxyethoxy)-6,6'-di(phenanthrene-9-yl)-1,1'-binaphthalene (9DPNBINOL-2EO), 3.8 kg (9.0 mol) of BPEF and 13.5 kg (63.0 mol) of DPC were used. The values of physical properties of the obtained resin are shown in Table 1.

Example 8-A

The operation was carried out in a manner similar to that in Example 1, except that as raw materials, 21.8 kg (30.0 mol) of 2,2'-bis(2-hydroxyethoxy)-6,6'-di(phenanthrene-9-yl)-1,1'-binaphthalene (9DPNBINOL-2EO), 12.7 kg (30.0 mol) of BPEF and 13.5 kg (63.0 mol) of DPC were used. The values of physical properties of the obtained resin are shown in Table 3.

Example 8-B

The operation was carried out in a manner similar to that in Example 1, except that as raw materials, 6.5 kg (9.0 mol) of 2,2'-bis(2-hydroxyethoxy)-6,6'-di(phenanthrene-9-yl)-1,1'-binaphthalene (9DPNBINOL-2EO), 21.5 kg (51.0 mol) of BPEF and 13.5 kg (63.0 mol) of DPC were used. The values of physical properties of the obtained resin are shown in Table 3.

Example 9

The operation was carried out in a manner similar to that in Example 1, except that as raw materials, 10.4 kg (18.0 mol) of 6,6'-di-(3-cyanophenyl)-2,2'-bis-(2-hydroxyethoxy)-1,1'-binaphthyl (CN-BNA), 18.4 kg (42.0 mol) of BPEF and 13.5 kg (63.0 mol) of DPC were used. The values of physical properties of the obtained resin are shown in Table 3.

Example 10

The operation was carried out in a manner similar to that in Example 1, except that as raw materials, 12.7 kg (18.0 mol) of 6,6'-di-(dibenzo[b,d]furan-4-yl)-2,2'-bis-(2-hydroxyethoxy)-1,1'-binaphthyl (FUR-BNA), 18.4 kg (42.0 mol) of BPEF and 13.5 kg (63.0 mol) of DPC were used. The values of physical properties of the obtained resin are shown in Table 3.

Example 11

The operation was carried out in a manner similar to that in Example 1, except that as raw materials, 13.3 kg (18.0 mol) of 6,6'-di-(dibenzo[b,d]thien-4-yl)-2,2'-bis-(2-hydroxyethoxy)-1,1'-binaphthyl (THI-BNA), 18.4 kg (42.0 mol) of BPEF and 13.5 kg (63.0 mol) of DPC were used. The values of physical properties of the obtained resin are shown in Table 3.

Comparative Example 1

The operation was carried out in a manner similar to that in Example 1, except that as raw materials, 22.5 kg (60.0 mol) of BNE and 13.5 g (63.0 mol) of DPC were used. The values of physical properties of the obtained resin are shown in Table 3.

TABLE 3

| | Composition ratio | | | | | | | | | |
|---|---|---|---|---|---|---|---|---|---|---|
| | BINL-2EO mol % | BNEF mol % | BNE mol % | BPEF mol % | BPPEF mol % | DNBINOL-2EO mol % | 2DNBINOL-2EO mol % | 9DPNBINOL-2EO mol % | CN-BNA mol % | FUR-BNA mol % | THI-BNA mol % |
| Example 1 | 100 | 0 | 0 | 0 | 0 | 0 | 0 | 0 | 0 | 0 | 0 |
| Example 2-A | 25 | 75 | 0 | 0 | 0 | 0 | 0 | 0 | 0 | 0 | 0 |
| Example 2-B | 50 | 50 | 0 | 0 | 0 | 0 | 0 | 0 | 0 | 0 | 0 |
| Example 2-C | 75 | 25 | 0 | 0 | 0 | 0 | 0 | 0 | 0 | 0 | 0 |
| Example 3-A | 25 | 0 | 0 | 75 | 0 | 0 | 0 | 0 | 0 | 0 | 0 |
| Example 3-B | 50 | 0 | 0 | 50 | 0 | 0 | 0 | 0 | 0 | 0 | 0 |
| Example 3-C | 75 | 0 | 0 | 25 | 0 | 0 | 0 | 0 | 0 | 0 | 0 |
| Example 4-A | 25 | 0 | 0 | 0 | 75 | 0 | 0 | 0 | 0 | 0 | 0 |
| Example 4-B | 50 | 0 | 0 | 0 | 50 | 0 | 0 | 0 | 0 | 0 | 0 |
| Example 4-C | 75 | 0 | 0 | 0 | 25 | 0 | 0 | 0 | 0 | 0 | 0 |
| Example 5 | 0 | 0 | 0 | 30 | 0 | 70 | 0 | 0 | 0 | 0 | 0 |
| Example 6-A | 25 | 30 | 45 | 0 | 0 | 0 | 0 | 0 | 0 | 0 | 0 |
| Example 6-B | 60 | 0 | 20 | 20 | 0 | 0 | 0 | 0 | 0 | 0 | 0 |
| Example 6-C | 60 | 0 | 20 | 0 | 20 | 0 | 0 | 0 | 0 | 0 | 0 |
| Example 6-D | 0 | 35 | 50 | 0 | 0 | 15 | 0 | 0 | 0 | 0 | 0 |
| Example 6-E | 0 | 0 | 30 | 0 | 50 | 20 | 0 | 0 | 0 | 0 | 0 |
| Example 6-F | 0 | 0 | 30 | 40 | 0 | 30 | 0 | 0 | 0 | 0 | 0 |
| Example 7 | 0 | 0 | 0 | 15 | 0 | 0 | 85 | 0 | 0 | 0 | 0 |
| Example 7-A | 0 | 0 | 0 | 50 | 0 | 0 | 50 | 0 | 0 | 0 | 0 |
| Example 7-B | 0 | 0 | 0 | 85 | 0 | 0 | 15 | 0 | 0 | 0 | 0 |
| Example 8 | 0 | 0 | 0 | 15 | 0 | 0 | 0 | 85 | 0 | 0 | 0 |
| Example 8-A | 0 | 0 | 0 | 50 | 0 | 0 | 0 | 50 | 0 | 0 | 0 |
| Example 8-B | 0 | 0 | 0 | 85 | 0 | 0 | 0 | 15 | 0 | 0 | 0 |
| Example 9 | 0 | 0 | 0 | 70 | 0 | 0 | 0 | 0 | 30 | 0 | 0 |
| Example 10 | 0 | 0 | 0 | 70 | 0 | 0 | 0 | 0 | 0 | 30 | 0 |
| Example 11 | 0 | 0 | 0 | 70 | 0 | 0 | 0 | 0 | 0 | 0 | 30 |
| Comparative Example 1 | 0 | 0 | 100 | 0 | 0 | 0 | 0 | 0 | 0 | 0 | 0 |

TABLE 3-continued

| | | | | Physical properties | | | | |
|---|---|---|---|---|---|---|---|---|
| | Mv — | Tg °C. | Refractive index (nD) — | Abbe number (v) — | Total light transmittance % | b value — | Moldability — | After PCT test Total light transmittance % |
| Example 1 | 11,300 | 162 | 1.697 | 15 | 87 | 4.2 | C | 87 |
| Example 2-A | 11,600 | 183 | 1.688 | 18 | 87 | 4.2 | B | 87 |
| Example 2-B | 11,900 | 175 | 1.690 | 17 | 87 | 4.1 | A | 87 |
| Example 2-C | 11,300 | 169 | 1.694 | 16 | 87 | 4.0 | B | 87 |
| Example 3-A | 12,400 | 150 | 1.655 | 20 | 88 | 4.1 | B | 88 |
| Example 3-B | 11,700 | 154 | 1.670 | 18 | 88 | 4.0 | A | 88 |
| Example 3-C | 12,000 | 158 | 1.684 | 16 | 88 | 4.0 | B | 88 |
| Example 4-A | 11,500 | 157 | 1.665 | 20 | 88 | 4.1 | B | 88 |
| Example 4-B | 11,700 | 159 | 1.675 | 18 | 88 | 4.1 | B | 88 |
| Example 4-C | 11,200 | 161 | 1.685 | 17 | 88 | 4.0 | B | 88 |
| Example 5 | 11,200 | 168 | 1.697 | 16 | 87 | 4.3 | C | 87 |
| Example 6-A | 12,200 | 148 | 1.682 | 18 | 88 | 4.1 | A | 88 |
| Example 6-B | 11,800 | 149 | 1.682 | 17 | 87 | 4.0 | B | 87 |
| Example 6-C | 12,100 | 152 | 1.683 | 17 | 87 | 4.1 | B | 87 |
| Example 6-D | 11,900 | 149 | 1.684 | 18 | 87 | 4.1 | A | 87 |
| Example 6-E | 11,600 | 149 | 1.672 | 19 | 88 | 4.2 | B | 88 |
| Example 6-F | 12,300 | 146 | 1.676 | 18 | 87 | 4.2 | B | 87 |
| Example 7 | 12,200 | 192 | 1.730 | 13 | 87 | 4.1 | B | 87 |
| Example 7-A | 12,300 | 173 | 1.698 | 15 | 87 | 4.2 | A | 87 |
| Example 7-B | 12,400 | 154 | 1.659 | 20 | 87 | 4.2 | B | 87 |
| Example 8 | 11,900 | 196 | 1.718 | 15 | 87 | 4.2 | B | 87 |
| Example 8-A | 12,000 | 177 | 1.693 | 17 | 87 | 4.2 | A | 87 |
| Example 8-B | 12,100 | 155 | 1.658 | 20 | 87 | 4.2 | B | 87 |
| Example 9 | 12,000 | 141 | 1.660 | 19 | 88 | 4.2 | A | 88 |
| Example 10 | 12,100 | 154 | 1.675 | 19 | 88 | 4.2 | A | 88 |
| Example 11 | 12,000 | 159 | 1.679 | 19 | 88 | 4.1 | A | 87 |
| Comparative Example 1 | 11,000 | 115 | 1.668 | 19 | 86 | 4.4 | D | 86 |

Examples:
BINL-2EO 2,2'-bis(2-hydroxyethoxy)-6,6'-diphenyl-1,1'-binaphthalene
BNEF 9,9-bis(6-(2-hydroxyethoxy)naphthalene-2-yl)fluorene
BNE 2,2'-bis(2-hydroxyethoxy)-1,1'-binaphtlalene
BPEF 9,9-bis(4-(2-hydroxyethoxy)phenyl)fluorene
BPPEF 9,9-bis(4-(2-hydroxyethoxy)-3-phenylphenyl)fluorene
DNBINOL-2EO 2,2'-bis(2-hydroxyethoxy)-6,6'-di(naphthalene-1-yl)-1,1-binaphthalene
2DNBINOL-2EO 2,2'-bis(2-hydroxyethoxy)-6,6'-di(naphthalene-2-yl)-1,1'-binaphthalene
9DPNBINOL-2EO 2,2'-bis(2-hydroxyethoxy)-6,6'-di(phenanthrene-9-yl)-1,1'-binaphthalene
CN-BNA 6,6'-di-(3-cyanophenyl)-2,2'-bis-(2-hydroxyethoxy)-1,1'-binaplithalene
FUR-BNA 6,6'-di-(dibenzo[b.d]furan-4-yl)-2,2'-bis-(2-hydroxyethoxy)-1,1'-binaphtlalene
THI-BNA 6,6'-di-(dibenzo[b.d]thiene-4-yl)-2,2'-bis-(2-hydroxyethoxy)-1,1'-binaphthalene
Comparative Example:
BNE 2,2'-bis(2-hydroxyethoxy)-1,1'-binaphthalene
[Moldability]
A: There is no void in a molded piece, and there is no corrugated portion on the surface thereof.
B: There is a void in a molded piece.
C: There is a corrugated portion on the surface of a molded piece.
D: There is a void in a molded piece, and there is a deformed portion on the surface thereof.

[Chemical Formula 41]

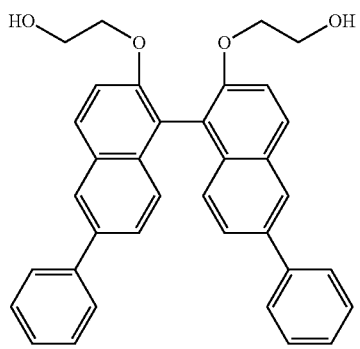

BINL-2EO-2,2'-bis(2-hydroxyethoxy)-6,6'-diphenyl-1,1'-binaphthalene

-continued

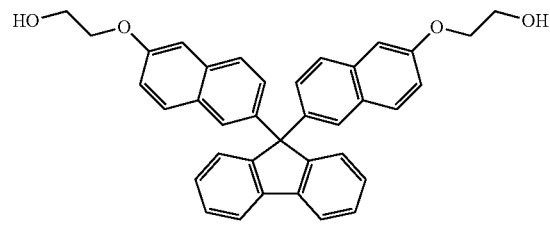

BNEF 9,9-bis(6-(2-hydroxyethoxy)naphthalene-2-yl)fluorene

-continued

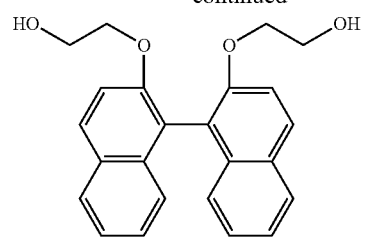
BNE 2,2′-bis(2-hydroxyethoxy)-1,1′-binaphthalene

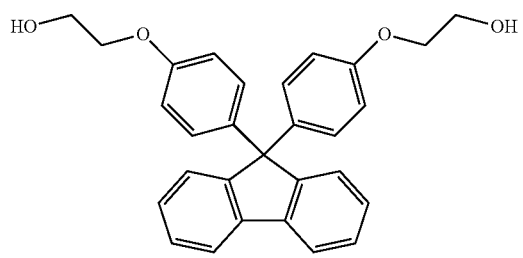
BPEF 9,9-bis[4-(2-hydroxyethoxy)phenyl]fluorene

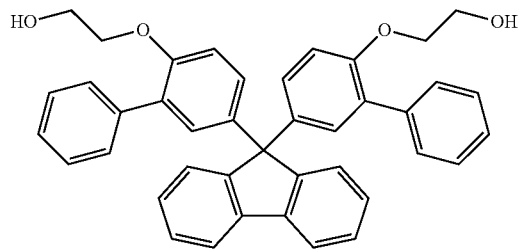
BPPEF 9,9-bis(4-(2-hydroxyethoxy)-3-phenylphenyl)fluorene

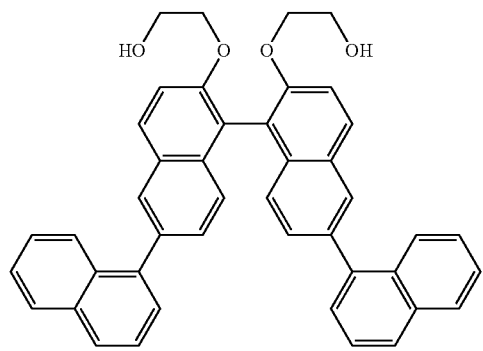
DNBINOL-2EO 2,2′-bis(2-hydorxyethoxy)-6,6′-di(naphthalene-1-yl)-1,1′-binaphthalene

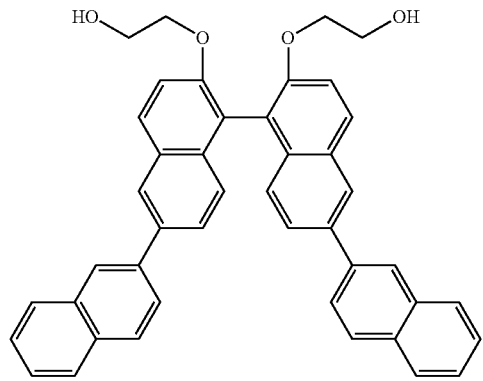
2DNBINOL-2EO 2,2′-bis(2-hydroxyethoxy)-6,6′-di(phenanthrene-9-yl)-1,1′-binaphthalene -continued

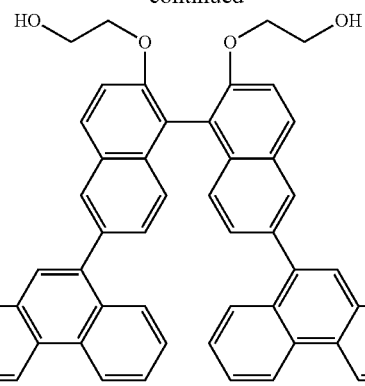
9DPNBINOL-2EO 2,2′-bis(2-hydroxyethoxy)-6,6′-di(phenanthrene-9-yl)-1,1′-binaphthalene

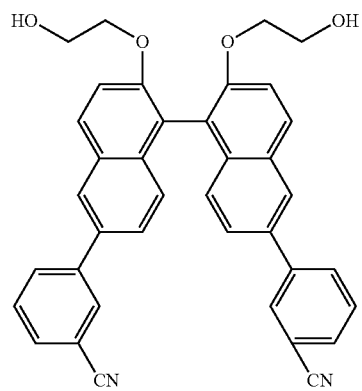
CN-BNA 6,6′-di-(3-cyanophenyl)-2,2′-bis-(2-hydorxyethoxy)-1,1′-binathalene

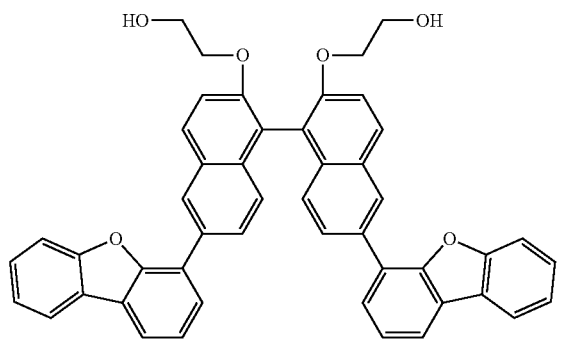
FUR-BNA 6,6′-di-(dibenzo[b,d]furan-4-yl)-2,2′-bis-(2-hydorxyethoxy)-1,1′-binaphthalene

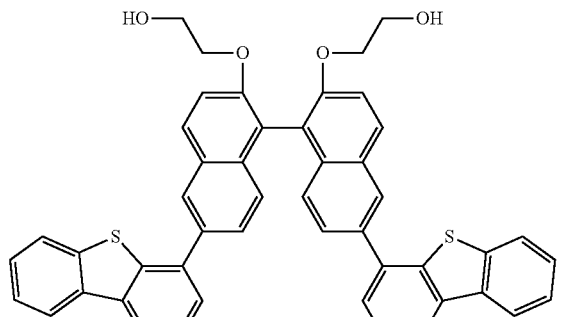
THI-BNA 6,6′-di-(dibanzo[b,d]thiene-4-yl)-2,2′-bis-2-hydroxyethoxy)-1,1′-binaphthalene

[Production of Polyester/Polyester Carbonate Resin]

Example 12

0.090 mol of 2,2'-bis(2-hydroxyethoxy)-6,6'-diphenyl-1,1'-binaphthalene (BINL-2EO) as a diol compound, 0.010 mol of 9,9-fluorene-methyl dipropionate (FDPM) as a carboxylic acid dialkyl, 0.120 mol of ethylene glycol (EG) and 0.001 mol of tetrabutoxytitanium as a transesterification catalyst were put into a reactor equipped with a stirring machine Sealing Mixer UZU manufactured by Nakamura Scientific Instruments Industry Co., Ltd. having a semilunar stirring blade and a distillation apparatus, and the mixture was heated to 180° C. and stirred for 30 minutes under nitrogen atmosphere and under ordinary pressure. After that, the temperature was elevated to 250° C. over 1 hour and the pressure was reduced to 0.13 kPa to perform a polymerization reaction. Subsequently, it was kept at 250° C. under 0.13 kPa for 1 hour, and then the content was taken out from the reactor, thereby obtaining a polyester resin. Physical properties of the obtained polyester resin are shown in Table 1.

Examples 13-18, Comparative Example 2

Polyester resins were obtained in a manner similar to that in Example 12, except that a diol compound described in Table 1 was used as a diol compound. Physical properties of the obtained polyester resins are shown in Table 1.

Example 19

0.110 mol of 2,2'-bis(2-hydroxyethoxy)-6,6'-diphenyl-1,1'-binaphthalene (BINL-2EO) as a diol compound, 0.100 mol of 9,9-fluorene-methyl dipropionate (FDPM) as a carboxylic acid dialkyl, 0.010 mol of diphenyl carbonate and 0.001 mol of tetrabutoxytitanium as a transesterification catalyst were put into a reactor equipped with a stirring machine Sealing Mixer UZU manufactured by Nakamura Scientific Instruments Industry Co., Ltd. having a semilunar stirring blade and a distillation apparatus, and the mixture was heated to 180° C. and stirred for 60 minutes under nitrogen atmosphere and under ordinary pressure. Distillation of phenol and methanol was confirmed. After that, the temperature was elevated to 240° C. over 1 hour and the pressure was reduced to 0.13 kPa to perform a polymerization reaction. Subsequently, it was kept at 240° C. under 0.13 kPa for 1 hour, and then the content was taken out from the reactor, thereby obtaining a polyester carbonate resin. Physical properties of the obtained polyester carbonate resin are shown in Table 1.

Example 20

0.10 mol of 2,2'-bis(2-hydroxyethoxy)-6,6'-diphenyl-1,1'-binaphthalene (BINL-2EO) as a diol compound, 0.06 mol of ethylene glycol (EG), 0.12 mol of 2,2'-bis(hydroxycarbonylmethoxy)-1,1'-binaphthyl (BINOL-DC) as a dicarboxylic acid and 0.001 mol of tetrabutoxytitanium as a catalyst were put into a reactor equipped with a stirring machine and a distillation apparatus, and the mixture was heated to 180° C. and stirred for 30 minutes under nitrogen atmosphere and under ordinary pressure. After that, the temperature was elevated to 255° C. and the pressure was reduced to 0.13 kPa or lower to perform a polymerization reaction. Subsequently, it was kept at 255° C. under 0.13 kPa for 1 hour, and then the content was taken out from the reactor, thereby obtaining a polyester resin. Physical properties of the obtained polyester resin are shown in Table 1.

TABLE 4

| | Raw materials | | | | | | | | | | |
|---|---|---|---|---|---|---|---|---|---|---|---|
| | Diol compound | | | | | | | | | Carboxylic acid dialkyl | Dicarboxylic acid |
| | BINL-2EO mol | DNBINOL-2EO mol | 2DNBINOL-2EO mol | 9DPNBINOL-2EO mol | CN-BNA mol | FUR-BNA mol | THI-BNA mol | BNE mol | EG mol | FDPM mol | BINOL-DC mol |
| Example 12 | 0.090 | — | — | — | — | — | — | — | 0.120 | 0.100 | — |
| Example 13 | — | 0.090 | — | — | — | — | — | — | 0.120 | 0.100 | — |
| Example 14 | — | — | 0.090 | — | — | — | — | — | 0.120 | 0.100 | — |
| Example 15 | — | — | — | 0.090 | — | — | — | — | 0.120 | 0.100 | — |
| Example 16 | — | — | — | — | 0.090 | — | — | — | 0.120 | 0.100 | — |
| Example 17 | — | — | — | — | — | 0.090 | — | — | 0.120 | 0.100 | — |
| Example 18 | — | — | — | — | — | — | 0.090 | — | 0.120 | 0.100 | — |
| Example 19 | 0.110 | — | — | — | — | — | — | — | — | 0.100 | — |
| Example 20 | 0.100 | — | — | — | — | — | — | — | 0.060 | — | 0.120 |
| Comparative Example 2 | — | — | — | — | — | — | — | 0.090 | 0.120 | 0.100 | — |

| | Raw materials | | Physical properties | | | | | Characteristics of resin | | |
|---|---|---|---|---|---|---|---|---|---|---|
| | | | | | | | | Before PCT test | After PCT test | |
| Raw materials | Diphenyl carbonate DPC mol | Catalyst Tetrabutoxy-titanium mol | Mw | Tg ° C. | Refractive index (uD) | Abbe number (v) | b value | Total light transmittance % | Total light transmittance % | Total light transmittance retention rate % |
| Example 12 | — | 0.001 | 11,000 | 149 | 1.664 | 18 | 6.4 | 88 | 88 | 100 |
| Example 13 | — | 0.001 | 12,000 | 158 | 1.680 | 15 | 6.3 | 87 | 87 | 100 |
| Example 14 | — | 0.001 | 12,000 | 170 | 1.696 | 15 | 6.2 | 87 | 86 | 99 |
| Example 15 | — | 0.001 | 12,100 | 174 | 1.690 | 16 | 6.3 | 88 | 88 | 100 |
| Example 16 | — | 0.001 | 12,000 | 133 | 1.667 | 17 | 6.5 | 88 | 87 | 99 |
| Example 17 | — | 0.001 | 12,100 | 155 | 1.689 | 16 | 6.2 | 88 | 87 | 99 |
| Example 18 | — | 0.001 | 12,000 | 164 | 1.698 | 16 | 6.1 | 87 | 87 | 100 |
| Example 19 | 0.010 | 0.001 | 12,500 | 149 | 1.665 | 18 | 7.0 | 87 | 87 | 100 |

TABLE 4-continued

| Example 20 | — | 0.001 | 22,000 | 148 | 1.695 | 16 | 6.0 | 87 | 87 | 100 |
| Comparative Example 2 | — | 0.001 | 11,000 | 121 | 1.641 | 21 | 8.4 | 88 | 84 | 95 |

[Chemical Formula 42]

Compounds of Examples

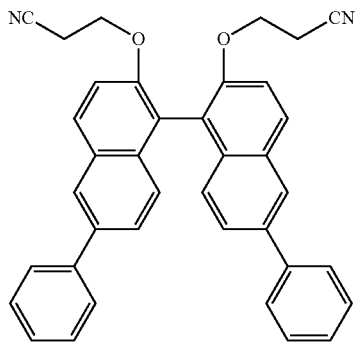

BINL-2EO
2,2'-bis(2-hydroxyethoxy))-6,6'-diphenyl-1,1'-binaphthalene

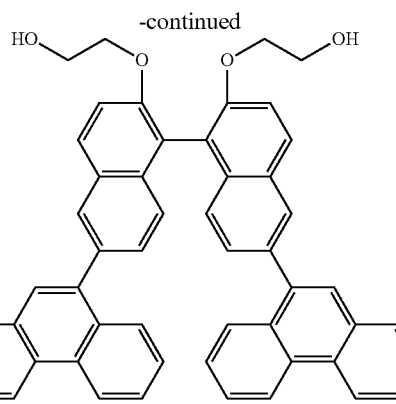

9DPNBINOL-2EO
2,2'-bis(2-hydroxyethoxy))-6,6'-di(phenanthrene-9-yl)-1,1'-binaphthalene

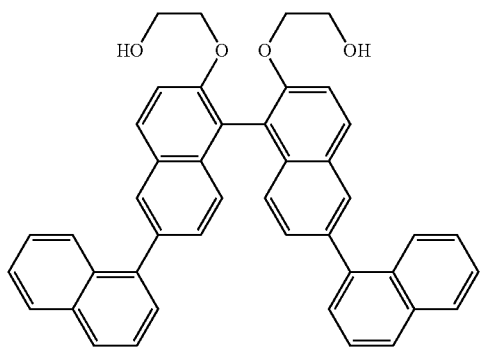

DNBINOL-2EO
2,2'-bis(2-hydroxyethoxy))-6,6'-di(naphthalene-1-yl)-1,1'-binaphthalene

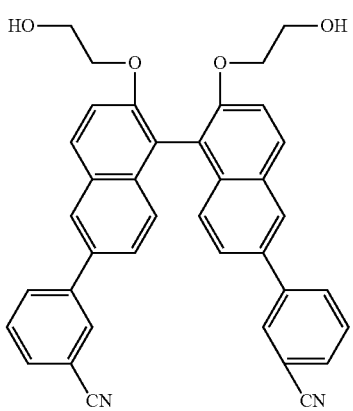

CN-BNA
6,6'-di-(3-cyanophenyl)-2,2'-bis-(2-hydroxyethoxy-1,1'-binaphthalene

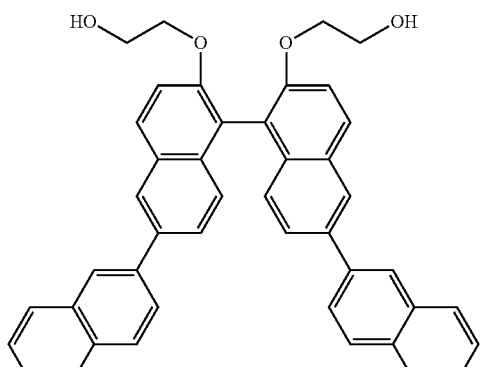

2DNBINOL-2EO
2,2'-bis(2-hydroxyethoxy))-6,6'-di(phenanthrene-9-yl)-1,1'-binaphthalene

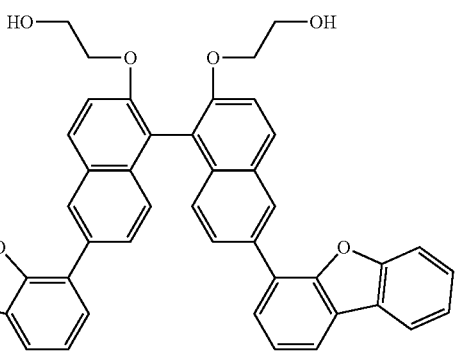

FUR-BNA
6,6'-di-(dibenzo[b,d]furan-4-yl)-2,2'-bis-(2-hydroxyethoxy-1,1'-binaphthalene -continued

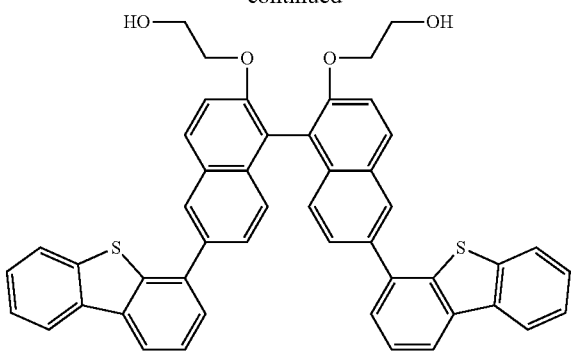

THI-BNA
6,6'-di-(dibenzo[b,d]thiene-4-yl)-2,2'-bis-(2-hydroxyethoxy-1,1'-binaphthalene

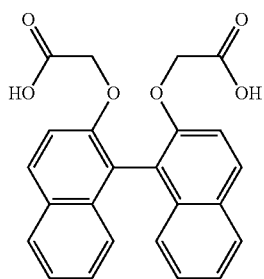

BINOL-DC
2,2'-bis(2-hydroxycarbonylmethoxy)-1,1'-binaphthalene

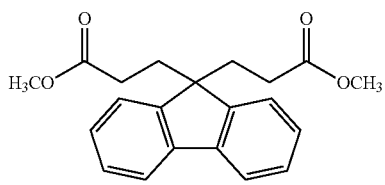

FDPM
9,9-fluorene-methyl dipropionate

[Chemical Formula 43]

Dihydroxy compounds which can be further added

BNEF

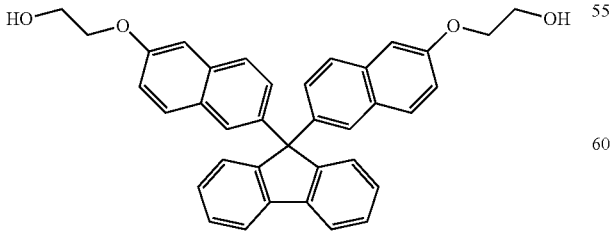

BNEF
9,9-bis(6-(2-hydroxyethoxy)naphthalene-2-yl)fluorene

-continued

BNE

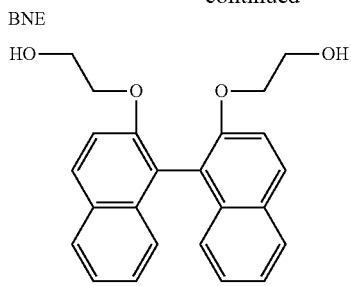

BNE
2,2'-bis-(2-hydroxyethoxy-1,1'-binaphthalene

BPEF

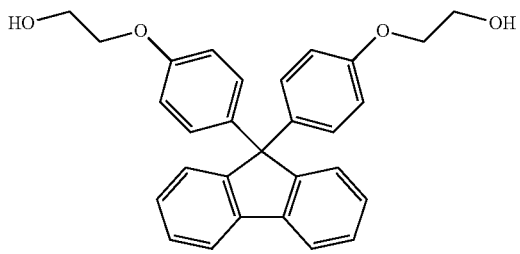

BPEF
9,9-bis[4-(2-hydroxyethoxy)phenyl]fluorene

BPPEF

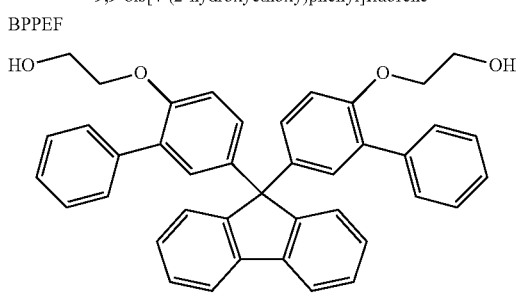

BPPEF
9,9-bis(4-(2-hydroxyethoxy)-3-phenylphenyl)fluorene

BPA

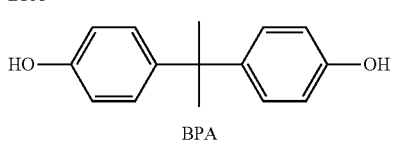

BPA

[Production of Monomers]

Example 21: Preparation of Form A

Step 1: Hydroxyethylation of 6,6'-dibromo-1,1'-bis(2-naphthol)

A nitrogen-flushed vessel was charged with 1053 kg of anisole, 157.6 kg of 6,6'-dibromo-1,1'-bis(2-naphthol) (commercially available), 14.6 kg of potassium carbonate and 97 kg of ethylene carbonate. After addition of the starting materials was complete, the vessel was heated to an internal temperature of 125-135°. The reaction started at about 80°–90° C., marked by evolution of gas. The reaction mixture was kept at 125-135° for 40 h until TLC showed complete conversion. The reaction mixture was cooled to an internal temperature of 75°. 145 kg of water were added slowly. This mixture was heated to 80° C. and stirred at this temperature for another 30 min. After stirring was stopped, the phases were allowed to separate for 25 min. After separation of the phases was completed, the lower aqueous phase was discarded. To the organic phase remaining in the vessel, 164 kg of an sodium hydroxide solution (20% (w/w)) were added and this mixture was stirred for 2 h at 90° C. (reflux condenser!). After 2 h, the vessel was cooled to 80° C., stirring was stopped and the phases were allowed to separate for 25 min. The lower basic aqueous phase was then discarded. The organic phase was washed with another portion of 160 kg of water and 25 kg of NaCl (80° C., 30 min), followed by 20 min of phase separation. The aqueous phase was discarded.

The resulting organic phase, a solution of the desired 2,2'-bis(2-hydroxyethoxy)-6,6'-dibromo-1,1'-binaphthyl in anisole, was directly used in the next step without isolation of the product.

Step 2: Preparation of 6,6'-DPBHBNA by Suzuki-Coupling

The catalyst solution was prepared by dissolving 84 g of tris-(o-tolyl)phosphine and 15 g of palladium(II)acetate in 1.5 kg of anisole.

In a first reactor, the solution of 2,2'-bis(2-hydroxyethoxy)-6,6'-dibromo-1,1'-binaphthyl in anisole obtained in step 1 was warmed to 60° C. and 93.4 kg of phenylboronic acid were added. This mixture was stirred for 15 min until the phenylboronic acid was completely dissolved. Then, the mixture was cooled to 40°–50° C.

In a second vessel, 520 kg of a 31-% (w/w) solution of tripotassium phosphate in water were heated to 50° C. To this solution, about 30% of the solution from the first vessel was added at 55° C. Then the previously prepared catalyst solution was slowly added. This resulted in a temperature rise of about 15° C. in total. After the catalyst had been added, the mixture was stirred at 60-70° C. for 1 h. Then, the remaining 70% of the solution from vessel 1 were added slowly to the reaction vessel at 55-75° C. After the addition was complete, the mixture was stirred at 60° C. for another 1 h. TLC showed complete conversion. The phases were allowed to separate for 30 min at 50-60° C. The lower aqueous phase was discarded. To the organic phase were added 186 kg of water and 125 kg of 20% by weight aqueous sodium hydroxide solution. This mixture was stirred for 40 min at 55° C. Then the mixture was allowed to separate into phases and the basic aqueous phase was discarded.

Then, 182 kg of a 2M aqueous hydrochloric acid were added to the organic phase and the mixture was stirred for 30 min at 50°–60° C. The phases were separated and the acidic aqueous phase was discarded. The organic phase was washed at 50-60° C. with 182 kg of 25% by weight of brine. The residual organic phase was then treated at 60-70° C. for 90 min with 10 kg of activated carbon (Norit® DX Ultra) and 50 kg sodium sulfate with stirring. The mixture was then filtrated through a pressure strainer at 60-70° C. to avoid precipitation of product (6,6'-DPBHBNA will crystallize from anisole in the form of polyhedral crystals. However, the crystals have no defined composition and the crystallization yield is low).

The filtrate (ca. 2500 L) was then transferred into a still. Anisol was distilled off at a temperature of above 80° C. and 90 mbar until about 200 L of residue were left. The anisole was collected and can be reused. After the vacuum was broken, the residue was cooled to 55° C. At this temperature, 140 kg of methanol and 60 kg of toluene were added. This mixture was then heated with stirring to 60-65° C. to dissolve any precipitate until the solution was homogenous.

When the mixture was completely homogenous, the vessel was cooled to 20° C. At a temperature of about 35-40° C., the solution was seeded with 40 g of 6,6'-DPBHBNA and crystallization started. The mixture was cooled to 20° C. stirred at 200 for at least 4 h. The precipitate was then collected by centrifugation, the filter cake was washed with two portions of 10 kg methanol each.

Thereby 162 kg of wet 6,6'-DPBHBNA (loss on drying: 15%) was obtained, which corresponds to 137 kg of dry 6,6'-DPBHBNA and a yield of 74% over both steps. The chemical purity of the obtained 6,6'-DPBHBNA as determined by UPLC was 98%.

Step 3: Purification/Recrystallization of 6,6'-DPBHBNA 6,6'-DPBHBNA obtained according to procedure of step 2 (142 kg, 270 mol; purity 98.0%) was dissolved in a mixture of methanol/toluene (7:3 v/v; 827 kg). The solution was treated at 55° C. with activated charcoal (8 kg) for 2 hours. The charcoal was removed by filtration and the filtrate was cooled with stirring within 4 h to 0° C. and stirred for one additional hour at 0° C. Thereby, the 6,6'-DPBHBNA crystallizes. The crystalline 6,6'-DPBHBNA was collected by filtration, washed with methanol to yield 154 kg of 6,6'-diphenyl-2,2'-bis-(2-hydroxyethoxy)-1,1'-binaphthyl (LOD: 14%; 252 mol; chem. Purity UPLC: 98.8%).

The thus obtained 6,6'-DPBHBNA was dissolved in a mixture of methanol/toluene (7:3 v/v; 772 kg) and the solution of was again treated at 55° C. with activated charcoal (7 kg) for 2 hours. The charcoal was removed by filtration and the filtrate was cooled with stirring within 5 h to 0° C. and stirred at 0° C. for one additional hour. The solid was collected by filtration, washed with methanol to yield 131.4 kg of 6,6'-DPBHBNA (LOD: 14%; 220 mol; purity UPLC: 99%). The material obtained was identified by PXRD as the methanol-solvate.

Step 4: Transformation of the Methanol-Solvate into Form A of 6,6'-DPBHBNA 48 kg of this obtained crystalline methanol-solvate of 6,6'-DPBHBNA was dried under air at 40° C. for 5 d to yield 41.3 kg of crystalline 6,6'-DPBHBNA in the form of compact crystals having a size in the range from 5 to 200 μm.

The material obtained in step 4 had a solvent content of 0.03% b.w. of MeOH and 0.3% b.w. of toluene as determined by GC. Specifically, it was determined that the solvent components of 0.03 weight percent of methanol and 0.3 weight percent of toluene based on the weight of 6,6'-DPBHBNA (6,6'-diphenyl-2,2'-bis(2-hydroxyethoxy)-1,1'-binaphthyl; or relative to 100 percent by weight of 6,6'-DPBHBNA) were included in the 6,6'-DPBHBNA.

Figure 2:
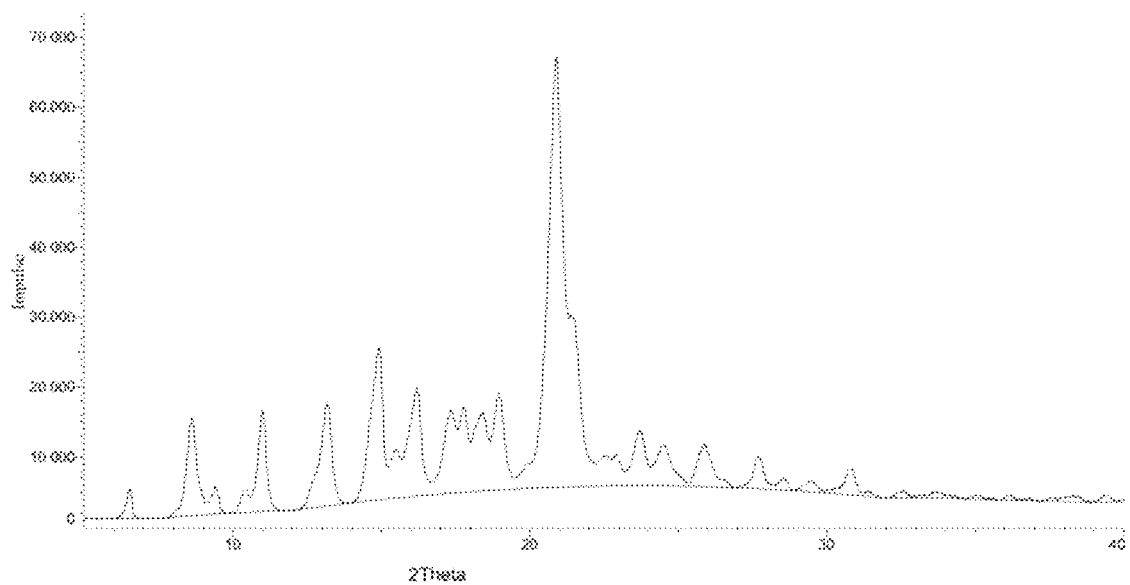
FIG. 2 shows the powder X-ray diffraction pattern of form A of 6,6'-DPBHBNA obtained from example 21.

The material obtained in step 4 was analyzed by PXRD. The PXRD is shown in FIG. 2 and revealed that the crystalline form was that of form A. The following reflections were observed.

TABLE 5

| 2-θ (Theta) | %* |
|---|---|
| 6.52 | 8.07 |
| 8.61 | 22.93 |
| 9.42 | 8.71 |
| 10.44 | 8.04 |
| 11.01 | 24.95 |
| 13.19 | 26.54 |

TABLE 5-continued

| 2-θ (Theta) | %* |
|---|---|
| 14.94 | 38.29 |
| 15.46 | 16.41 |
| 16.19 | 29.40 |
| 17.35 | 24.87 |
| 17.79 | 25.59 |
| 18.43 | 24.31 |
| 18.97 | 28.39 |
| 20.88 | 100 |
| 21.45 | 45.06 |
| 22.50 | 15.27 |
| 22.92 | 15.41 |
| 23.69 | 20.41 |
| 24.49 | 17.30 |
| 25.89 | 17.46 |
| 27.75 | 15.03 |
| 30.82 | 12.46 |

*relative intensity

UPLC revealed that the material obtained in step 4 contained 99.1% b.w. of 6,6'-DPBHBNA, 0.06%; b.w. (0.06 weight percent) of 6,6'-DPMHBNA and 0.19% b.w. (0.19 weight percent) of 6,6'-DPTHBNA.

The yellowness index YI of the material obtained in step 4 was 3.9 and the haze was 0.5 ntu.

Figure 3:
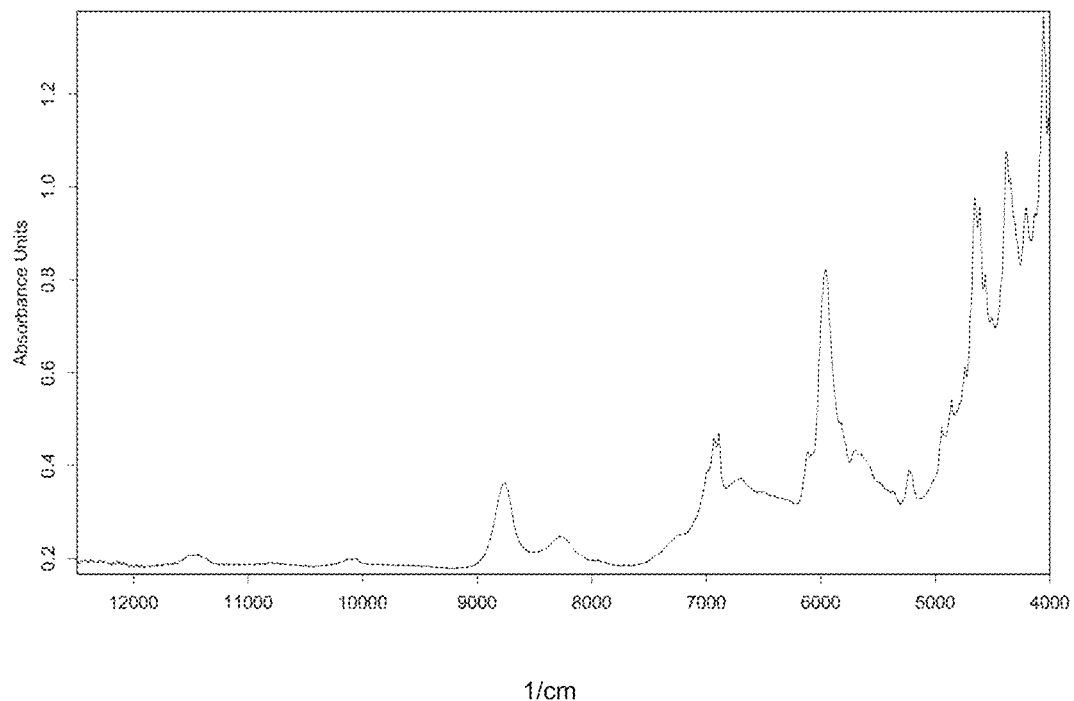
FIG. 3 shows the NIR spectrum of form A of 6,6'-DPBHBNA obtained from example 21.
Figure 4:
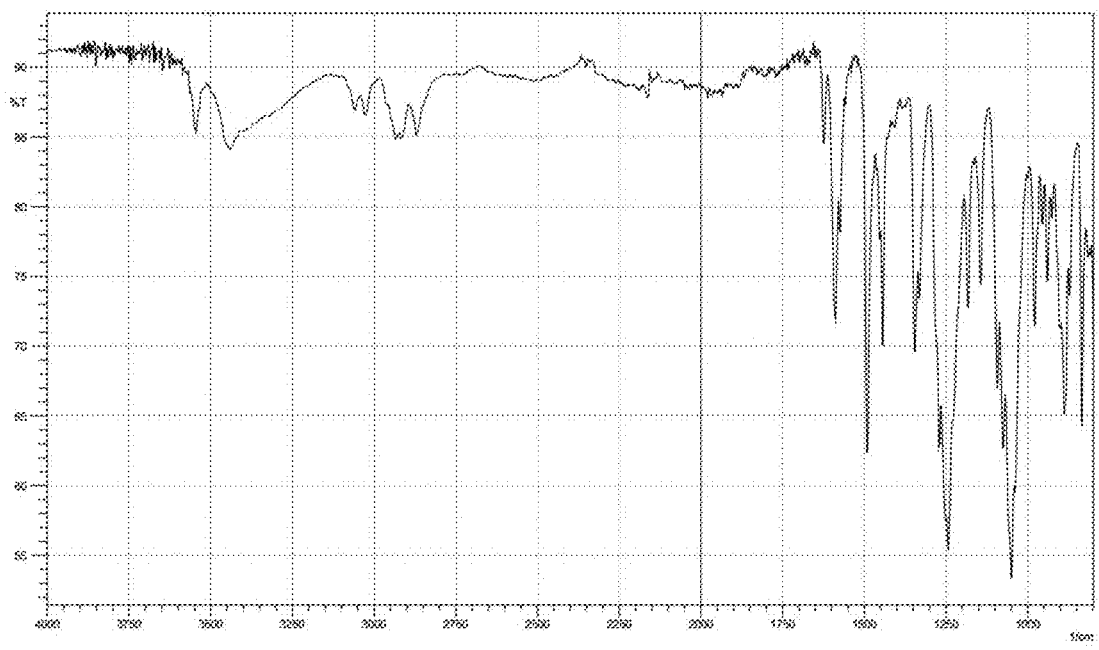
FIG. 4 shows the IR spectrum of form A of 6,6'-DPBHBNA obtained from example 21.

The material obtained in step 4 was analyzed by IR and NIR. The NIR is shown in FIG. 3 and the IR is shown in FIG. 4. In the NIR the habit in the regions around 7000 and 4500 cm' are characteristic for form A and clearly allows for a distinction from the solvates.

Figure 5:
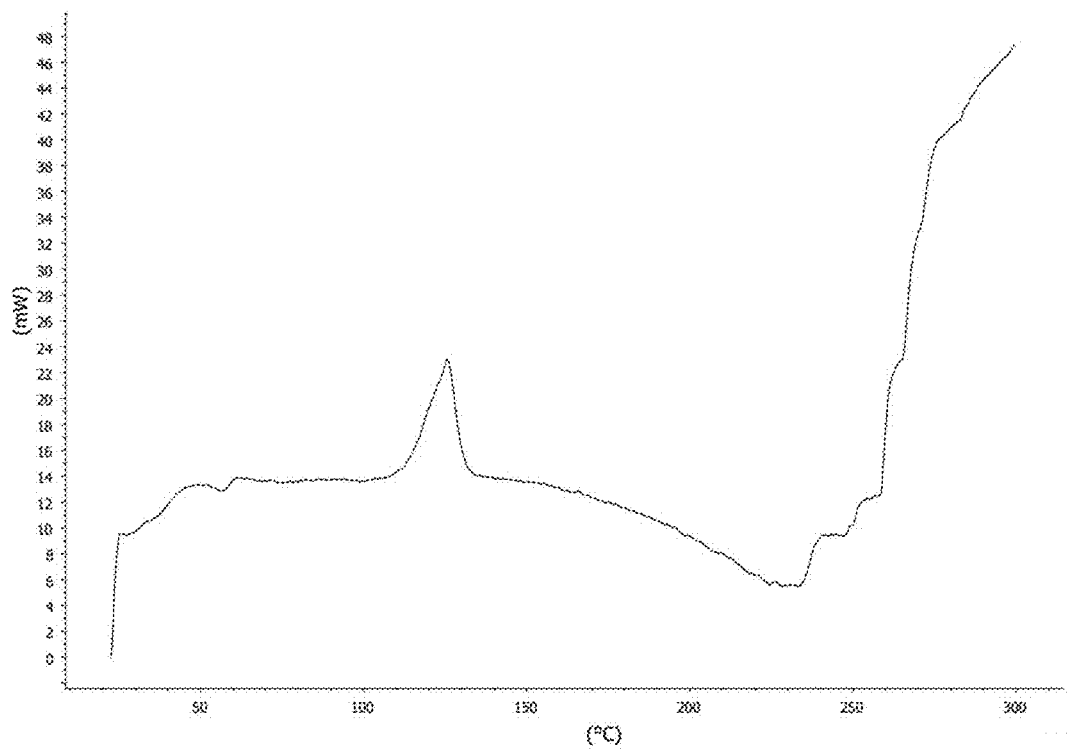
FIG. 5 shows the DSC of form A of 6,6'-DPBHBNA obtained from example 21.

DSC of the material obtained in step 4 showed an endothermic peak having an onset at 113.6° C., a peak maximum 124.4° C. and a reaction point at 112.9° C. The melting point was determined trice and showed melting points at 127.0° C., 126.5° C. and 126.8° C. The DSC is shown in FIG. 5.

Example 22: Preparation of the Methanol Solvate of 6,6'-DPBHBNA 20 g of 6,6'-DPBHBNA obtained in step 4 of example 21 (chem. purity UPLC: >99.0%) was dissolved in 600 ml of pure methanol by heating to reflux. The homogeneous solution was slowly cooled to 22° C. whereby 6,6'-DPBHBNA crystallized DPBHBNA in the form of compact crystals having a size in the range from 10-200 μm. The crystals were collected by filtration, washed with methanol and dried on the air over 2 days at 25° C. to yield 6,6'-diphenyl-2,2'-bis-(2-hydroxyethoxy)-1,1'-binaphthyl containing 5.98% b.w. of MeOH (specifically, 6,6'-DPBHBNA (6,6'-diphenyl-2,2'-bis(2-hydroxyethoxy)-1,1'-binaphthyl including 5.98 weight percent of methanol based on the weight of 6,6'-DPBHBNA), which corresponds to a molar ratio of 6,6'-DPBHBNA to MeOH of about 1:1.

Figure 6:
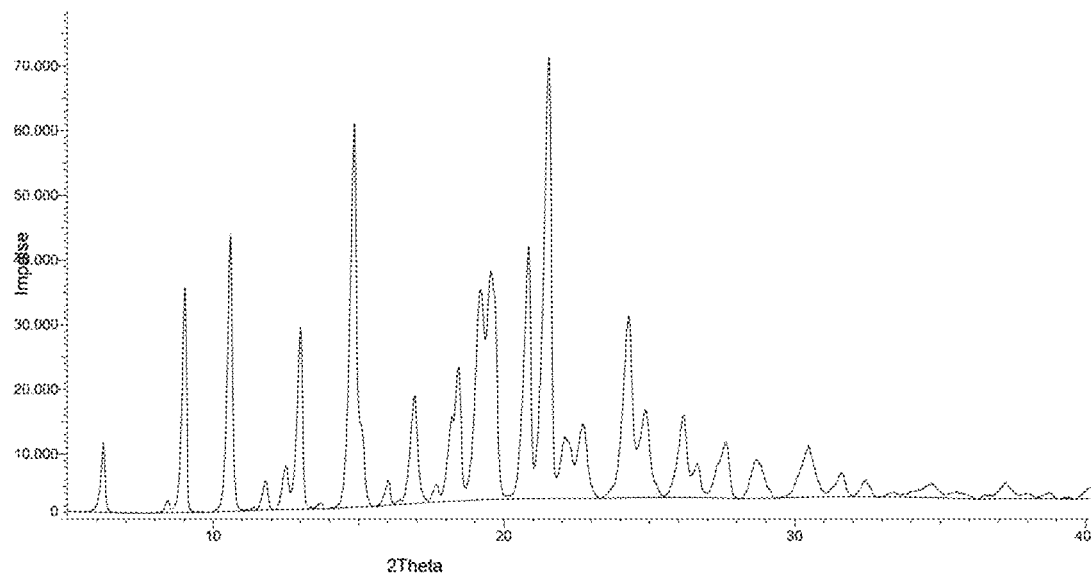
FIG. 6 shows the powder X-ray diffraction pattern of the methanol solvate of 6,6'-DPBHBNA obtained from example 22.

The thus material obtained material was analyzed by PXRD. The PXRD is shown in FIG. 6 and revealed that the crystalline form was different from that of forms A and C and showed the following peaks.

TABLE 6

| 2-θ (Theta) | %* |
|---|---|
| 6.23 | 16.29 |
| 8.45 | 3.99 |
| 9.03 | 50.21 |
| 10.59 | 61.47 |
| 11.79 | 8.13 |
| 12.51 | 11.36 |
| 13.00 | 41.31 |
| 14.87 | 85.66 |
| 16.02 | 8.34 |
| 16.93 | 26.66 |
| 17.69 | 7.31 |
| 18.21 | 22.01 |
| 18.45 | 32.77 |
| 19.20 | 49.49 |
| 19.56 | 53.32 |
| 20.86 | 59.04 |
| 21.54 | 100 |
| 22.11 | 17.86 |
| 22.72 | 20.60 |
| 24.29 | 44.09 |
| 24.86 | 23.58 |
| 26.18 | 22.33 |
| 26.65 | 11.83 |
| 27.66 | 16.59 |
| 28.67 | 12.87 |
| 30.48 | 15.82 |
| 31.61 | 9.93 |
| 32.47 | 8.349 |

*relative intensity

Figure 7:
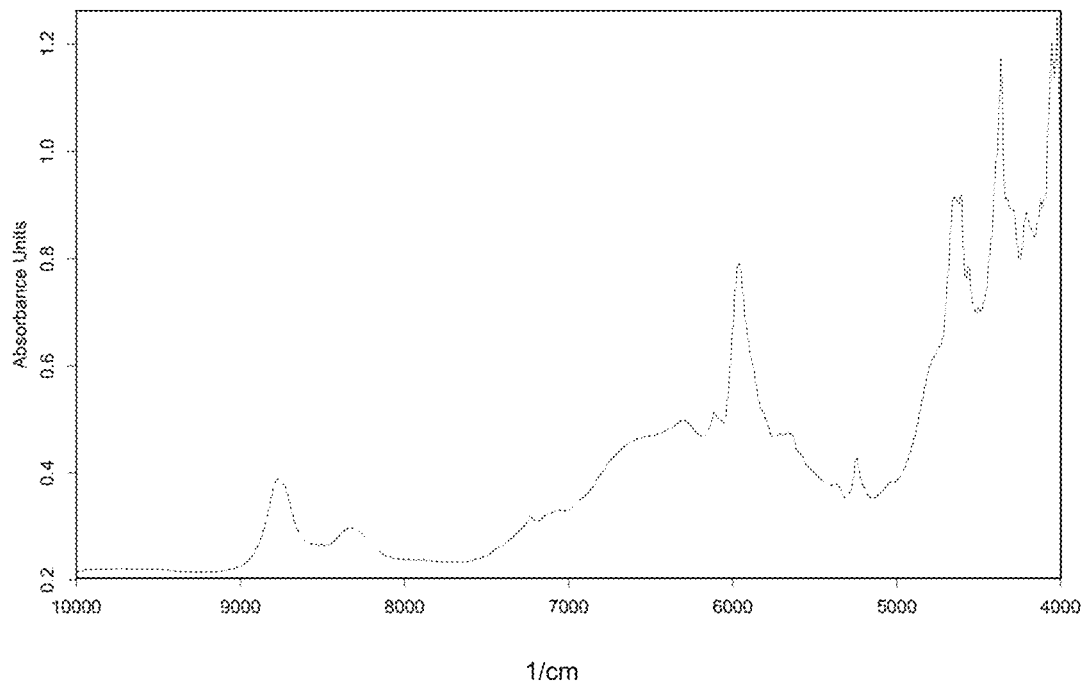
FIG. 7 shows the NIR spectrum of methanol solvate of 6,6'-DPBHBNA obtained from example 22.
Figure 8:
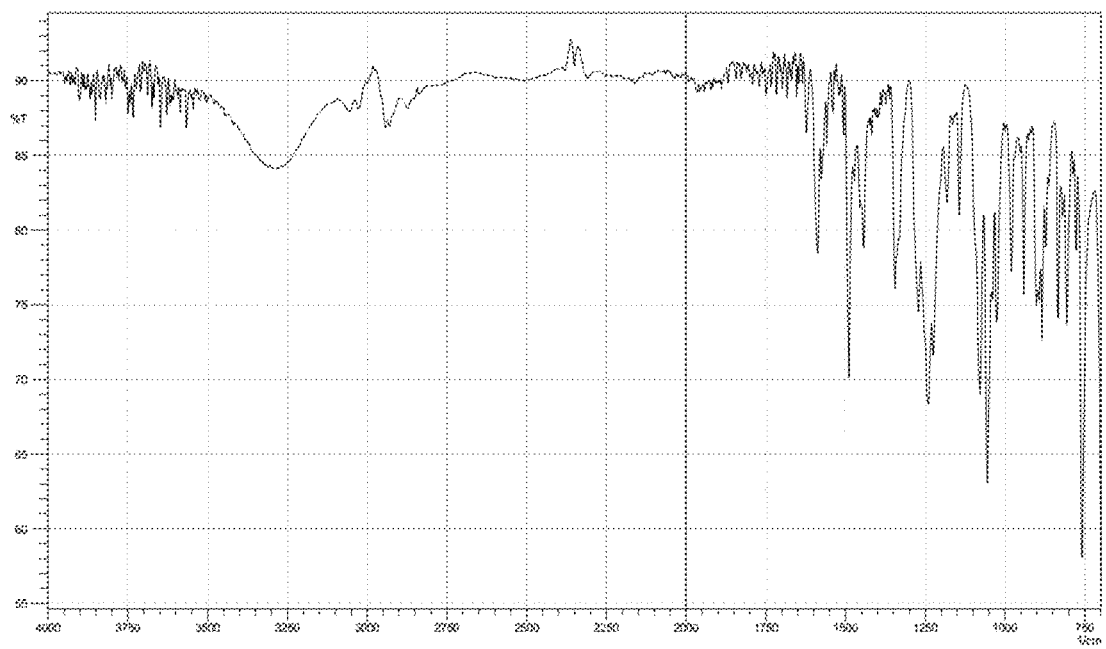
FIG. 8 shows the IR spectrum of methanol solvate of 6,6'-DPBHBNA obtained from example 22.

The thus obtained material was analyzed by IR and NIR. The NIR is shown in FIG. 7 and the IR is shown in FIG. 8. In the NIR the habit in the regions of 4500 and 4300 cm$^{-1}$ is characteristic for the methanol solvate and clearly allows a distinction from forms A and the other solvates.

Figure 9:
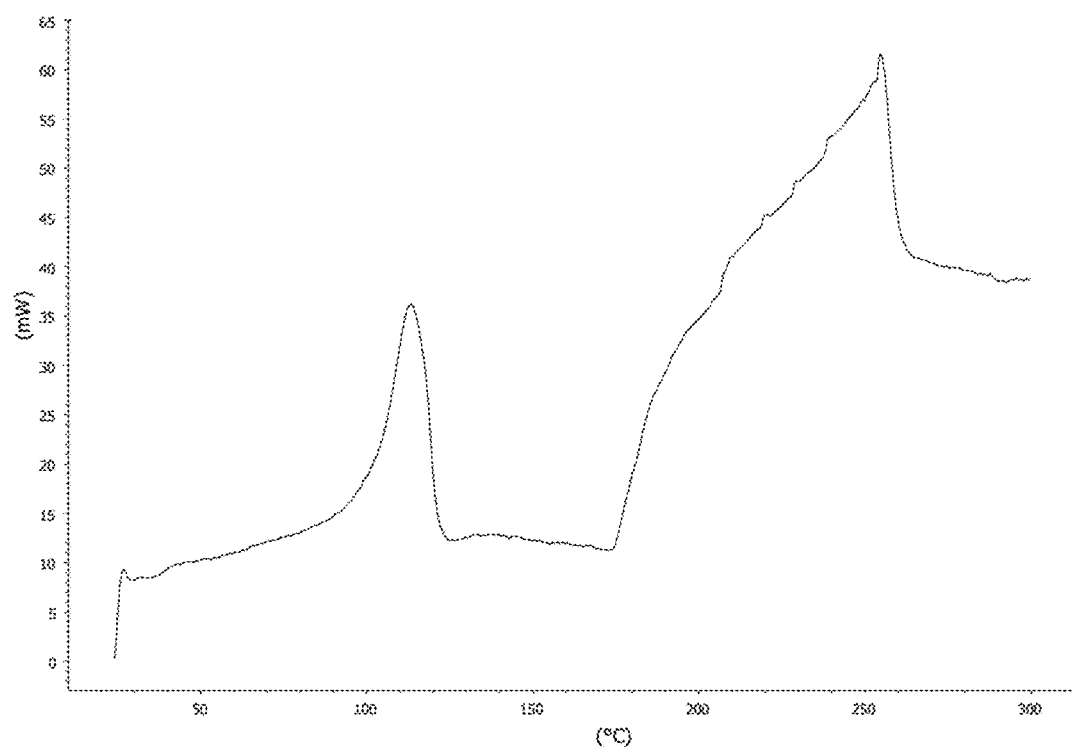
FIG. 9 shows the DSC of methanol solvate of 6,6'-DPBHBNA obtained from example 22.

DSC of the thus obtained material showed an endothermic peak having an onset at 100.9° C., a peak maximum 113.4° C. and a reaction point at 108.3° C. The melting point was determined trice and showed melting points at 107.4° C., 108.7° C. and 107.7° C. The DSC is shown in FIG. 9.

Example 23: Preparation of a Mixture of Form A and Methanol Solvate

Step 1: Hydroxyethylation of 6,6'-dibromo-1,1'-bis(2-naphthol)

In a 2 L three-necked flask equipped with stirrer, water separator, reflux condenser, thermometer and a bubble counter was charged with 89.7 g of 6,6'-dibromo-1,1'-bis(2-naphthol), 573 g anisole, 8.3 g K$_2$CO$_3$ and 52.8 g ethylene carbonate and the reaction mixture was heated until reflux (internal temperature of 125-135° C.) and was stirred at reflux for 6 h. A slight gas evaluation was observed. The progress of the reaction was monitored with TLC. After the reaction was complete the reaction mixture was cooled to 70-80° C. and 75 g of water and 25 g of brine were added and the mixture was stirred at this temperature for further 20 min. After phase-separation, a 15% b.w. aqueous NaOH (110 g) was added to the organic layer and the mixture was stirred at 95° C. for 3 hours. After phase-separation, the organic layer was washed with an aqueous solution, prepared from water (110 g) and brine (25 g). The organic layer, obtained after phase-separation was directly used in the next step without isolation of the product.

Step 2: Preparation of 6,6'-DPBHBNA by Suzuki-Coupling

In a 2 L three-necked flask equipped with stirrer, reflux condenser and thermometer was charged with organic solution from previous step 1, 50.0 g of phenylboronic acid, K$_3$PO$_4$ (93.4 g) and water (210 g) and the mixture was heated until internal temperature of 60° C. Then 49 mg of tris-(o-tolyl)phosphine and 9 mg of palladium(II)acetate were added under vigorous stirring. The reaction mixture was slowly heated to reflux and the progress of the reaction was monitored by TLC. After the reaction was complete (30 min-1 h), the mixture was allowed to cool to 70° C., and the aqueous phase was separated off. The organic phase was washed successively with 150 ml of 10% b.w. aqueous NaOH, with 2M aqueous HCl (87.5 ml) and again with brine (75 ml). Thereafter, the organic layer was treated with 20.5 g of charcoal and thereafter dried over sodium sulfate (12.5 g). After filtration, the solvent was evaporated under vacuum and the residue was crystallized from a mixture of MeOH (77 g) and toluene (33 g). Thereby a crystalline product was obtained, which was collected upon filtration.

Thereby 110 g of wet 6,6'-DPBHBNA (loss on drying: 15%) was obtained, which corresponds to 93.5 g of dry 6,6'-DPBHBNA and a yield of 89% over both steps. The chemical purity of the obtained 6,6'-DPBHBNA as determined by UPLC was 98%.

Step 3: Purification/Recrystallization of 6,6'-DPBHBNA 107 g of 6,6'-diphenyl-2,2'-bis-(2-hydroxyethoxy)-1,1'-binaphthyl (purity: 98%), obtained according to procedure of step 2 was dissolved in a mixture of methanol/toluene (7:3 v/v; 535 g). The solution was treated at 55° C. with activated charcoal (5.4 g) for 2 hours. The charcoal was removed by filtration and the filtrated was cooled to 0° C. and stirred at 0° C. for one hour, whereby 6,6'-DPBHBNA crystallized in the form of compact crystals having a size in the range from 5 to 150 μm. The solid was collected by filtration, washed with methanol and dried on the air at room temperature overnight to yield 85.0 g of 6,6'-DPBHBNA with chemical purity (UPLC): 99.89% and a yellowness index YI of 2.1.

The material obtained in step 3 had a solvent content of 2.4% b.w. of MeOH 0.1% b.w. of toluene and 0.002% b.w. of anisole (specifically, 6,6'-DPBHBNA (6,6'-diphenyl-2,2'-bis(2-hydroxyethoxy)-1,1'-binaphthyl including 2.4 weight percent of methanol, 0.1 weight percent of toluene and 0.002 weight percent of anisole based on the weight of 6,6'-DPBHBNA) as determined by GC.

Figure 10:
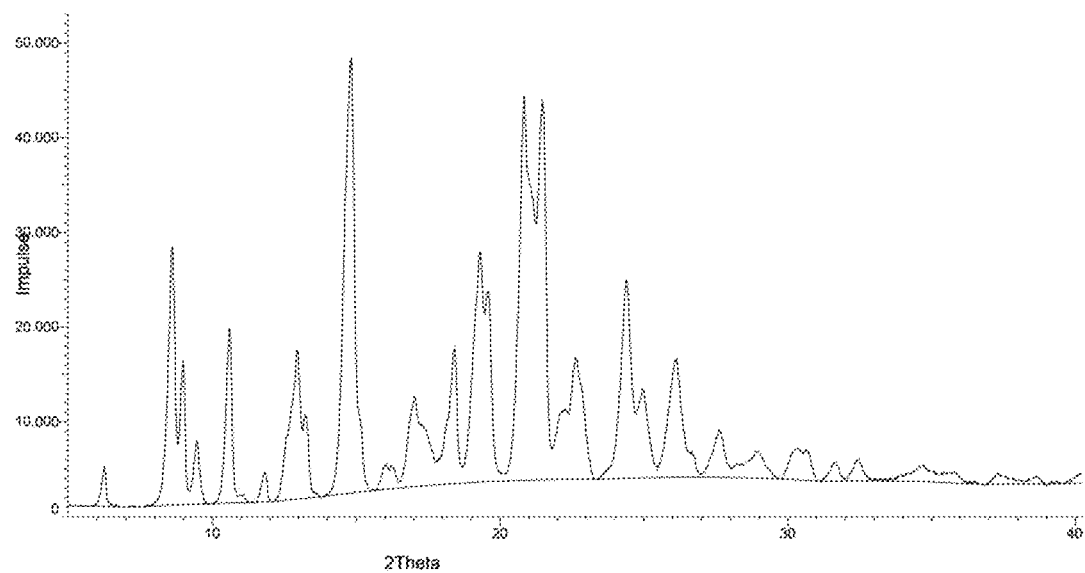
FIG. 10 shows the powder X-ray diffraction pattern of the crystalline material obtained from example 23.

The material obtained in step 3 was analyzed by PXRD. The PXRD is shown in FIG. 10 and revealed that the crystalline form was a mixture of form A and the methanol solvate. The following reflections were observed:

TABLE 7

| 2-θ (Theta) | %* |
|---|---|
| 6.25 | 10.87 |
| 8.61 | 58.88 |
| 8.98 | 33.71 |
| 9.47 | 16.41 |
| 10.59 | 41.40 |
| 11.82 | 9.716 |
| 12.95 | 36.20 |
| 13.25 | 22.35 |
| 14.82 | 100 |
| 16.02 | 11.65 |
| 16.27 | 11.10 |
| 17.03 | 26.14 |
| 18.43 | 37.00 |
| 19.31 | 57.83 |
| 19.60 | 48.99 |
| 20.83 | 91.68 |
| 21.47 | 90.71 |
| 22.28 | 23.42 |

TABLE 7-continued

| 2-θ (Theta) | %* |
|---|---|
| 22.62 | 34.69 |
| 24.39 | 51.81 |
| 24.96 | 27.86 |
| 26.13 | 34.43 |
| 27.61 | 18.75 |
| 28.93 | 14.31 |
| 30.28 | 14.82 |
| 30.67 | 14.72 |
| 31.68 | 11.82 |
| 32.47 | 12.43 |

*relative intensity

Figure 11:
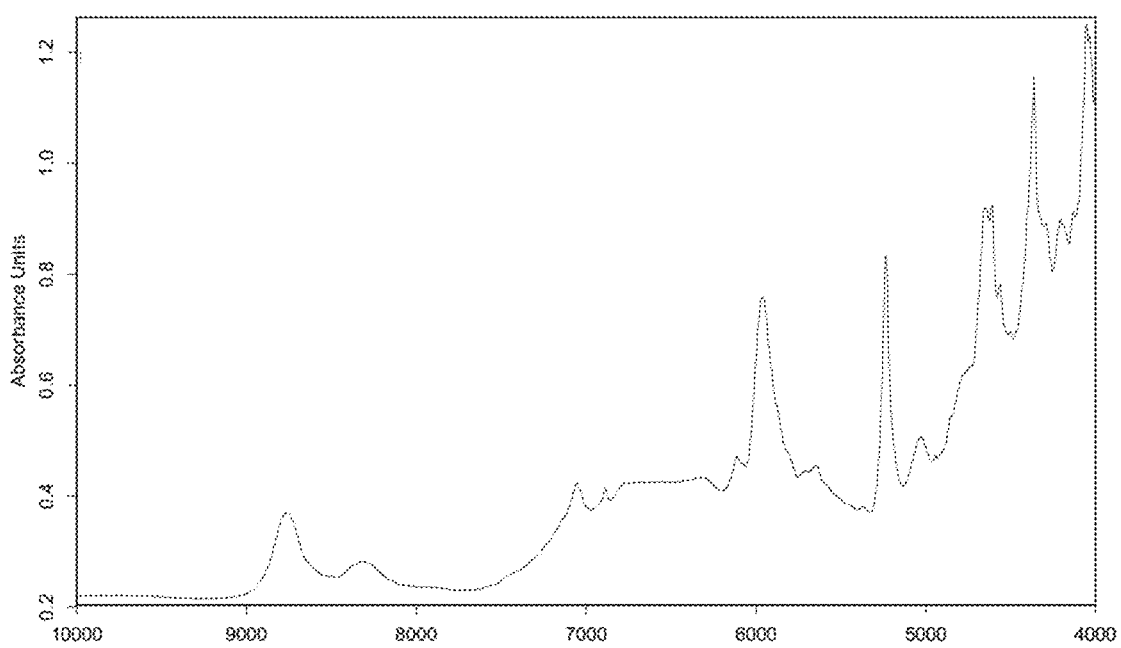
FIG. 11 shows the NIR spectrum of the crystalline material obtained from example 23.
Figure 12:
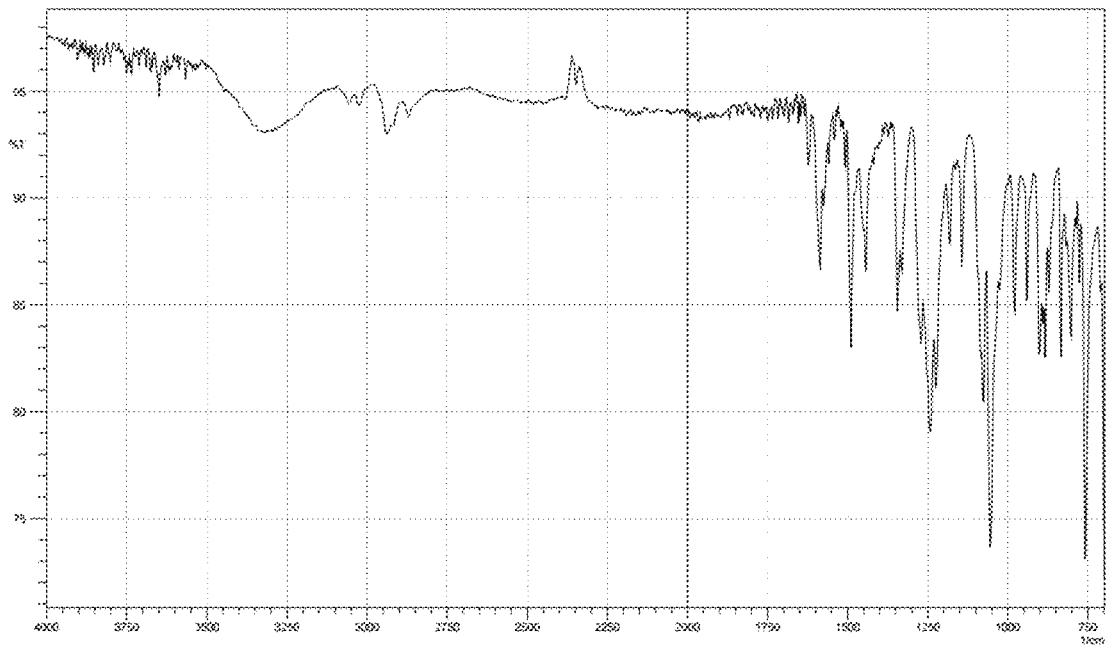
FIG. 12 shows the IR spectrum of the crystalline material obtained from example 23.

The material obtained in step 3 was analyzed by IR and NIR. The NIR is shown in FIG. 11 and the IR is shown in FIG. 12. In the NIR the habit in the region of about 4500 and 4300 cm$^{-1}$ is characteristic for the methanol solvate.

Figure 13:
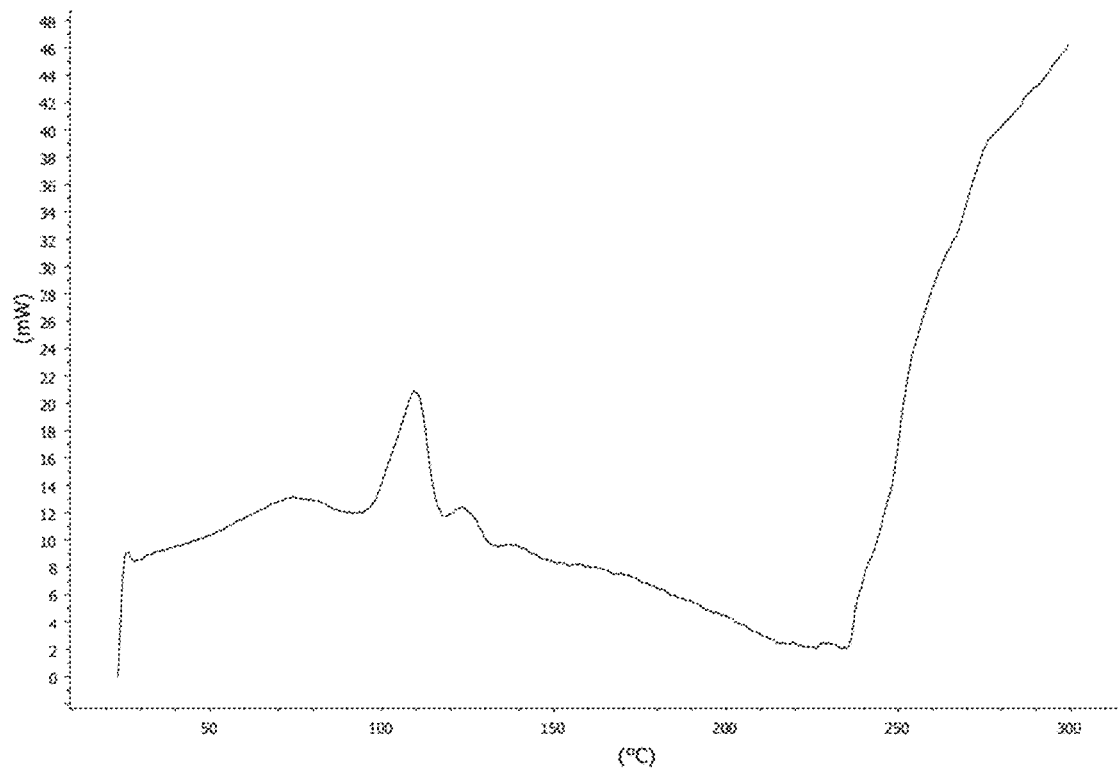
FIG. 13 shows the DSC of the crystalline material obtained from example 23.

DSC of the material obtained in step 3 showed a first endothermic peak having an onset at 97.3° C., a peak maximum 109.8° C. and a reaction point at 103.8° C. and a second peak having an onset at 118.9° C., a peak maximum 124.2° C. and a reaction point at 121.4° C. The melting point was determined trice and showed melting points at 118.6° C., 119.4° C. and 116.7° C. The DSC is shown in FIG. 13.

Figure 14:
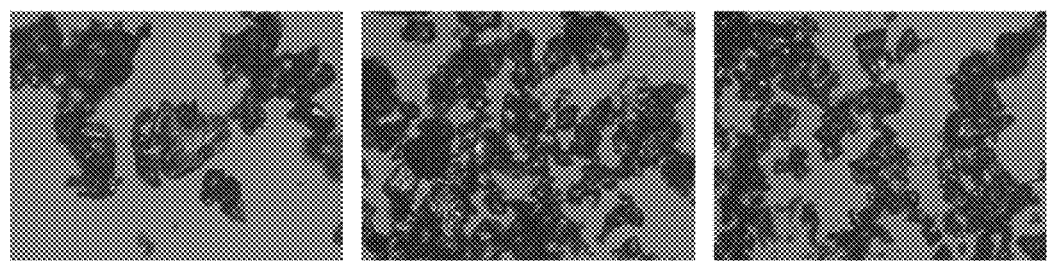
FIG. 14 shows a microphotograph of the toluene solvate of 6,6'-DPBHBNA obtained from example 24.

Example 24: Preparation of the Toluene Solvate of 6,6'-DPBHBNA 20 g of 6,6'-DPBHBNA obtained in step 4 of example 21 (chem. purity UPLC: >99.0%) was dissolved in 60 ml of pure toluene by heating to reflux. The homogeneous solution was slowly cooled to 22° C. whereby 6,6'-DPBHBNA crystallized in the form of compact crystals having a size in the range from 20 to 250 m. The solid crystalline material was collected by filtration, washed with methanol and dried on the air over 2 days at 25° C. to yield 6,6'-diphenyl-2,2'-bis-(2-hydroxyethoxy)-1,1'-binaphthyl containing 5.6% b.w. of toluene, which corresponds to a molar ratio of 6,6'-DPBHBNA to toluene of about 2.95:1. A microphotograph of the thus obtained crystals is shown in FIG. 14.

Figure 15:
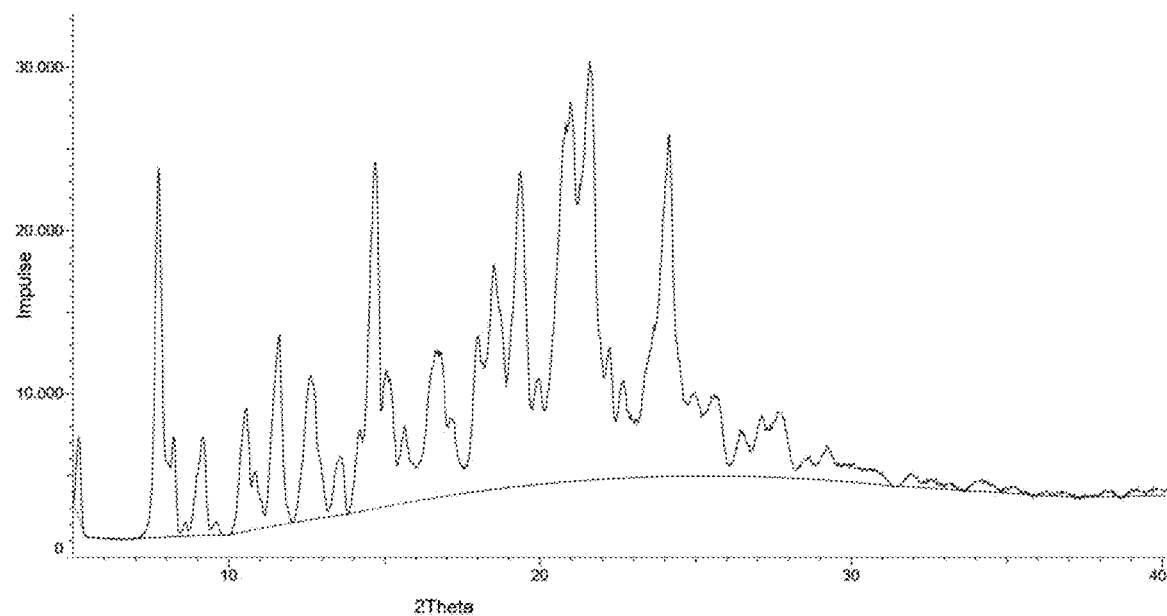
FIG. 15 shows the powder X-ray diffraction pattern of the toluene solvate of 6,6'-DPBHBNA obtained from example 24.

The thus material obtained material was analyzed by PXRD. The PXRD is shown in FIG. 15 and revealed that the crystalline form was different from that of form A and showed the following peaks:

TABLE 8

| 2-θ (Theta) | %* |
|---|---|
| 5.17 | 24.19 |
| 7.75 | 78.65 |
| 8.24 | 24.20 |
| 9.15 | 24.11 |
| 10.57 | 30.11 |
| 10.84 | 17.41 |
| 11.63 | 44.87 |
| 12.61 | 36.65 |
| 13.59 | 20.23 |
| 14.70 | 79.90 |
| 15.04 | 37.68 |
| 15.65 | 26.32 |
| 16.68 | 41.77 |
| 17.15 | 27.95 |
| 18.03 | 44.69 |
| 18.52 | 59.36 |
| 19.36 | 77.80 |
| 19.95 | 35.92 |
| 20.83 | 87.49 |
| 20.98 | 91.79 |
| 21.59 | 100 |

TABLE 8-continued

| 2-θ (Theta) | %* |
|---|---|
| 22.23 | 42.26 |
| 22.67 | 35.50 |
| 24.15 | 85.68 |
| 24.96 | 33.01 |
| 25.69 | 32.43 |
| 26.45 | 25.74 |
| 27.14 | 28.79 |
| 27.63 | 29.19 |

*relative intensity

Figure 16:
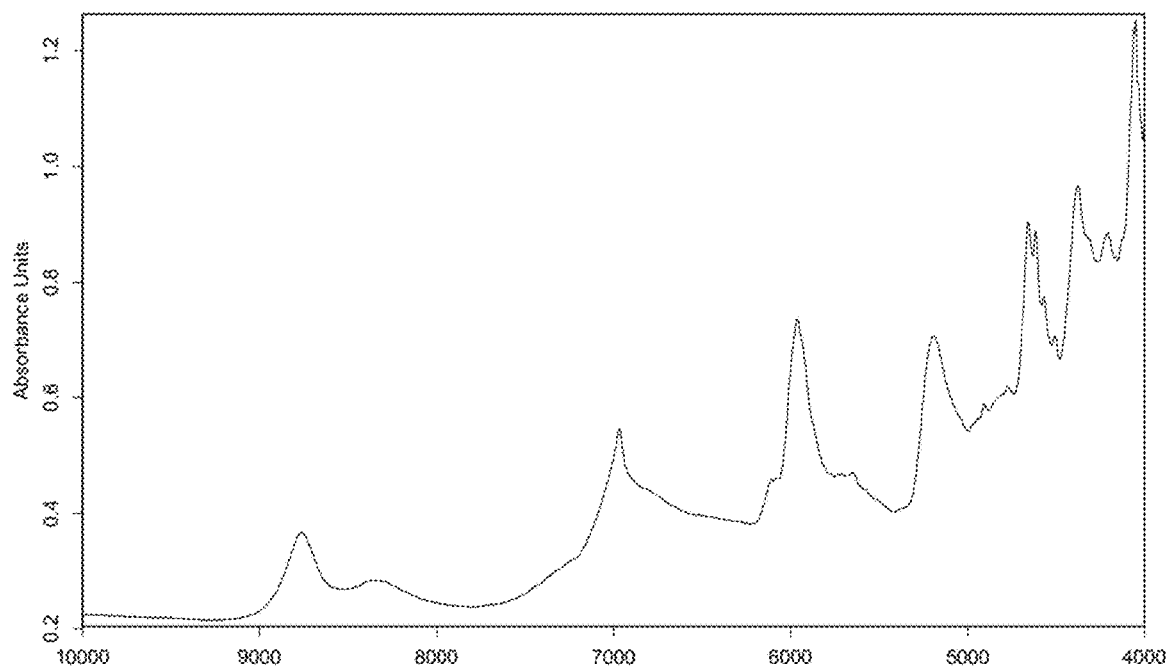
FIG. 16 shows the NIR spectrum of the toluene solvate of 6,6'-DPBHBNA obtained from example 24.
Figure 17:
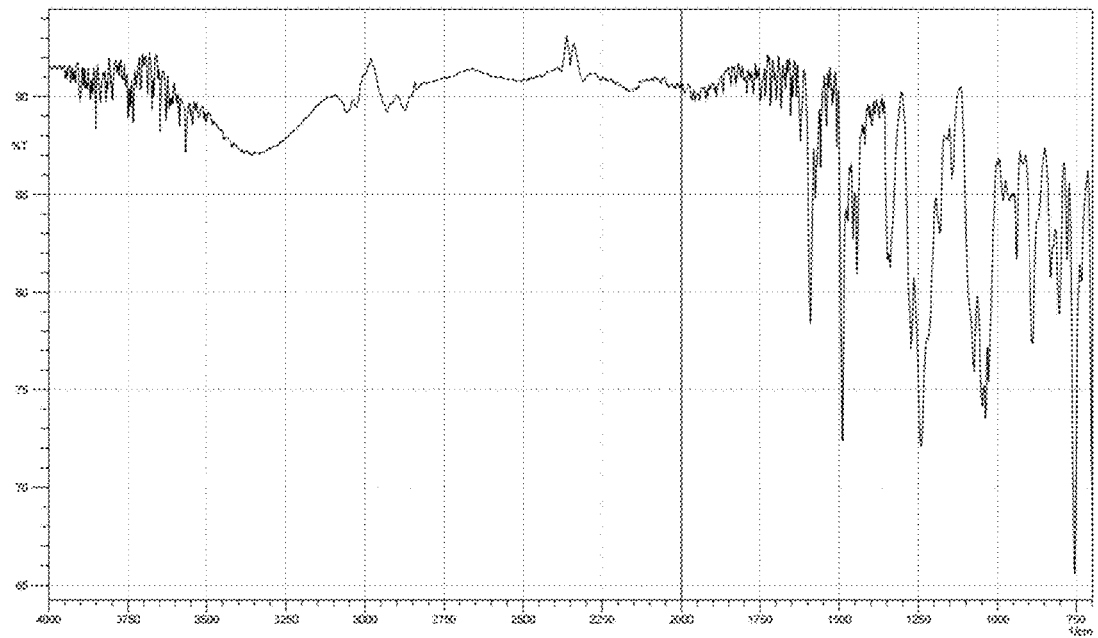
FIG. 17 shows the IR spectrum of the toluene solvate of 6,6'-DPBHBNA obtained from example 24.

The thus obtained material was analyzed by IR and NIR. The NIR is shown in FIG. 16 and the IR is shown in FIG. 17. In the NIR the habit in the region of about 7000 and 4700 $cm^{-1}$ is characteristic for the toluene solvate and clearly allows for a distinction from forms A and B and the other solvates.

Figure 18:
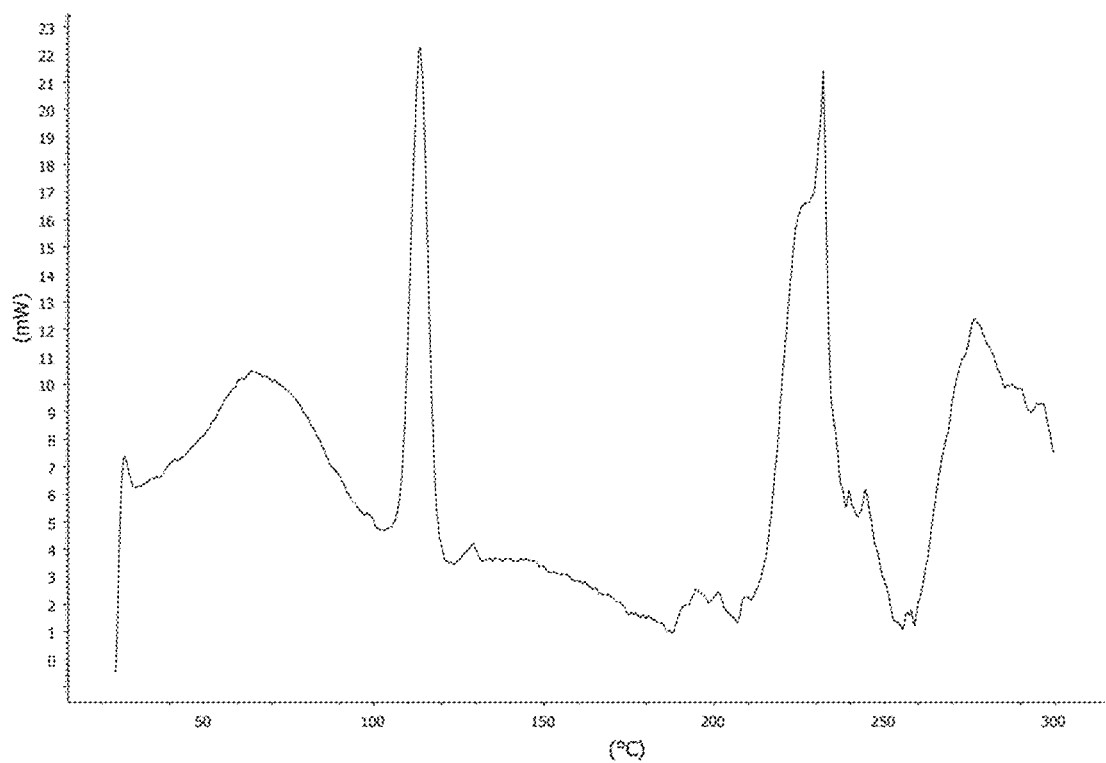
FIG. 18 shows the DSC of the toluene solvate of 6,6'-DPBHBNA obtained from example 24.

DSC of the thus obtained material showed an endothermic peak having an onset at 106.5° C., a peak maximum at 113.6° C. and a reaction point at 110.7° C. The melting point was determined trice and showed melting ranges at 103-107.9° C., 104.0-106.8° C. and 104.8-107.6° C. The DSC is shown in FIG. 18.

Figure 19:
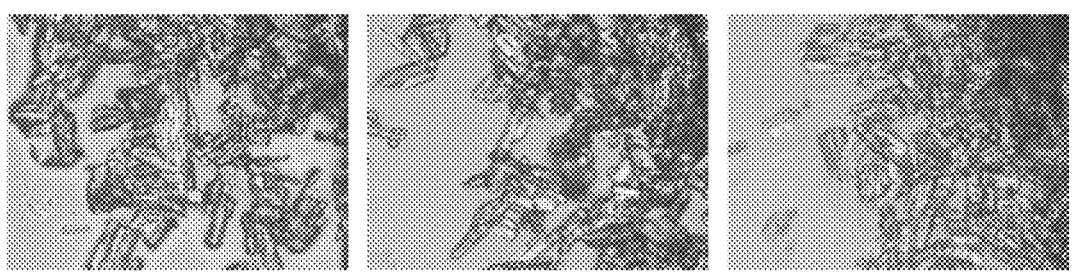
FIG. 19 shows a microphotograph of the MEK solvate of 6,6'-DPBHBNA obtained from example 25.

Example 25: Preparation of the MEK Solvate of 6,6'-DPBHBNA 100 g of 6,6'-DPBHBNA obtained in step 4 of example 21 (chem. purity UPLC: >99.0%) was dissolved in 300 ml of pure MEK by heating to reflux. The homogeneous solution was slowly cooled to 22° C. whereby 6,6'-DPBHBNA crystallized in the form of compact crystals having a size in the range from 20 to 200 μm. The solid was collected by filtration, washed with MEK and dried on the air over 2 days at 25° C. and then 1 h at 50° C. to yield 6,6'-diphenyl-2,2'-bis-(2-hydroxyethoxy)-1,1'-binaphthyl containing 8.5% b.w. of MEK, which corresponds to a molar ratio of 6,6'-DPBHBNA to MEK of about 1.5:1. A microphotograph of the thus obtained crystals is shown in FIG. 19.

Figure 20:
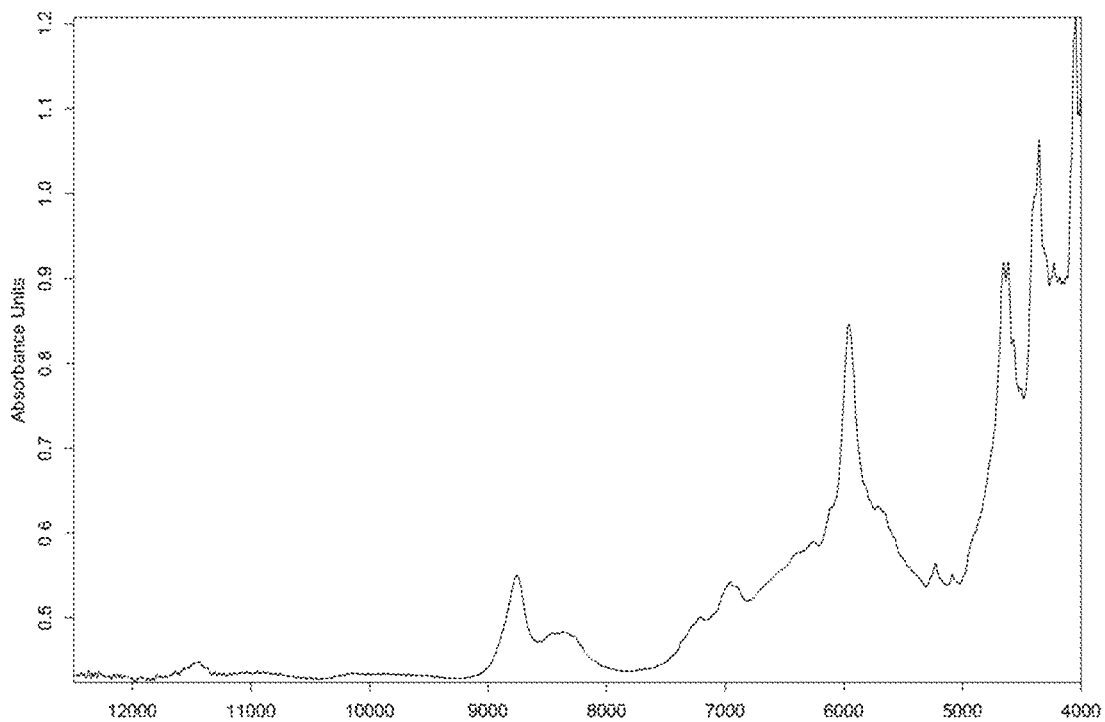
FIG. 20 shows the NIR spectrum of the MEK solvate of 6,6'-DPBHBNA obtained from example 25.

The thus obtained material was analyzed by NIR. The NIR is shown in FIG. 20. In the NIR the habit in the region of 4600 $cm^{-1}$ is characteristic for the MEK solvate and clearly allows for a distinction from forms A and the other solvates.

Figure 21:
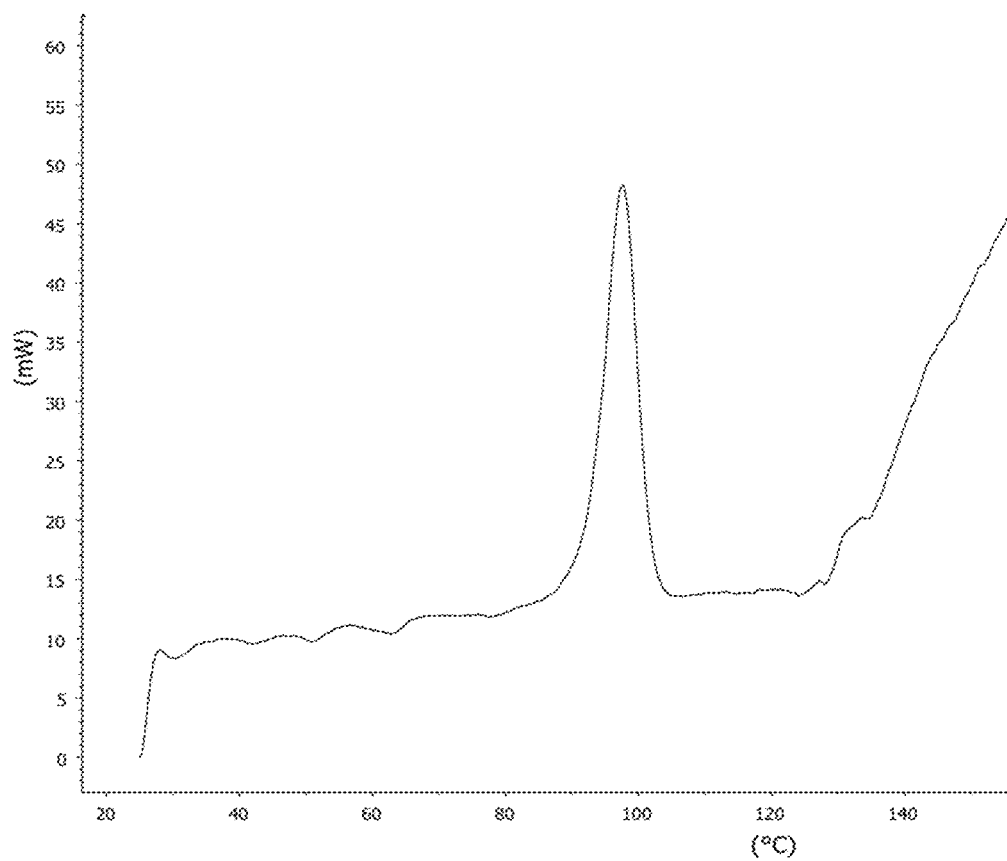
FIG. 21 shows the DSC of the MEK solvate of 6,6'-DPBHBNA obtained from example 25.

DSC of the thus obtained material showed an endothermic peak having an onset at 89.4° C., a peak maximum at 97.6° C. and a reaction point at 95.5° C. The melting point was determined twice and showed melting points at 105.9° C. and 105.8° C. The DSC is shown in FIG. 21.

Figure 22:
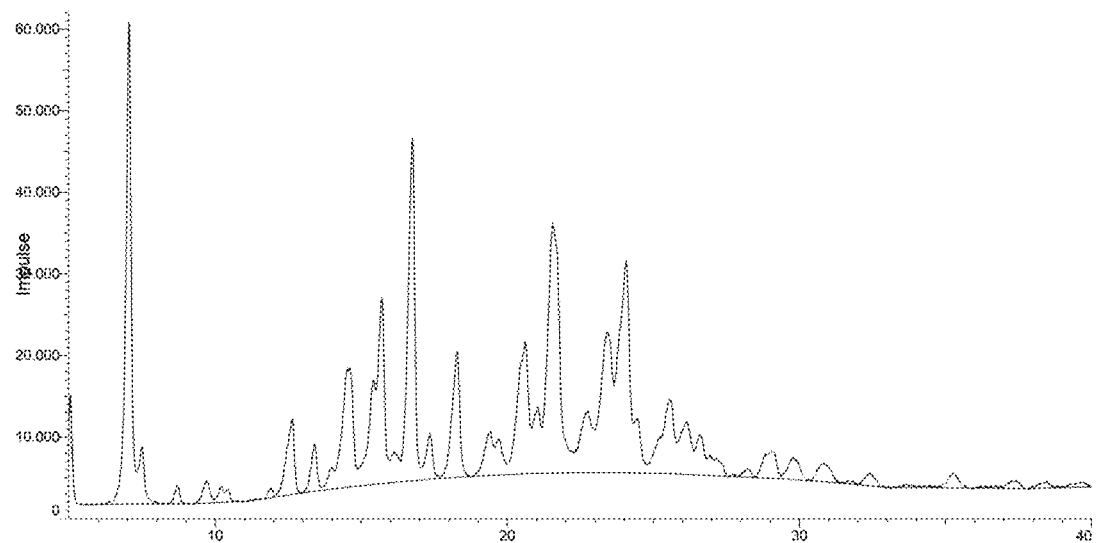
FIG. 22 shows the powder X-ray diffraction pattern of the MEK solvate of 6,6'-DPBHBNA obtained from example 25.

The material obtained in example 25 was analyzed by PXRD. The PXRD is shown in FIG. 22 and revealed that the crystalline form was different from that of forms A and B and showed the following reflections:

TABLE 9

| 2-θ (Theta) | %* |
|---|---|
| 5.0 | 24.9 |
| 7.0 | 100 |
| 7.5 | 14.4 |
| 12.6 | 20.1 |
| 13.4 | 14.9 |
| 14.5 | 30.4 |
| 15.4 | 27.9 |
| 15.7 | 44.5 |
| 16.8 | 76.6 |

TABLE 9-continued

| 2-θ (Theta) | %* |
|---|---|
| 18.3 | 33.8 |
| 19.4 | 17.6 |
| 20.6 | 35.7 |
| 21.5 | 59.5 |
| 22.7 | 21.7 |
| 23.4 | 37.5 |
| 24.1 | 51.9 |
| 25.6 | 24.1 |
| 26.2 | 19.5 |
| 26.6 | 17.0 |
| 29.1 | 13.7 |
| 30.8 | 11.1 |

*relative intensity

Example 26: Preparation of the Amorphous Form of 6,6'-DPBHBNA 100 g of 6,6'-DPBHBNA obtained in step 4 of example 21 (chem. purity UPLC: >99.0%) was heated to 130° C. to obtain a clear melt. The melt was immediately cooled to 22° C. within less than 2 min, whereby a glassy solid was obtained. The glassy solid was crushed into small pieces, which were ground in a mortar to obtain a powder.

Figure 23:
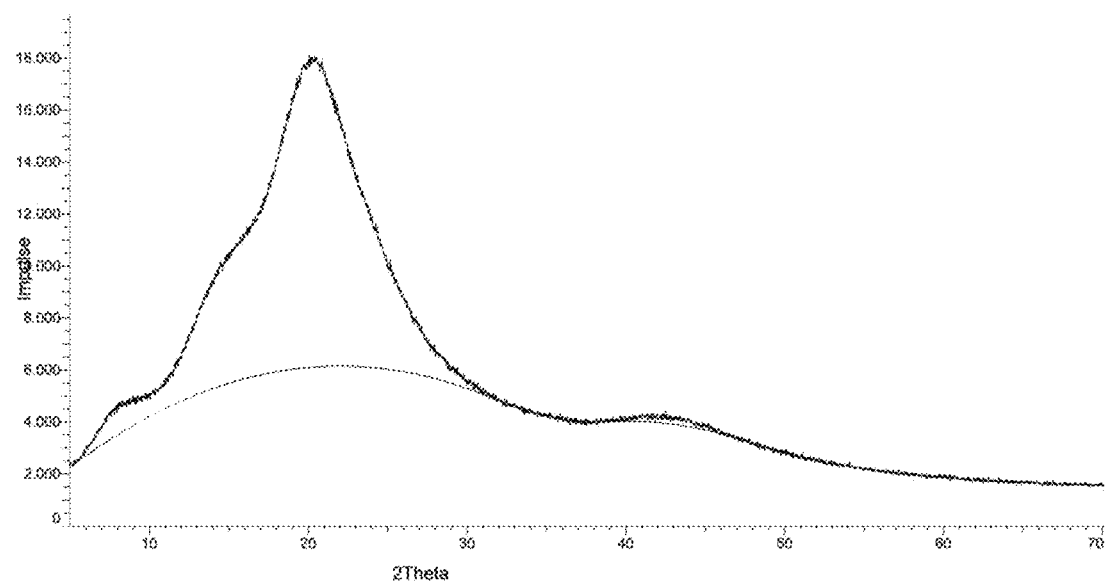
FIG. 23 shows the powder X-ray diffraction pattern of the amorphous form B of 6,6'-DPBHBNA obtained from example 26.

The thus obtained material was analyzed by PXRD. The PXRD is shown in FIG. 23 and revealed that no crystalline phase was present as evidenced by the absence of reflections in the 2 theta range from 5° to 40°. Rather a broad halo was observed in this 2 theta range.

Figure 24:
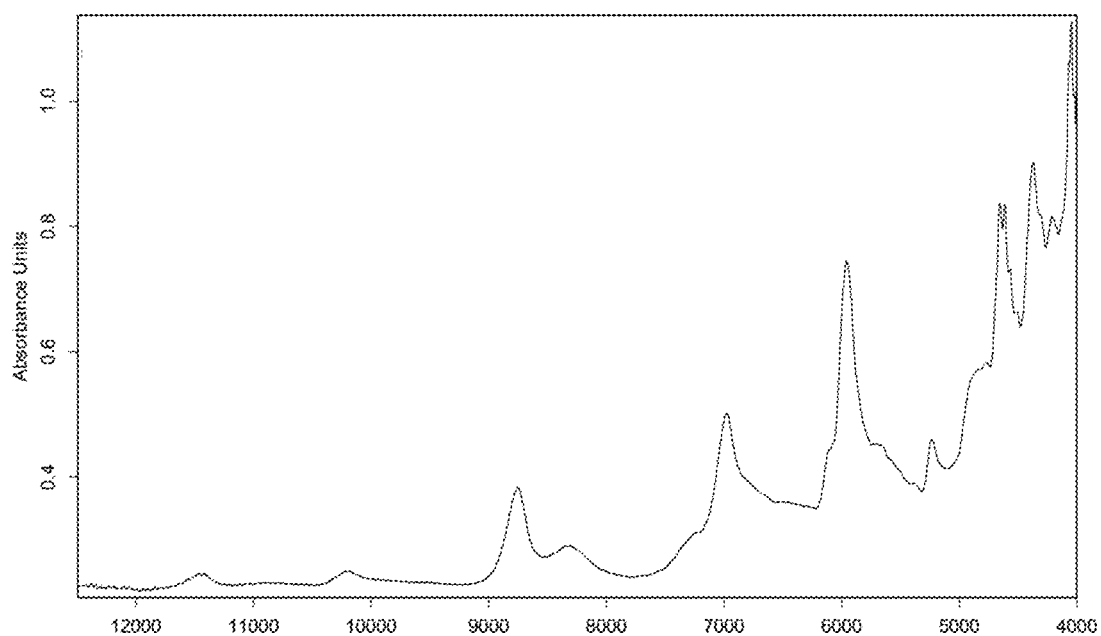
FIG. 24 shows the NIR spectrum of the amorphous form B of 6,6'-DPBHBNA obtained from example 26.
Figure 25:
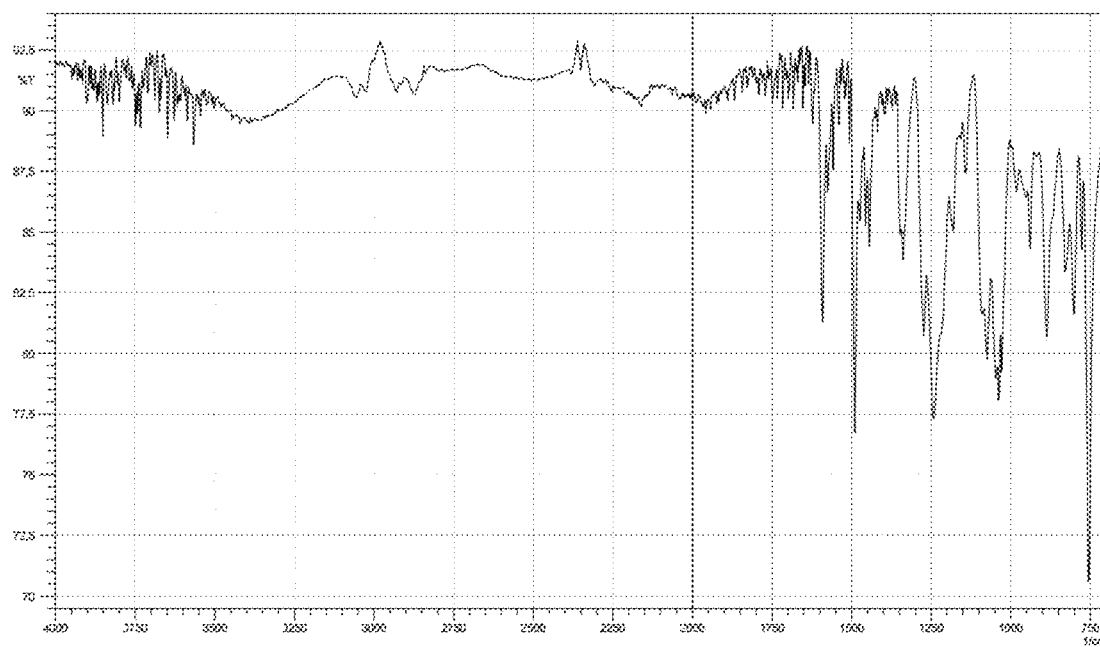
FIG. 25 shows the IR spectrum of the amorphous form B of 6,6'-DPBHBNA obtained from example 26.

The thus obtained material was analyzed by IR and NIR. The NIR is shown in FIG. 24 and the IR is shown in FIG. 25.

DSC of the thus obtained material (not shown) did not show an endothermic peak in the temperature range of 80-200° C. Rather a step was observed which corresponds to a glass transition in the range of 109-110° C.

Example 27: Preparation of the Form C of 6,6'-DPBHBNA

Example 27a 20 g of 6,6'-DPBHBNA obtained in step 4 of example 21 (chem. purity UPLC: >99.0%) was dissolved in 300 ml of 96% ethanol by heating to reflux. The homogeneous solution was slowly cooled to 22° C. whereby 6,6'-DPBHBNA crystallized in the form of compact crystals having a size in the range from 2 to 150 μm. The solid was collected by filtration, washed with MEK and dried on the air over 2 days at 25° C. and then 1 h at 50° C. to yield 15.8 g of 6,6'-diphenyl-2,2'-bis-(2-hydroxyethoxy)-1,1'-binaphthyl containing no detectable amounts of ethanol.

Example 27b 30 g of 6,6'-DPBHBNA obtained in step 4 of example 21 (chem. purity UPLC: >99.0%) was dissolved in 250 ml of anisole at 100° C. The homogeneous solution was very slowly cooled to 22° C. whereby 6,6'-DPBHBNA crystallized in the form of compact crystals having a size in the range from 10 to 300 μm. The solid was collected by filtration, washed with cold anisole and dried for 19 h at 80° C. in a rotary evaporator to yield 11.4 g of 6,6'-diphenyl-2, 2'-bis-(2-hydroxyethoxy)-1,1'-binaphthyl containing very small amounts of anisole (approximately 0.1% by weight) and no other solvent.

Figure 26:
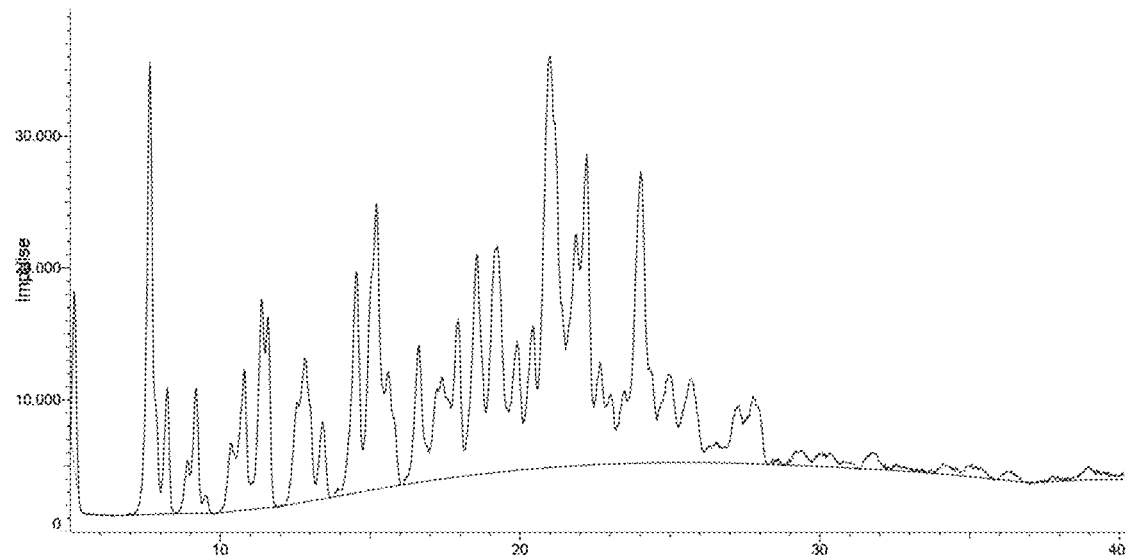
FIG. 26 shows the powder X-ray diffraction pattern of form C of 6,6'-DPBHBNA obtained from example 27.

The material obtained in example 27a was analyzed by PXRD. The PXRD is shown in FIG. 26 and revealed that the crystalline form was similar to the PXRD of the toluene solvate but different from that of form A and the other solvates and showed the following peaks:

TABLE 10

| 2-θ (Theta) | %* |
|---|---|
| 5.1 | 35.0 |
| 7.6 | 86.3 |
| 8.2 | 26.2 |
| 9.2 | 27.3 |
| 10.4 | 20.7 |
| 10.8 | 31.5 |
| 11.4 | 48.0 |
| 11.6 | 43.9 |
| 12.8 | 35.6 |
| 13.4 | 22.8 |
| 14.5 | 53.2 |
| 15.2 | 64.4 |
| 15.6 | 40.6 |
| 16.6 | 41.5 |
| 17.4 | 34.1 |
| 17.9 | 43.3 |
| 18.5 | 58.2 |
| 19.2 | 63.4 |
| 19.9 | 48.2 |
| 20.4 | 44.8 |
| 21.0 | 100.0 |
| 21.8 | 64.7 |
| 22.2 | 82.4 |
| 22.6 | 40.6 |
| 23.4 | 33.7 |
| 24.0 | 71.1 |
| 24.9 | 34.1 |
| 25.7 | 34.2 |
| 27.3 | 26.9 |
| 27.9 | 28.5 |

*relative intensity

The material obtained in example 27b was also analyzed by PXRD. The PXRD showed the same reflections and the same habit as the material of example 27a and confirmed that the crystals obtained in example 27a and 27b are the same crystalline forms.

Figure 27:
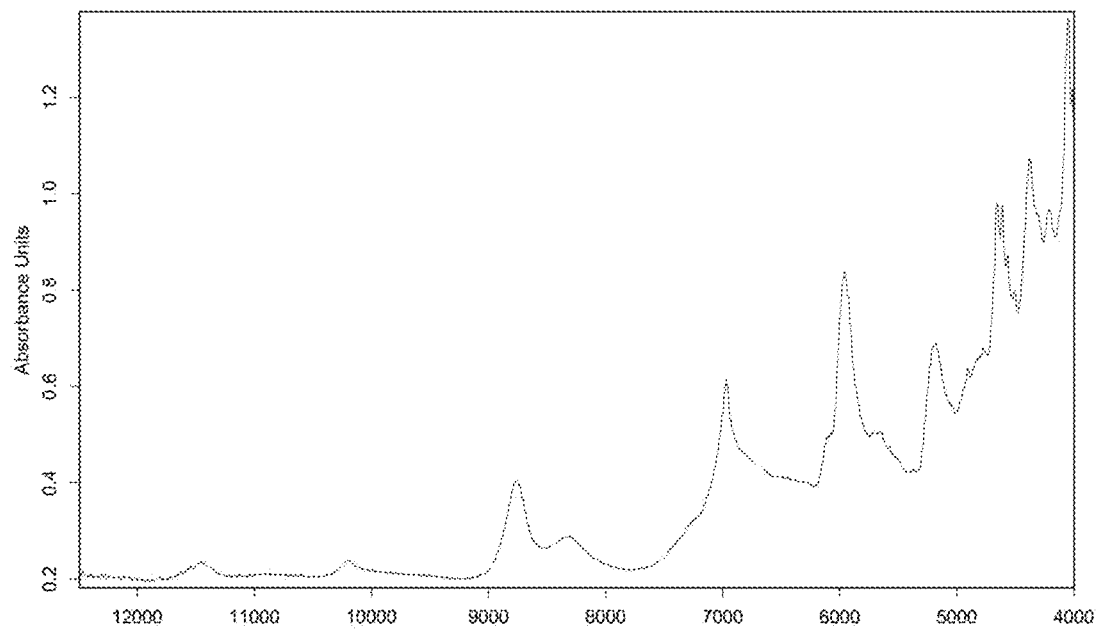
FIG. 27 shows the NIR spectrum of form C of 6,6'-DPBHBNA obtained from example 27.
Figure 28:
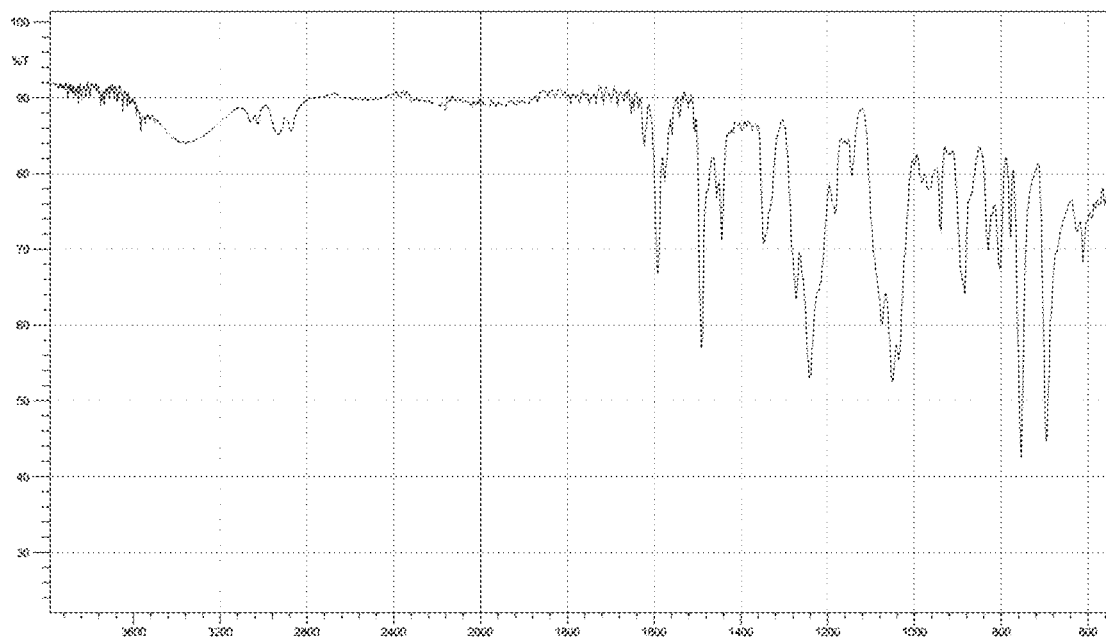
FIG. 28 shows the IR spectrum of form C of 6,6'-DPBHBNA obtained from example 27.

The material obtained in example 27a was analyzed by IR and NIR. The NIR is shown in FIG. 27 and the IR is shown in FIG. 28. In the NIR the habit in the region of 7000 cm$^{-1}$ and in the region of 4700 cm$^{-1}$ is characteristic for the form C and clearly allows for a distinction from forms A and B and the solvates other than the toluene solvate. The material obtained in example 27b was also analyzed by IR and NIR. The spectra showed the same habits as for the material of example 27a.

Figure 29:
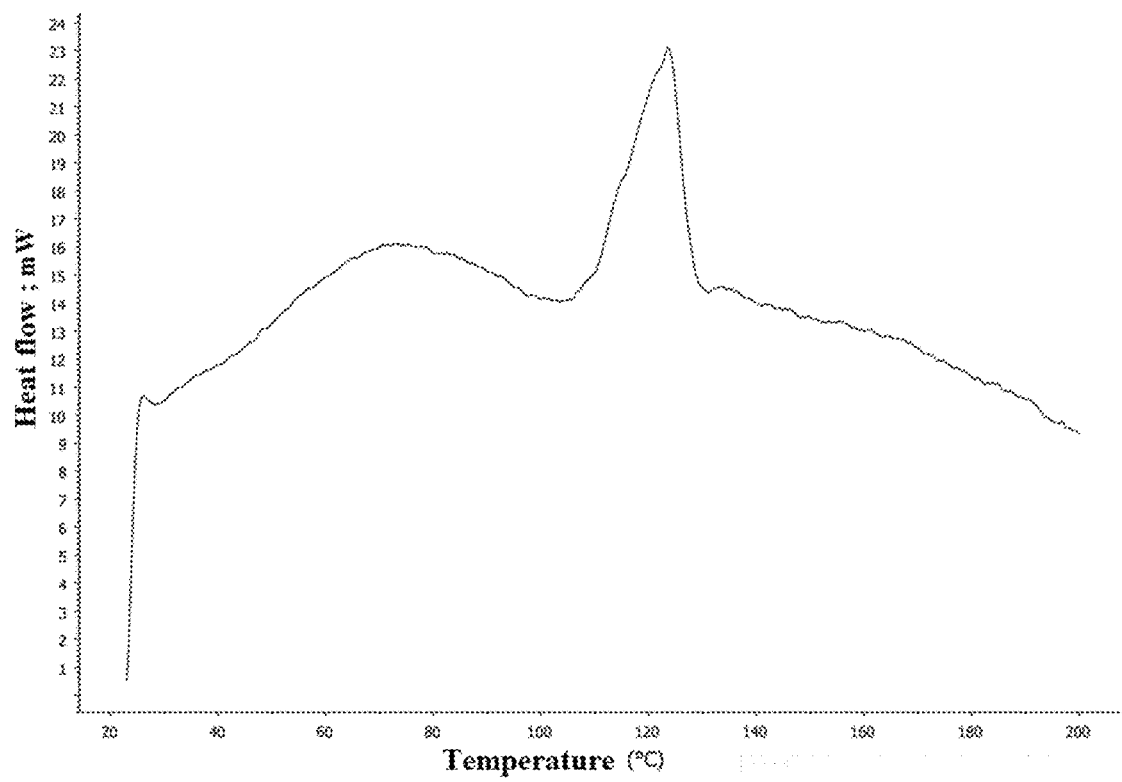
FIG. 29 shows the DSC of form C of 6,6'-DPBHBNA obtained from example 27.

A DSC of the material of example 27a showed an endothermic peak having an onset at 116.6° C., a peak maximum at 125.0° C. and a reaction point at 121.0° C. The DSC of the material of example 27a is shown in FIG. 29. A DSC of the material of example 27b showed an endothermic peak having an onset at 115.4° C., a peak maximum at 124.0° C. and a reaction point at 120.0° C.

[Production of Polycarbonate Resin from Monomers of the Above-Mentioned Examples]

Example 28

As materials, 7.9 kg (15.0 mol) of BINL-2EO or 2,2'-bis(2-hydroxyethoxy)-6,6'-diphenyl-1,1'-binaphthalene, which is the "form A" obtained in Example 21; 16.8 kg (45.0 mol) of BNE; 21.5 kg (40.0 mol) of BNEF; 22.1 kg (103.0 mol) of DPC; and 0.117 g (13.9×10$^{-4}$ mol) of sodium hydrogen carbonate were put into a 50 L reactor including a stirrer and a distillation device through a hopper with a scoop. Nitrogen was introduced to the reactor, and the inside of the reactor was pressurized to 780 mmHg. After three minutes of maintaining this state, the nitrogen was evacuated from the exhaust vent and the inside of the reactor was returned to be 760 mmHg. This process of adding nitrogen, maintaining the state for three minutes, then purging from the exhaust vent to return the reactor to 760 mmHg was repeated a further two times.

Next, the materials were heated to 180° C. in a nitrogen atmosphere of 760 mmHg. Twenty minutes after the heating was started, the materials were confirmed to be completely melted, and were then stirred for 120 minutes under the same conditions. The pressure was then adjusted to 200 mmHg, and at the same time, the temperature was raised to 200° C. at a rate of 60° C./hr. At this point, it was confirmed that phenol generated as a byproduct had started to be distilled. The materials were then maintained at 200° C. for 40 minutes to cause a reaction, after which the temperature was raised to 240° C. at a rate of 75° C./hr. Ten minutes after completion of the temperature increase, the pressure was adjusted to 1 mm Hg or lower over 1 hour while maintaining the temperature at 240° C. Next, the temperature was raised to 245° C. at a rate of 60° C./hr and the materials were stirred for 30 minutes.

After the reaction was finished, nitrogen was introduced into the reactor to return the pressure to room pressure, and the generated polycarbonate was removed while being pelletized. The molecular weight (Mw) of the pellet was 27500.

The obtained pellets were dried at 100° C. for three hours and it was confirmed that the water content of the pellet was 1% using the Karl Fischer method. The dried pellets and additives-namely, 1000 ppm of Pentaerythritol tetrakis[3-(3,5-di-tert-butyl-4-hydroxyphenyl)propionate] (AO-60 from ADEKA Corporation; anti-oxidant); 1500 ppm of glycerol mono-stearate (S-100A from RIKEN VITAMIN Co., Ltd.; releasing agent); and 300 ppm of 3,9-bis(2,6-di-tert-butyl-4-methylphenoxy)-2,4,8,10-tetraoxa-3,9-diphosphaspiro[5.5]undecane (PEP-36 from ADEKA Corporation; antioxidant)—were mixed to adhere the additives to the dried pellets. These were then melt mixed while depressurizing to 40 mmHg using a twin screw extruder to be pelletized.

The obtained polycarbonate resin composition has a refractive index of 1.680; an Abbe number of 18.1; Tg of 147° C.; Mv of 11900; Mw of 27000; b value of 3.9; Moldability of A; transparency 89% of total light transmittance; and 89% of total light transmittance after PCT test.

The properties of the polycarbonate obtained in Example 28 are shown in Table 11 together with those of the resins of the other Examples and so on.

[Chemical Formula 44]

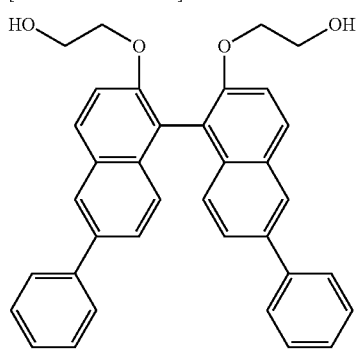

(BINL-2EO or 6,6'-DPBHBNA)

Example 29

Substantially the same operation was performed as in Example 28, except that 12.6 kg (24.0 mol) of BINL-2EO, 11.1 kg (30.0 mol) of BNE, 17.8 kg (33.0 mol) of BNEF, 8.1 kg (13.0 mol) of 2DNBINOL-2EO, 22.1 kg (103.0 mol) of DPC and 0.117 g (13.9×10$^{-4}$ mol) of sodium hydrogen carbonate were used as the raw material to obtain polycarbonate resin and polycarbonate composition.

The obtained polycarbonate resin composition has a refractive index of 1.690; an Abbe number of 16.7; Tg of 115.5° C.; Mv of 11900; Mw of 27000; b value of 3.9; Moldability of A; transparency 89% of total light transmittance; and 89% of total light transmittance after PCT test.

The properties of the polycarbonate obtained in Example 29 are shown in Table 11.

[Chemical Formula 45]

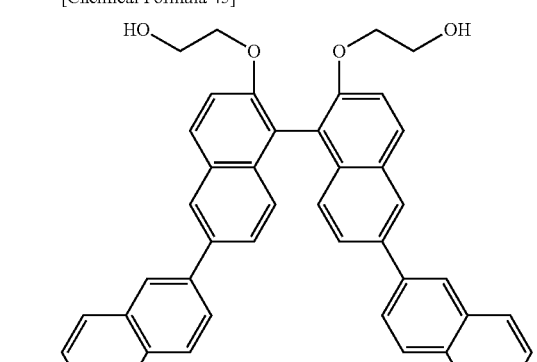

(2DN BINOL-2EO)

TABLE 11

| | Composition ratio | | | | | | | | | |
|---|---|---|---|---|---|---|---|---|---|---|
| | BINL-2EO mol % | BNEF mol % | BNE mol % | BPEF mol % | BPPEF mol % | DNBINOL-2EO mol % | 2DNBINOL-2EO mol % | 9DPNBINOL- mol % | CN-BNA mol % | FUR-BNA mol % |
| Example 1 | 100 | 0 | 0 | 0 | 0 | 0 | 0 | 0 | 0 | 0 |
| Example 2-A | 25 | 75 | 0 | 0 | 0 | 0 | 0 | 0 | 0 | 0 |
| Example 2-B | 50 | 50 | 0 | 0 | 0 | 0 | 0 | 0 | 0 | 0 |
| Example 2-C | 75 | 25 | 0 | 0 | 0 | 0 | 0 | 0 | 0 | 0 |
| Example 3-A | 25 | 0 | 0 | 75 | 0 | 0 | 0 | 0 | 0 | 0 |
| Example 3-B | 50 | 0 | 0 | 50 | 0 | 0 | 0 | 0 | 0 | 0 |
| Example 3-C | 75 | 0 | 0 | 25 | 0 | 0 | 0 | 0 | 0 | 0 |
| Example 4-A | 25 | 0 | 0 | 0 | 75 | 0 | 0 | 0 | 0 | 0 |
| Example 4-B | 50 | 0 | 0 | 0 | 50 | 0 | 0 | 0 | 0 | 0 |
| Example 4-C | 75 | 0 | 0 | 0 | 25 | 0 | 0 | 0 | 0 | 0 |
| Example 6 | 0 | 0 | 0 | 30 | 0 | 70 | 0 | 0 | 0 | 0 |
| Example 6-A | 25 | 30 | 45 | 0 | 0 | 0 | 0 | 0 | 0 | 0 |
| Example 6-B | 60 | 0 | 20 | 20 | 0 | 0 | 0 | 0 | 0 | 0 |
| Example 6-C | 60 | 0 | 20 | 0 | 20 | 0 | 0 | 0 | 0 | 0 |
| Example 6-D | 0 | 35 | 50 | 0 | 0 | 15 | 0 | 0 | 0 | 0 |
| Example 6-E | 0 | 0 | 30 | 0 | 50 | 20 | 0 | 0 | 0 | 0 |
| Example 6-F | 0 | 0 | 30 | 40 | 0 | 30 | 0 | 0 | 0 | 0 |
| Example 7 | 0 | 0 | 0 | 15 | 0 | 0 | 85 | 0 | 0 | 0 |
| Example 7-A | 0 | 0 | 0 | 50 | 0 | 0 | 50 | 0 | 0 | 0 |
| Example 7-B | 0 | 0 | 0 | 85 | 0 | 0 | 15 | 0 | 0 | 0 |
| Example 8 | 0 | 0 | 0 | 15 | 0 | 0 | 0 | 85 | 0 | 0 |
| Example 8-A | 0 | 0 | 0 | 50 | 0 | 0 | 0 | 50 | 0 | 0 |
| Example 8-A | 0 | 0 | 0 | 85 | 0 | 0 | 0 | 15 | 0 | 0 |
| Example 9 | 0 | 0 | 0 | 70 | 0 | 0 | 0 | 0 | 30 | 0 |
| Example 10 | 0 | 0 | 0 | 70 | 0 | 0 | 0 | 0 | 0 | 30 |
| Example 11 | 0 | 0 | 0 | 70 | 0 | 0 | 0 | 0 | 0 | 0 |
| Example 28 | 15 | 40 | 45 | 0 | 0 | 0 | 0 | 0 | 0 | 0 |
| Example 29 | 24 | 33 | 30 | 0 | 0 | 0 | 13 | 0 | 0 | 0 |
| Comparative Ex.1 | 0 | 0 | 100 | 0 | 0 | 0 | 0 | 0 | 0 | 0 |

TABLE 11-continued

| | Composition ratio THI-BNA mol % | Characteristics | | | | | | | After PCT test |
|---|---|---|---|---|---|---|---|---|---|
| | | Mv — | Tg °C. | refractive index — | Abbe number — | total light % | b value — | Moldability — | total light transmittance % |
| Example 1 | 0 | 11,300 | 162 | 1.697 | 15 | 87 | 4.2 | C | 87 |
| Example 2-A | 0 | 11,600 | 183 | 1.688 | 18 | 87 | 4.2 | B | 87 |
| Example 2-B | 0 | 11,900 | 175 | 1.690 | 17 | 87 | 4.1 | A | 87 |
| Example 2-C | 0 | 11,300 | 169 | 1.694 | 16 | 87 | 4.0 | B | 87 |
| Example 3-A | 0 | 12,400 | 150 | 1.655 | 20 | 88 | 4.1 | B | 88 |
| Example 3-B | 0 | 11,700 | 154 | 1.670 | 18 | 88 | 4.0 | A | 88 |
| Example 3-C | 0 | 12,000 | 158 | 1.684 | 16 | 88 | 4.0 | B | 88 |
| Example 4-A | 0 | 11,500 | 157 | 1.665 | 20 | 88 | 4.1 | B | 88 |
| Example 4-B | 0 | 11,700 | 159 | 1.675 | 18 | 88 | 4.1 | B | 88 |
| Example 4-C | 0 | 11,200 | 161 | 1.685 | 17 | 88 | 4.0 | B | 88 |
| Example 6 | 0 | 11,200 | 168 | 1.697 | 16 | 87 | 4.3 | C | 87 |
| Example 6-A | 0 | 12,200 | 148 | 1.682 | 18 | 88 | 4.1 | A | 88 |
| Example 6-B | 0 | 11,800 | 149 | 1.682 | 17 | 87 | 4.0 | B | 87 |
| Example 6-C | 0 | 12,100 | 152 | 1.683 | 17 | 87 | 4.1 | B | 87 |
| Example 6-D | 0 | 11,900 | 149 | 1.684 | 18 | 87 | 4.1 | A | 87 |
| Example 6-E | 0 | 11,600 | 149 | 1.672 | 19 | 88 | 4.2 | B | 88 |
| Example 6-F | 0 | 12,300 | 146 | 1.676 | 18 | 87 | 4.2 | B | 87 |
| Example 7 | 0 | 12,200 | 192 | 1.730 | 13 | 87 | 4.1 | B | 87 |
| Example 7-A | 0 | 12,300 | 173 | 1.698 | 15 | 87 | 4.2 | A | 87 |
| Example 7-B | 0 | 12,400 | 154 | 1.659 | 20 | 87 | 4.2 | B | 87 |
| Example 8 | 0 | 11,900 | 196 | 1.718 | 15 | 87 | 4.2 | B | 87 |
| Example 8-A | 0 | 12,000 | 177 | 1.693 | 17 | 87 | 4.2 | A | 87 |
| Example 8-A | 0 | 12,100 | 155 | 1.658 | 20 | 87 | 4.2 | B | 87 |
| Example 9 | 0 | 12,000 | 141 | 1.660 | 19 | 88 | 4.2 | A | 88 |
| Example 10 | 0 | 12,100 | 154 | 1.675 | 19 | 88 | 4.2 | A | 88 |
| Example 11 | 30 | 12,000 | 159 | 1.679 | 19 | 88 | 4.1 | A | 87 |
| Example 28 | 0 | 11,900 | 147 | 1.680 | 18.1 | 89 | 3.9 | A | 89 |
| Example 29 | 0 | 11,900 | 155 | 1.690 | 16.7 | 89 | 3.9 | A | 89 |
| Comparative Ex.1 | 0 | 11,000 | 115 | 1.668 | 19 | 86 | 4.4 | D | 86 |

Examples 30 to 36

As raw materials, 78.99 g (0.15 mol) of BINL-2EO (or 6,6'-DPBHBNA) represented by the table below, 168.50 g (0.45 mol) of BNE, 215.45 g (0.40 mol) of BNEF 220.64 g (1.030 mol) of DPC and 1.2 mg of sodium hydrogen carbonate ($13.9 \times 10^{-5}$ mol/added as aqueous solution) were put into a 1 L reactor including a stirrer and a distillation device. Nitrogen was introduced to the reactor, and the inside of the reactor was pressurized to 780 mmHg. After three minutes of maintaining this state, the nitrogen was evacuated from the exhaust vent and the inside of the reactor was returned to be 760 mmHg. This process of adding nitrogen, maintaining the state for three minutes, then purging from the exhaust vent to return the reactor to 760 mmHg was repeated a further two times.

Next, the materials were heated to 180° C. in a nitrogen atmosphere of 760 mmHg. Twenty minutes after the heating was started, the materials were confirmed to be completely melted, and were then stirred for 120 minutes under the same conditions. The pressure was then adjusted to 200 mmHg, and at the same time, the temperature was raised to 200° C. at a rate of 60° C./hr. At this point, it was confirmed that phenol generated as a byproduct had started to be distilled. The materials were then maintained at 200° C. for 40 minutes to cause a reaction, after which the temperature was raised to 240° C. at a rate of 75° C./hr. Ten minutes after completion of the temperature increase, the pressure was adjusted to 1 mm Hg or lower over 1 hour while maintaining the temperature at 240° C. Next, the temperature was raised to 245° C. at a rate of 60° C./hr and the materials were stirred for 30 minutes.

After the reaction was finished, nitrogen was introduced into the reactor to return the pressure to room pressure, and the generated polycarbonate resin was removed. The achieved values of molecular weight (Mw) differ from those of Example 28 while the obtained characteristics are similar to those of Example 28.

TABLE 12

| | Used BINL-2EO (or 6,6'-DPBHBNA) | | | | | | |
|---|---|---|---|---|---|---|---|
| | Examples and Forms of BINL-2EO (or 6,6'-DPBHBNA) | | Types of included organic solvents and concentration in BINL-2EO (or 6,6'-DPBHBNA) | | | | |
| Example 28 | Example 21 | FormA | methaol | 0.03 wt % | toluene | 0.3 wt % | |
| Example 30 | Example 22 | methaolsolvate | methaol | 5.98 wt % | | | |
| Example 31 | Example 23 | Foram A and methaolsolvate | methaol | 2.4 wt % | toluene | 0.1 wt % | anisole 0.002 wt % |
| Example 32 | Example 24 | toluenesolvate | toluene | 5.6 wt % | | | |
| Example 33 | Example 25 | MEK solvate | MEK | 8.5 wt % | | | |
| Example 34 | Example 26 | Form B (Amorphous) | — | | | | |
| Example 35 | Example 27a | Form C | ethanol | 0 wt % | | | |

TABLE 12-continued

| | | | | | |
|---|---|---|---|---|---|
| Example 36 | Example 27b | Form C | anisole | 0.1 wt % | |
| Reference Example | Example 23 | Shortened drying time in Step 3 | anisole | 0.1 wt % | |

| | Used BINL-2EO (or 6,6'-DPBHBNA) | | | | | Mw of polycarbonate resins |
|---|---|---|---|---|---|---|
| | Types of included organic solvents and concentration in BINL-2EO (or 6,6'-DPBHBNA; mol number per 1 mol of 6,6'-DPBHBNA) | | | | | |
| Example 28 | methaol | 0.005 mol | toluene | 0.300 mol | | 27100 |
| Example 30 | toluene | 0.364 mol | | | | 26400 |
| Example 31 | methaol | 0.405 mol | toluene | 0.0057 mol | anisole  0.0001 mol | 26300 |
| Example 32 | toluene | 0.339 mol | | | | 26000 |
| Example 33 | MEK | 0.679 mol | | | | 26000 |
| Example 34 | — | | | | | 27500 |
| Example 35 | ethanol | 0 mol | | | | 27000 |
| Example 36 | anisole | 0.005 mol | | | | 27000 |
| Reference Example | anisole | 0.005 mol | | | | 24500 |

Reference Example

According to step 3 of Example 23, "the solid was collected by filtration, washed with methanol and dried on the air at room temperature overnight" but the drying time was shortened; and BINL-2EO or 6,6'-DPBHBNA, which includes 1.3 mol of methanol per 1 mol of 2,2'-bis(2-hydroxyethoxy)-6,6'-diphenyl-1,1'-binaphthalene was used. Substantially the same operation was performed as in Example 1, except that the BINL-2EO (6,6'-DPBHBNA) obtained here was used as the main raw material.

As a result, when the raw material was introduced to the reactor through a hopper with a scoop, it was not smoothly introduced; and therefore the operability was bad. In addition, the reaction progressed slowly and the molecular weight of the obtained pellets was 24500, which was lower than that of Example 28.

Figure 30:
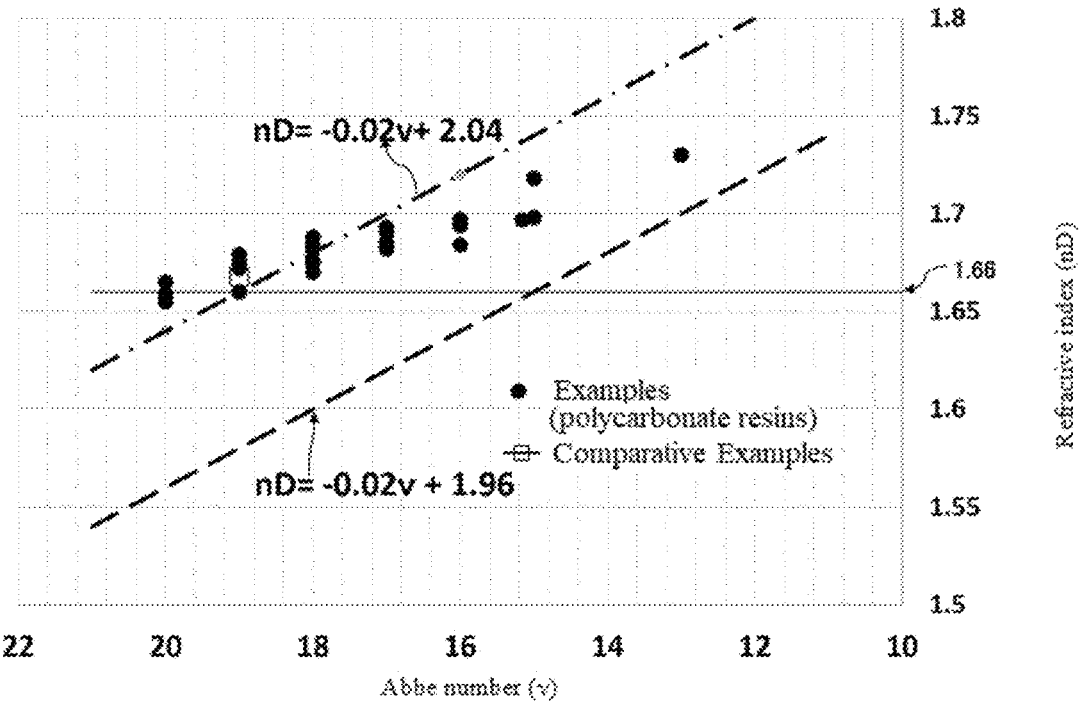
FIG. 30 is the first graph, in which the values of Abbe numbers (v) of thermoplastic resins of the examples and comparative examples are plotted on the x-axis and the values of refractive index (nD) thereof are plotted on the y-axis.
Figure 31:
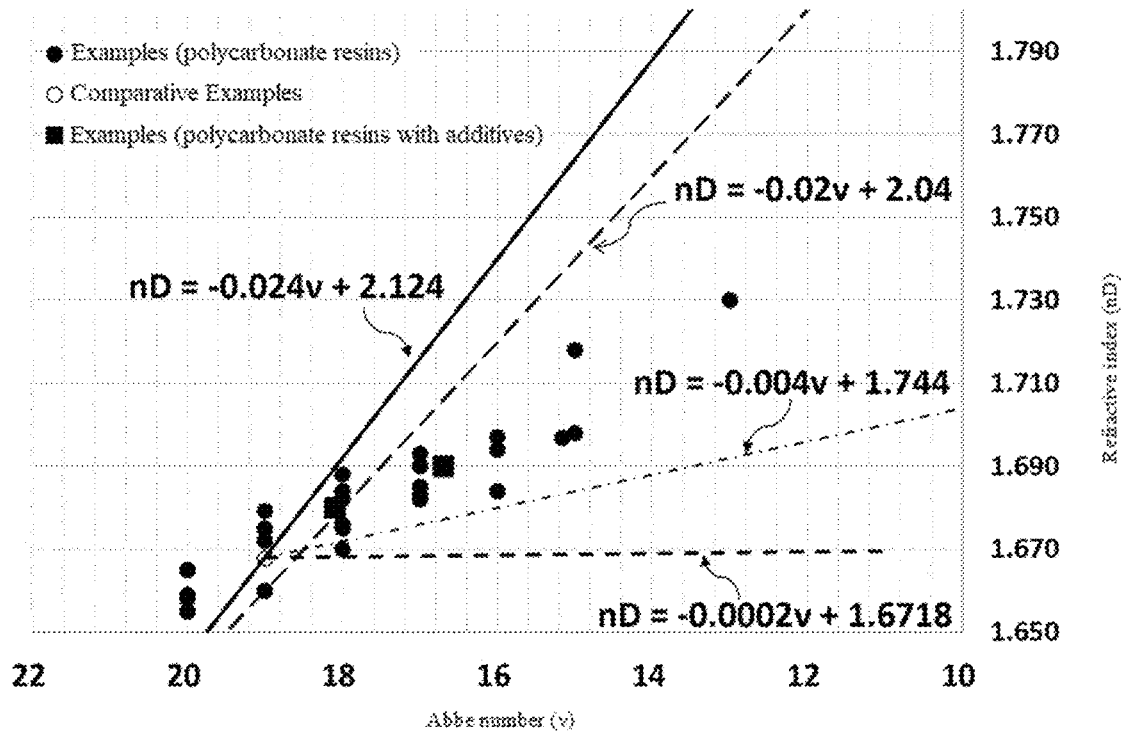
FIG. 31 is the second graph, in which the values of Abbe numbers (v) of thermoplastic resins of the examples and comparative examples are plotted on the x-axis and the values of refractive index (nD) thereof are plotted on the y-axis.

FIGS. 30 and 31 are graphs in which Abbe numbers (v) are plotted on the x-axis and the values for the refractive index (nD) thereof are plotted on the y-axis as the properties of the thermoplastic resins obtained in the examples and comparative examples. In these graphs, many plots of the examples exist in specific areas, such as the area between the lines nD=−0.02v+1.96 and nD=−0.02v+2.04 in FIG. 30; the area between the lines nD=−0.0002v+1.6718 and nD=−0.024v+2.124; and the area between the lines nD=−0.004v+1.744 and y=−0.02x+2.04 in FIG. 31.

Accordingly, it was confirmed that the thermoplastic resins have well-balanced refractive indices and Abbe numbers, and that thermoplastic resins suitable for optical use were achieved in the examples.

For example, FIG. 31 shows polycarbonate resins with a refractive index higher than 1.660 and Abbe number of less than 19, or less than or equal to 19, such as 13 to 19 and 15 to 19 as represented therein; and the plots thereof exist in an area between the lines nD=−0.0002v+1.6718 and nD=−0.024v+2.124 and therefore these plots meet the requirements of −0.0002v+1.6718<nD<−0.024v+2.124 and the polycarbonate resins have preferable properties;

the plots thereof exist in an area between the lines nD=−0.004v+1.744 and nD=−0.024v+2.124 and therefore these plots meet the requirements of −0.004v+1.744<nD<−0.024v+2.124 and the polycarbonate resins have preferable properties; and the plots thereof exist in an area between the lines nD=−0.02v+2.04 and nD=−0.024v+2.124 and therefore these plots meet the requirements of −0.02v+2.04<nD<−0.024v+2.124 and the polycarbonate resins have preferable properties.

The invention claimed is:

1. A thermoplastic resin comprising a structural unit represented by general formula (1):

[Chemical Formula 1]

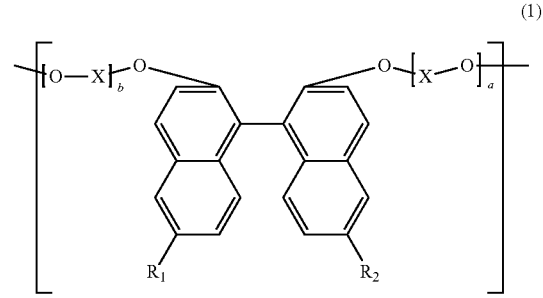

wherein:
R$_1$ and R$_2$ each independently represent a hydrogen atom, a fluorine atom, a chlorine atom, a bromine atom, an iodine atom, an alkyl group having 1 to 6 carbon atoms, a monocyclic or polycyclic aryl group having 6 to 36 carbon atoms, a monocyclic or polycyclic heteroaryl group having 5 to 36 ring atoms where 1, 2, 3 or 4 of the ring atoms are selected from nitrogen, sulfur and oxygen while the other ring atoms are carbon atoms, an alkenyl group having 2 to 6 carbon atoms, an alkoxy group having 1 to 6 carbon atoms or an aralkyl group having 7 to 17 carbon atoms;

the monocyclic or polycyclic aryl group and the monocyclic or polycyclic heteroaryl group may be unsubstituted or have 1 or 2 R$^a$ groups selected from the group consisting of CN, CH$_3$, OCH$_3$, O-phenyl, O-naphthyl, S-phenyl, S-naphthyl and halogen;

with the proviso that both of R$_1$ and R$_2$ are not hydrogen;

X represents an alkylene group having 1 to 8 carbon atoms, a cycloalkylene group having 5 to 12 carbon atoms or an arylene group having 6 to 20 carbon atoms;

with the proviso that each of the alkylene group and the cycloalkylene group may be substituted to have a benzene ring; and a and b each independently represent an integer of 1 to 10, wherein the thermoplastic resin further comprises a structural unit represented by general formula (2):

[Chemical Formula 2]

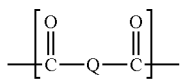
(2)

wherein Q is represented by the formula below:

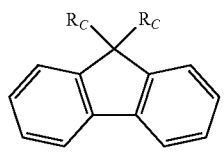

wherein $R_C$s each independently represent a single bond that bonds to a CO group in formula (2) or an alkylene group, which may have a substituent, wherein the total carbon number is 1 to 10, and which includes a point of bonding to the CO group in formula (2) at the end, wherein the thermoplastic resin has a refractive index of higher than 1.660 and Abbe number of 18 or less than 18, and wherein the thermoplastic resin further comprises a polycarbonate structural unit.

2. The thermoplastic resin according to claim 1, which is a polyester carbonate resin.

3. The thermoplastic resin according to claim 1, which further comprises at least one additional structural unit represented by the general formula (2-1):

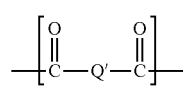
(2-1)

wherein Q' is represented by formula (2a):

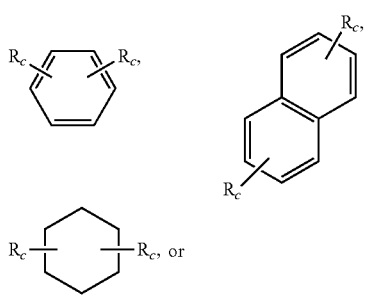
(2a)

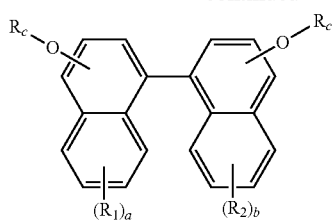

wherein in formula (2a), $R_c$s each independently represent a single bond that bonds to a CO group in formula (2-1) or an alkylene group, which may have a substituent, wherein the total carbon number is 1 to 10, and which includes a point of bonding to the CO group in formula (2-1) at the end.

4. The thermoplastic resin according to claim 1, which comprises the structural unit represented by general formula (1) in an amount of more than 50 mol %, based on the structural units of the thermoplastic resin.

5. The thermoplastic resin according to claim 1, wherein at least one of R1 and R2 in general formula (1) is an aryl group having 6 to 20 carbon atoms.

6. The thermoplastic resin according to claim 1, wherein the structural unit represented by general formula (1) comprises at least one of structural units represented by general formulae (A-1) to (A-7):

[Chemical Formula 6]

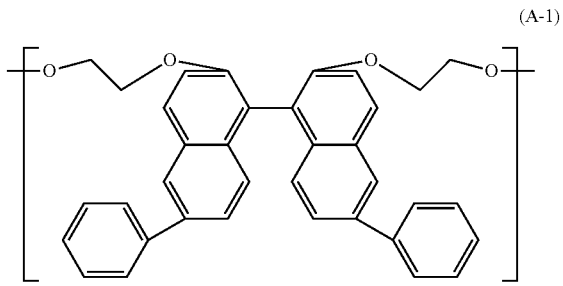
(A-1)

[Chemical Formula 7]

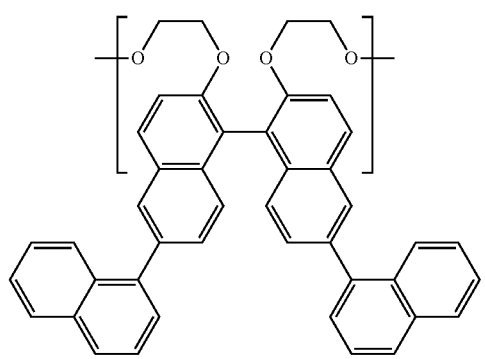
(A-2)

-continued

[Chemical Formula 8]

(A-3)

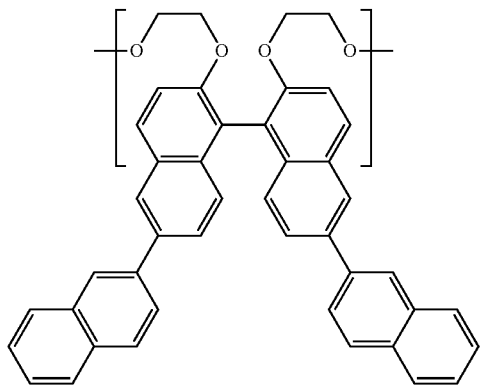

[Chemical Formula 9]

(A-4)

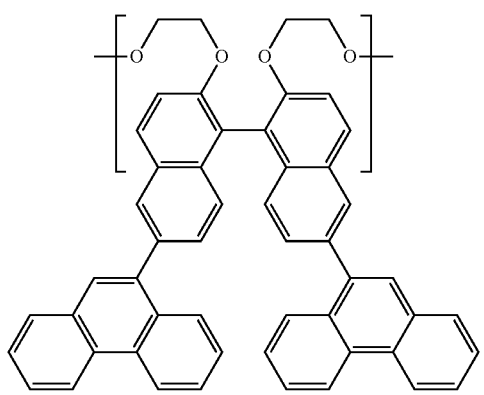

[Chemical Formula 10]

(A-5)

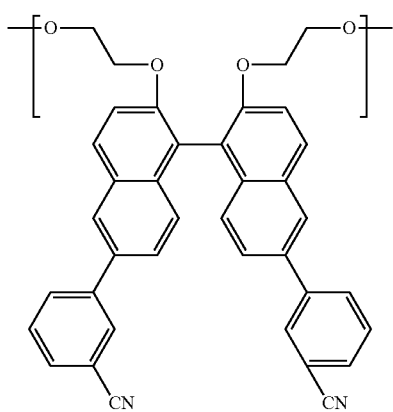

-continued

[Chemical Formula 11]

(A-6)

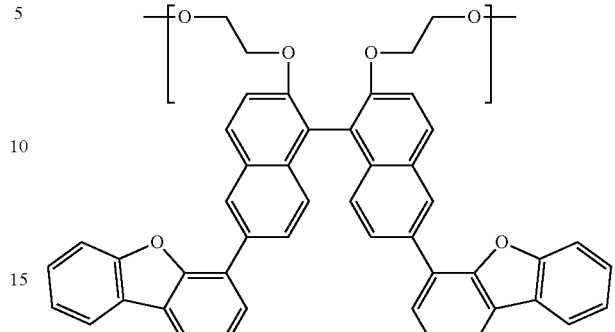

[Chemical Formula 12]

(A-7)

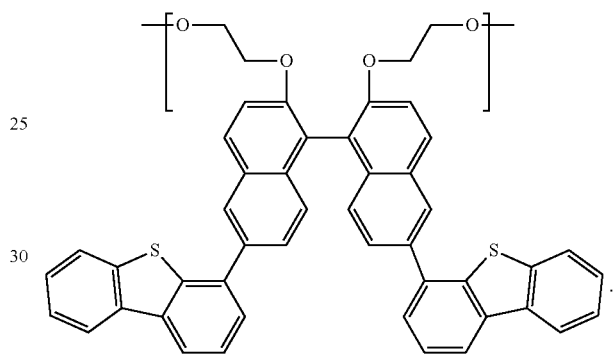

7. The thermoplastic resin according to claim 1, which further comprises at least one of structural units represented by general formulae (3) and (4):

[Chemical Formula 13]

(3)

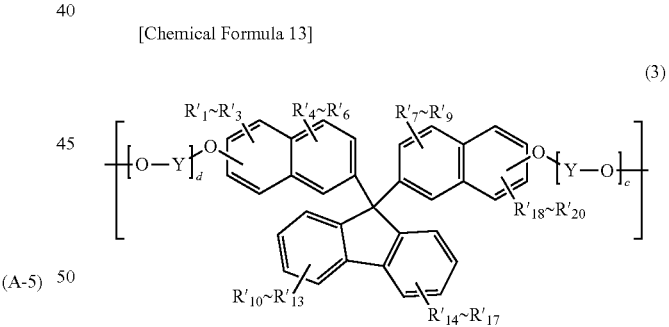

wherein:
$R'_1$ to $R'_{20}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;
Y represents an alkylene group having 1 to 8 carbon atoms, a cycloalkylene group having 5 to 12 carbon atoms or an arylene group having 6 to 20 carbon atoms; and
c and d each independently represent an integer of 1 to 10,

[Chemical Formula 14]

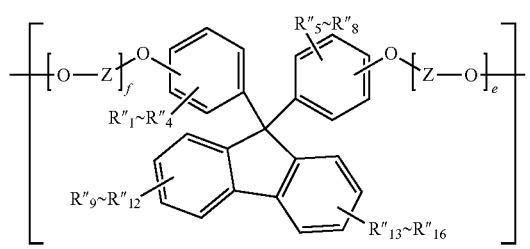

(4)

wherein:

$R''_1$ to $R''_{16}$ each independently represent a hydrogen atom, a fluorine atom, a chlorine atom, a bromine atom, an iodine atom, an alkyl group having 1 to 6 carbon atoms, an aryl group having 6 to 12 carbon atoms, an alkenyl group having 2 to 6 carbon atoms, an alkoxy group having 1 to 6 carbon atoms or an aralkyl group having 7 to 17 carbon atoms;

Z represents an alkylene group having 1 to 8 carbon atoms, a cycloalkylene group having 5 to 12 carbon atoms or an arylene group having 6 to 20 carbon atoms; and e and f each independently represent an integer of 1 to 10.

8. The thermoplastic resin according to claim 7, which comprises a copolymer comprising at least the structural unit represented by general formula (1) and the structural unit represented by general formula (3).

9. The thermoplastic resin according to claim 7, which comprises a copolymer comprising at least the structural unit represented by general formula (1) and the structural unit represented by general formula (4).

10. The thermoplastic resin according to claim 1, which further comprises at least one of structural units represented by general formula (5):

[Chemical Formula 17]

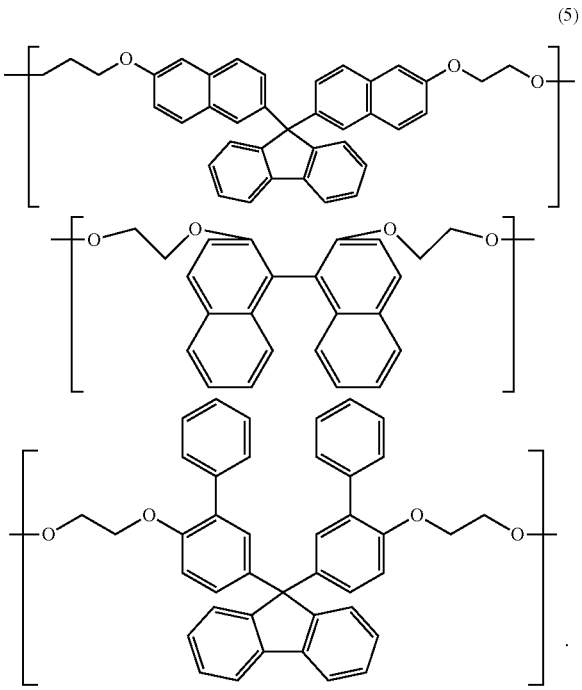

(5)

11. The thermoplastic resin according to claim 1, wherein the aryl group is selected from among a pyrenyl group, a furanyl group, a benzodioxanyl group, a dihydrobenzofuranyl group, a piperonyl group, a benzofuranyl group, a dibenzofuranyl group, a pyrrolidinyl group, an isoquinolyl group, a pyrimidinyl group and a carbazole group, which may be substituted with an alkyl group having 1 to 6 carbon atoms, an alkoxy group having 1 to 6 carbon atoms or an aryl group having 6 to 16 carbon atoms.

12. The thermoplastic resin according to claim 1, which has a refractive index of 1.668 or higher.

13. The thermoplastic resin according to claim 1, wherein said X is an ethylene group.

14. The thermoplastic resin according to claim 1, wherein the b value in accordance with JIS K 7105 is 10 or less.

15. An optical lens containing the thermoplastic resin according to claim 1.

* * * * *